(12) United States Patent
Karamanos

(10) Patent No.: US 12,264,839 B2
(45) Date of Patent: *Apr. 1, 2025

(54) PRE-PIPED THERMAL TRANSFER UNIT WITH SUPPORT MECHANISM

(71) Applicant: John Chris Karamanos, San Jose, CA (US)

(72) Inventor: John Chris Karamanos, San Jose, CA (US)

(73) Assignee: John Chris Karamanos, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,492

(22) Filed: Nov. 14, 2023

(65) Prior Publication Data

US 2024/0085055 A1 Mar. 14, 2024

Related U.S. Application Data

(63) Continuation of application No. 16/935,776, filed on Jul. 22, 2020, now Pat. No. 11,841,159, which is a
(Continued)

(51) Int. Cl.
*F24F 13/02* (2006.01)
*B23P 15/26* (2006.01)
(Continued)

(52) U.S. Cl.
CPC .......... *F24F 13/0272* (2013.01); *B23P 15/26* (2013.01); *F16L 3/08* (2013.01);
(Continued)

(58) Field of Classification Search
CPC ........ F24F 13/0272; F24F 1/0063; F24F 1/26; F24F 5/0003; F24F 13/0245;
(Continued)

(56) References Cited

U.S. PATENT DOCUMENTS

| 1,429,776 A | 9/1922 | Robinson |
| 1,793,059 A | 2/1931 | Chambers |
| 1,858,101 A | 5/1932 | McAfee |
| 2,002,103 A | 5/1935 | Wheeler |
| 2,058,752 A | 10/1936 | Wray |
| 2,233,273 A | 2/1941 | Di Vincenzo |

(Continued)

FOREIGN PATENT DOCUMENTS

| JP | S59-210300 A | 11/1984 |
| JP | S62-008033 A | 1/1987 |

(Continued)

OTHER PUBLICATIONS

International Search Report and Written Opinion received for PCT Application Serial No. PCT/US06/17797, dated Aug. 13, 2008, 13 pages.

(Continued)

*Primary Examiner* — Raheena R Malik
(74) *Attorney, Agent, or Firm* — Amin, Turocy & Watson, LLP

(57) ABSTRACT

A zone-control unit for use in a heating, ventilation, and air conditioning (HVAC) system, the zone-control unit includes a heat exchanger, an inlet piping assembly coupled with the heat exchanger for supplying fluid to the heat exchanger, an outlet piping assembly coupled with the heat exchanger for receiving fluid from the heat exchanger, a bracket that maintains the inlet piping assembly and the outlet piping assembly in positional relationship, and an ancillary component coupled with the heat exchanger.

22 Claims, 39 Drawing Sheets

Related U.S. Application Data continuation of application No. 15/493,777, filed on Apr. 21, 2017, now Pat. No. 10,767,893, which is a continuation of application No. 14/269,776, filed on May 5, 2014, now Pat. No. 9,694,452, which is a continuation of application No. 11/972,479, filed on Jan. 10, 2008, now Pat. No. 8,714,236, which is a continuation-in-part of application No. 10/092,933, filed on Mar. 6, 2002, now Pat. No. 7,478,761.

(60) Provisional application No. 60/884,366, filed on Jan. 10, 2007.

(51) Int. Cl.
| | | |
|---|---|---|
| *F16L 3/08* | (2006.01) | |
| *F24F 1/0063* | (2019.01) | |
| *F24F 1/26* | (2011.01) | |
| *F24F 5/00* | (2006.01) | |
| *F28F 9/00* | (2006.01) | |
| *F28F 9/02* | (2006.01) | |
| *F28F 27/02* | (2006.01) | |

(52) U.S. Cl.
CPC .............. *F24F 1/0063* (2019.02); *F24F 1/26* (2013.01); *F24F 5/0003* (2013.01); *F24F 13/0245* (2013.01); *F28F 9/002* (2013.01); *F28F 9/0246* (2013.01); *F28F 27/02* (2013.01); *B23P 2700/09* (2013.01); *F24F 2221/12* (2013.01); *F24F 2221/36* (2013.01); *Y10T 29/4935* (2015.01); *Y10T 29/49826* (2015.01)

(58) Field of Classification Search
CPC .... F24F 2221/12; F24F 2221/36; F28F 9/002; F28F 9/0246; F28F 27/02; F16L 3/08
See application file for complete search history.

(56) References Cited

U.S. PATENT DOCUMENTS

| | | | |
|---|---|---|---|
| 2,238,360 A | 4/1941 | Forster | |
| 2,268,360 A | 12/1941 | Walker | |
| 2,326,242 A | 8/1943 | Mayo | |
| 2,534,690 A | 12/1950 | Young, Jr. et al. | |
| 2,661,483 A | 12/1953 | Louis | |
| 2,824,312 A | 2/1958 | Louis | |
| 2,999,605 A | 9/1961 | De Jarnett | |
| 3,026,076 A | 3/1962 | Bender | |
| 3,182,717 A | 5/1965 | Pierce | |
| 3,199,815 A | 8/1965 | Steve et al. | |
| 3,216,025 A | 11/1965 | Roll | |
| 3,463,223 A | 8/1969 | Marino | |
| 3,653,590 A | 4/1972 | Elsea | |
| 3,706,125 A | 12/1972 | Hopkins | |
| 3,718,307 A | 2/1973 | Albanese | |
| 3,734,171 A | 5/1973 | Ares et al. | |
| 3,778,537 A | 12/1973 | Miller | |
| 3,784,141 A | 1/1974 | Rachlin et al. | |
| 3,884,438 A | 5/1975 | Logsdon | |
| 3,905,789 A | 9/1975 | Carpenter | |
| 4,099,630 A | 7/1978 | Beck | |
| 4,110,419 A | 8/1978 | Miller | |
| 4,123,012 A | 10/1978 | Hough | |
| 4,140,227 A | 2/1979 | Beck | |
| 4,163,372 A | 8/1979 | Frye et al. | |
| 4,172,496 A | 10/1979 | Melnyk | |
| 4,182,370 A | 1/1980 | Karcher | |
| 4,184,661 A | 1/1980 | Kushner et al. | |
| 4,193,563 A | 3/1980 | Vitale | |
| 4,195,732 A | 4/1980 | Bell | |
| 4,244,542 A | 1/1981 | Matthews | |
| 4,261,529 A | 4/1981 | Sandberg et al. | |
| 4,343,349 A | 8/1982 | Busch, Jr. | |
| 4,410,033 A | 10/1983 | Wawro et al. | |
| 4,428,318 A | 1/1984 | Huchzermeier | |
| 4,459,819 A | 7/1984 | Hargraves | |
| 4,473,107 A | 9/1984 | Fairbrother et al. | |
| 4,479,668 A | 10/1984 | Jacquet | |
| 4,500,480 A | 2/1985 | Cambio, Jr. | |
| 4,524,936 A | 6/1985 | Hurtubise | |
| 4,541,602 A | 9/1985 | Potzas | |
| 4,550,451 A | 11/1985 | Hubbard | |
| 4,550,891 A | 11/1985 | Schaty | |
| 4,560,125 A | 12/1985 | Hess | |
| 4,610,362 A | 9/1986 | Remp et al. | |
| 4,682,647 A | 7/1987 | Sleep | |
| 4,779,815 A | 10/1988 | Moore et al. | |
| 4,842,227 A | 6/1989 | Harrington et al. | |
| 4,957,251 A | 9/1990 | Hubbard | |
| 4,971,139 A * | 11/1990 | Khattar | F24F 12/002 165/96 |
| 4,977,750 A | 12/1990 | Metcalfe | |
| 4,993,670 A | 2/1991 | Tesar | |
| 5,005,636 A | 4/1991 | Haessig | |
| 5,016,843 A | 5/1991 | Ward | |
| 5,050,824 A | 9/1991 | Hubbard | |
| 5,120,073 A | 6/1992 | Sealy, Jr. | |
| 5,123,547 A | 6/1992 | Koch | |
| 5,138,134 A | 8/1992 | Ellison | |
| 5,168,894 A | 12/1992 | Desmarais | |
| 5,205,354 A | 4/1993 | Lesage | |
| 5,234,185 A | 8/1993 | Hoffman et al. | |
| 5,234,374 A | 8/1993 | Hyzyk et al. | |
| 5,248,119 A | 9/1993 | Imura | |
| 5,259,206 A | 11/1993 | Dankowski | |
| 5,278,740 A | 1/1994 | Agnelli | |
| 5,381,833 A | 1/1995 | Cummings et al. | |
| 5,417,243 A | 5/1995 | Ragona | |
| 5,446,677 A | 8/1995 | Jensen et al. | |
| 5,456,089 A | 10/1995 | O'Brien | |
| 5,458,241 A | 10/1995 | Brown | |
| 5,526,931 A | 6/1996 | White | |
| 5,551,630 A | 9/1996 | Enoki et al. | |
| 5,566,916 A | 10/1996 | Bailey | |
| 5,593,115 A | 1/1997 | Lewis | |
| 5,597,354 A | 1/1997 | Janu et al. | |
| 5,649,632 A | 7/1997 | Terashima et al. | |
| 5,689,880 A | 11/1997 | Petty | |
| 5,771,954 A | 6/1998 | Benner et al. | |
| 5,850,037 A | 12/1998 | Mullins | |
| 5,860,627 A | 1/1999 | Edwards | |
| 5,871,191 A | 2/1999 | Cohn | |
| 5,876,000 A | 3/1999 | Ismert | |
| 5,986,562 A | 11/1999 | Nikolich | |
| 6,070,659 A | 6/2000 | Hosoya | |
| 6,079,626 A | 6/2000 | Hartman | |
| 6,119,861 A | 9/2000 | Schneider | |
| 6,125,646 A | 10/2000 | Ebner | |
| 6,132,309 A | 10/2000 | Panelli et al. | |
| 6,135,381 A | 10/2000 | Teson | |
| 6,142,405 A | 11/2000 | Black | |
| 6,170,784 B1 | 1/2001 | MacDonald et al. | |
| 6,196,624 B1 | 3/2001 | Bierjon et al. | |
| 6,199,396 B1 | 3/2001 | Aizawa | |
| 6,227,961 B1 | 5/2001 | Moore et al. | |
| 6,352,224 B1 | 3/2002 | Collins | |
| 6,357,243 B1 | 3/2002 | Efron et al. | |
| 6,375,017 B1 | 4/2002 | Schattner et al. | |
| 6,385,510 B1 | 5/2002 | Hoog et al. | |
| 6,409,223 B1 | 6/2002 | Bartholoma | |
| 6,464,182 B1 | 10/2002 | Snyder | |
| 6,467,734 B1 | 10/2002 | Brown et al. | |
| 6,470,961 B1 | 10/2002 | Case | |
| D468,269 S | 1/2003 | Hwang | |
| 6,536,516 B2 | 3/2003 | Davies et al. | |
| 6,554,237 B1 | 4/2003 | Weber et al. | |
| 6,571,572 B2 | 6/2003 | Hobbs et al. | |
| 6,578,319 B1 | 6/2003 | Cole et al. | |
| 6,609,558 B1 | 8/2003 | Charbonnelle | |
| 6,648,089 B1 | 11/2003 | Wooldridge et al. | |
| 6,684,937 B2 | 2/2004 | Lenz et al. | |

(56) References Cited

U.S. PATENT DOCUMENTS

| | | | |
|---|---|---|---|
| 6,796,335 | B1 | 9/2004 | Hubbard et al. |
| D490,690 | S | 10/2004 | Brass et al. |
| 6,866,579 | B2 | 3/2005 | Pilger |
| 6,868,293 | B1 | 3/2005 | Schurr et al. |
| 6,951,324 | B2 | 10/2005 | Karamanos |
| 6,997,390 | B2 | 2/2006 | Alles |
| 7,092,794 | B1 | 8/2006 | Hill et al. |
| 7,140,236 | B2 | 11/2006 | Karamanos |
| 7,165,797 | B2 | 1/2007 | Karamanos |
| 7,243,004 | B2 | 7/2007 | Shah et al. |
| 7,274,973 | B2 | 9/2007 | Nichols et al. |
| 7,343,226 | B2 | 3/2008 | Ehlers et al. |
| 7,370,690 | B2 | 5/2008 | Resset et al. |
| 7,387,013 | B2 | 6/2008 | Karamanos |
| 7,444,731 | B2 | 11/2008 | Karamanos |
| 7,478,761 | B2 | 1/2009 | Karamanos et al. |
| 7,479,761 | B2 | 1/2009 | Okumura |
| 7,537,183 | B2 | 5/2009 | Karamanos |
| 7,596,962 | B2 | 10/2009 | Karamanos |
| 7,856,865 | B2 | 12/2010 | Karamanos |
| 7,937,820 | B2 | 5/2011 | Karamanos |
| 8,146,377 | B2 | 4/2012 | Karamanos |
| 8,596,083 | B2 | 12/2013 | Karamanos |
| 8,714,236 | B2 | 5/2014 | Karamanos |
| 2001/0039964 | A1 | 11/2001 | Gul |
| 2002/0080032 | A1 | 6/2002 | Smith et al. |
| 2002/0088273 | A1 | 7/2002 | Harness et al. |
| 2003/0050871 | A1 | 3/2003 | Broughton |
| 2003/0085022 | A1 | 5/2003 | Viso |
| 2003/0085023 | A1 | 5/2003 | Viso |
| 2003/0171092 | A1 | 9/2003 | Karamanos |
| 2003/0222185 | A1 | 12/2003 | Rubenstein et al. |
| 2004/0096790 | A1 | 5/2004 | Querejeta et al. |
| 2004/0159110 | A1 | 8/2004 | Janssen |
| 2004/0253918 | A1 | 12/2004 | Ezell et al. |
| 2005/0039470 | A1 | 2/2005 | Laing et al. |
| 2005/0056752 | A1 | 3/2005 | Karamanos |
| 2005/0056753 | A1 | 3/2005 | Karamanos |
| 2005/0119196 | A1 | 12/2005 | Karamanos |
| 2006/0249589 | A1 | 11/2006 | Karamanos |
| 2006/0287774 | A1 | 12/2006 | Yoon et al. |
| 2007/0108352 | A1 | 5/2007 | Karamanos |
| 2007/0262162 | A1 | 11/2007 | Karamanos |
| 2008/0164006 | A1 | 7/2008 | Karamanos |
| 2008/0195254 | A1 | 8/2008 | Jung et al. |
| 2009/0012650 | A1 | 1/2009 | Wang et al. |
| 2009/0057499 | A1 | 3/2009 | Karamanos |
| 2009/0062964 | A1 | 3/2009 | Sullivan et al. |
| 2010/0252641 | A1 | 10/2010 | Karamanos |
| 2010/0307733 | A1 | 12/2010 | Karamanos et al. |
| 2011/0155354 | A1 | 6/2011 | Karamanos et al. |
| 2012/0168113 | A1 | 7/2012 | Karamanos |
| 2012/0186289 | A1 | 7/2012 | Karamanos |

FOREIGN PATENT DOCUMENTS

| | | | |
|---|---|---|---|
| JP | H02-035326 | A | 2/1990 |
| JP | H03-221773 | A | 9/1991 |
| JP | H04-363695 | A | 12/1992 |
| JP | H04-363965 | B2 | 12/1992 |
| JP | H05-042818 | A | 2/1993 |
| JP | H07-055195 | A | 3/1995 |
| JP | H0-8005092 | A | 1/1996 |
| JP | H08-189717 | A | 7/1996 |
| JP | 2000-046375 | A | 2/2000 |
| JP | 2001-004199 | A | 1/2001 |
| WO | 2005/119196 | A2 | 12/2005 |

OTHER PUBLICATIONS

Non Final Office Action received for U.S. Appl. No. 11/972,479, dated Jun. 21, 2012, 24 pages.
Final Office Action received for U.S. Appl. No. 11/972,479, dated Dec. 26, 2012, 9 pages.
Non Final Office Action received for U.S. Appl. No. 11/972,479, dated May 2, 2013, 10 pages.
Final Office Action received for U.S. Appl. No. 11/972,479, dated Nov. 7, 2013, 11 pages.
Notice of Allowance received for U.S. Appl. No. 11/972,479, dated Dec. 20, 2013, 31 pages.
Non Final Office Action received for U.S. Appl. No. 13/416,131, dated May 2, 2013, 16 pages.
Final Office Action received for U.S. Appl. No. 13/416,131, dated Dec. 6, 2013, 40 pages.
Non Final Office Action received for U.S. Appl. No. 14/269,776, dated Mar. 25, 2016, 17 pages.
Non Final Office Action received for U.S. Appl. No. 10/092,933, dated Apr. 4, 2003, 5 pages.
Non Final Office Action received for U.S. Appl. No. 10/092,933, dated Nov. 17, 2003, 11 pages.
Non Final Office Action received for U.S. Appl. No. 10/092,933, dated Dec. 11, 2006, 9 pages.
Non Final Office Action received for U.S. Appl. No. 10/092,933, dated Jan. 14, 2008, 8 pages.
Final Office Action received for U.S. Appl. No. 10/092,933, dated Mar. 28, 2006, 8 pages.
Non Final Office Action received for U.S. Appl. No. 10/092,933, dated Jun. 24, 2005, 6 pages.
Non Final Office Action received for U.S. Appl. No. 10/092,933, dated Jan. 19, 2005, 7 pages.
Canadian Office Action received for CA Patent Application Serial No. 2711802, dated Mar. 5, 2015, 3 pages.
Canadian Office Action received for CA Patent Application Serial No. 2711802, dated Jul. 30, 2014, 2 pages.
Canadian Office Action received for CA Patent Application Serial No. 2711802, dated Nov. 6, 2013, 2 pages.
Non Final Office Action received for U.S. Appl. No. 14/984,405, dated May 5, 2017, 10 pages.
Non Final Office Action received for U.S. Appl. No. 15/493,777, dated Jul. 6, 2017, 12 pages.
Final Office Action received for U.S. Appl. No. 15/493,777, dated Jan. 19, 2018, 27 pages.
Non Final Office Action received for U.S. Appl. No. 15/493,777, dated Jun. 15, 2018, 13 pages.
Final Office Action received for U.S. Appl. No. 15/493,777, dated Feb. 7, 2019, 19 pages.
Non-Final Office Action received for U.S. Appl. No. 15/493,777, dated Oct. 3, 2019, 13 pages.
Final Office Action received for U.S. Appl. No. 15/493,777, dated Jan. 16, 2020, 19 pages.
Notice of Allowance received for U.S. Appl. No. 15/493,777, dated May 1, 2020, 20 pages.
Non Final Office Action received for U.S. Appl. No. 11/429,418, dated Dec. 3, 2008, 22 pages.
Canadian Office Action received for CA Patent Application Serial No. 2569253, dated May 11, 2012, 10 pages.
Canadian Office Action received for CA Patent Application Serial No. 2569253, dated Mar. 26, 2013, 6 pages.
Canadian Office Action received for CA Patent Application Serial No. 2569253, dated Mar. 4, 2014, 11 pages.
Canadian Office Action received for CA Patent Application No. 02772766, dated May 18, 2018, 4 pages.
Canadian Office Action received for CA Patent Application No. 02772766, dated Jan. 14, 2019, 5 pages.
Non Final Office Action received for U.S. Appl. No. 16/935,776 dated Feb. 16, 2022, 35 pages.
Non Final Office Action received for U.S. Appl. No. 16/935,776 dated Aug. 25, 2022, 16 pages.
Final Office Action received for U.S. Appl. No. 16/935,776, dated Mar. 10, 2023, 20 pages.
Notice of Allowance received for U.S. Appl. No. 16/935,776, dated Aug. 1, 2023, 22 pages.
Notice of Allowance received for U.S. Appl. No. 14/269,776, dated Dec. 29, 2016, 31 pages.
United States District Court for the District of California—Oakland Division under Civil Action No. 4:15-cv-02934 by HVAC Technology LLC against Southland Industries, 0 pages.

(56) References Cited

OTHER PUBLICATIONS

Notice of Allowance received for U.S. Appl. No. 14/984,405, dated Sep. 15, 2017, 26 pages.
Notice of Allowance received for U.S. Appl. No. 14/984,405, dated Sep. 29, 2017, 5 pages.

* cited by examiner

FIG.1

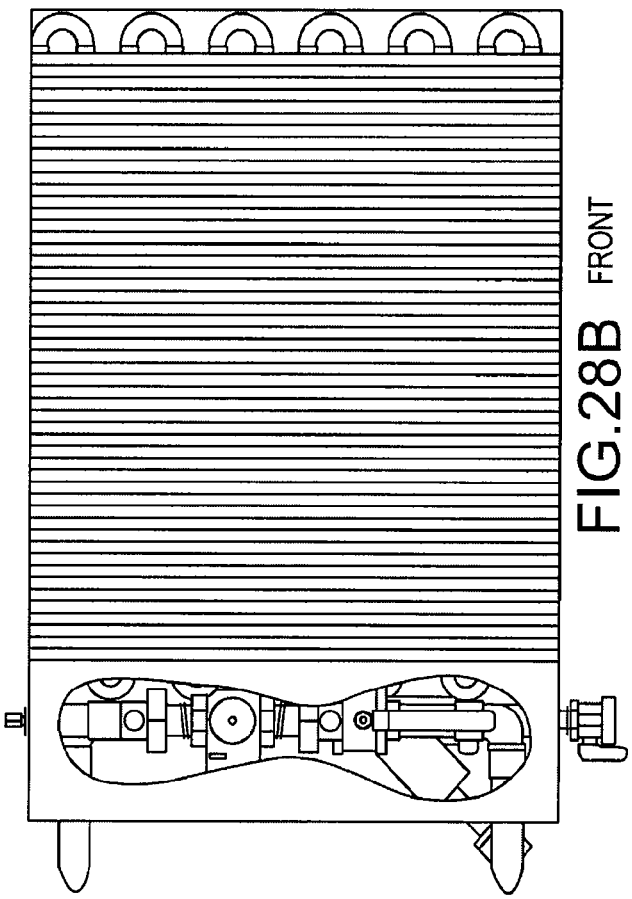
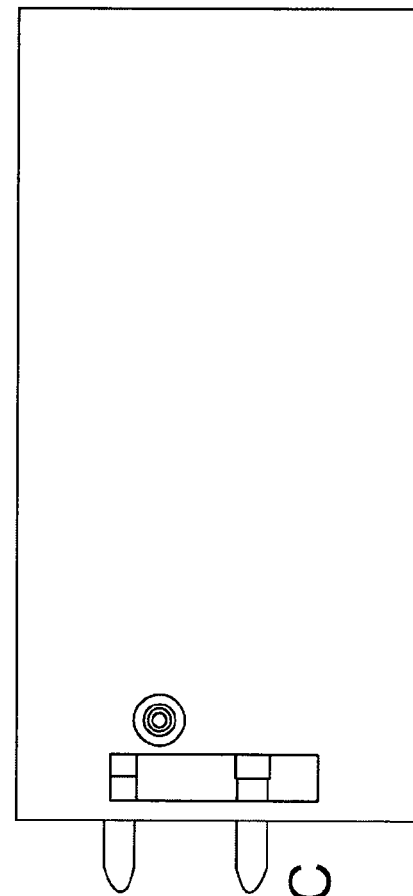
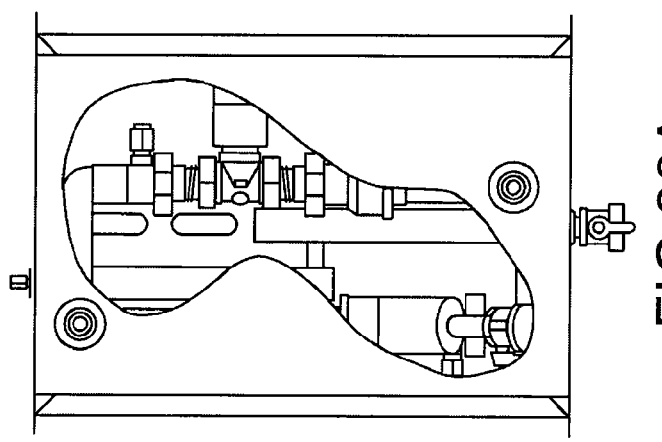
FIG.28B FRONT
FIG.28C TOP
FIG.28A SIDE

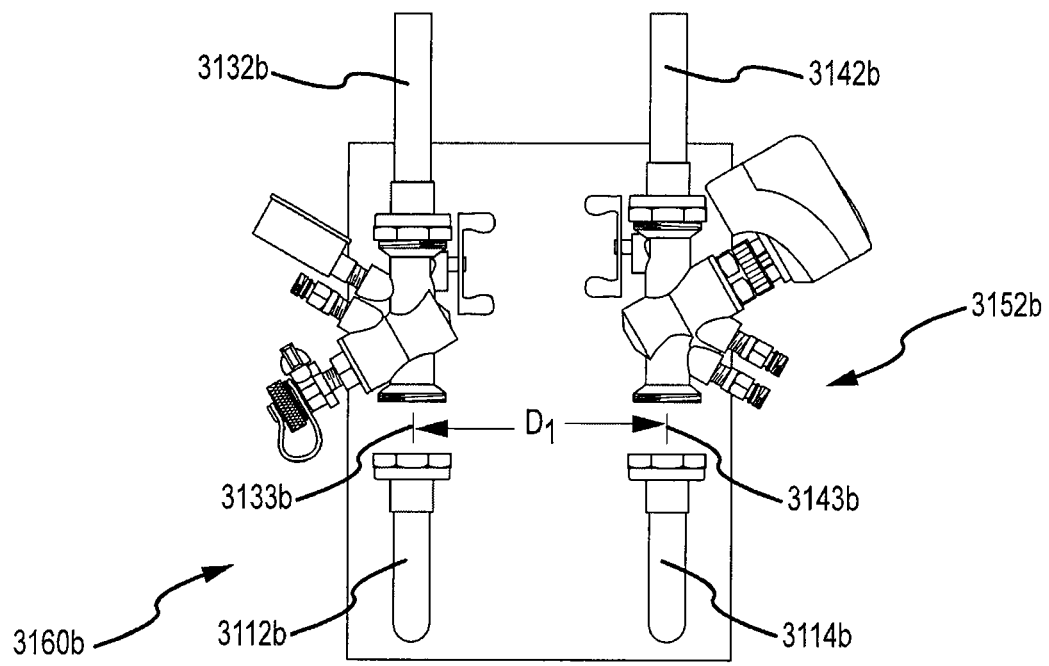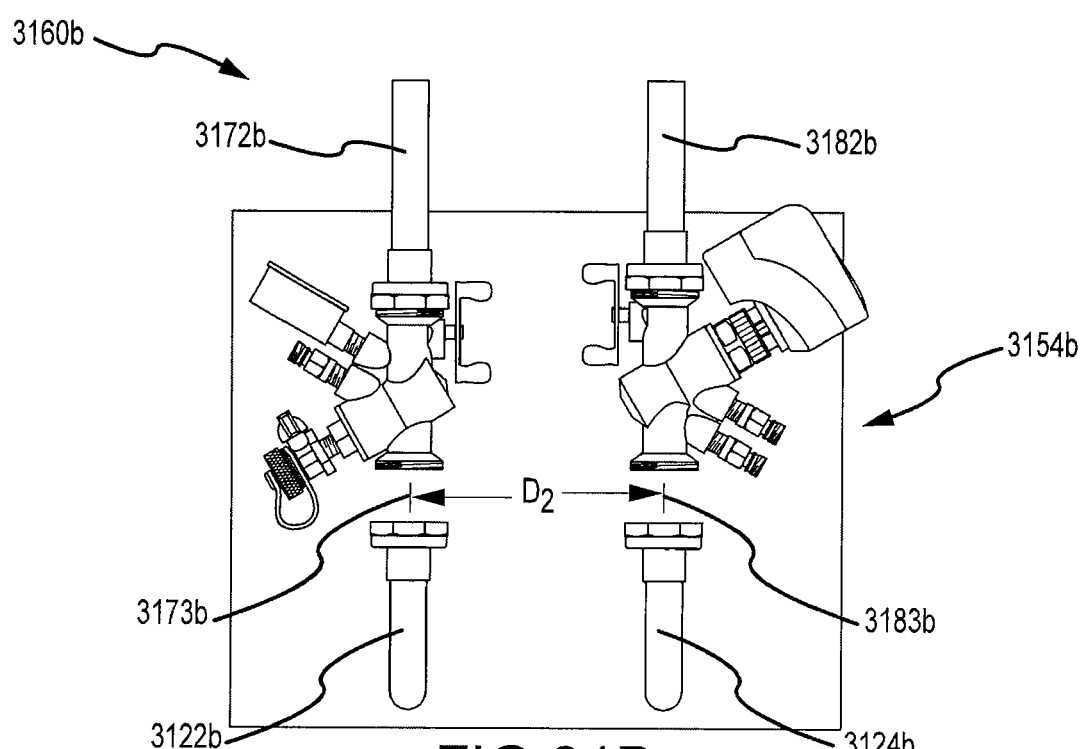
FIG.31B

PRE-PIPED THERMAL TRANSFER UNIT WITH SUPPORT MECHANISM

CROSS-REFERENCE TO RELATED APPLICATIONS

This application is a continuation of, and claims priority to each of, U.S. patent application Ser. No. 15/493,777, now U.S. Pat. No. 10,767,893, filed Apr. 21, 2017, which is a continuation of U.S. patent application Ser. No. 14/269,776, now U.S. Pat. No. 9,694,452, filed May 5, 2014, which is a continuation of U.S. patent application Ser. No. 11/972,479, now U.S. Pat. No. 8,714,236, filed Jan. 10, 2008, which is a nonprovisional of, and claims the benefit of priority from, U.S. patent application Ser. No. 60/884,366, filed Jan. 10, 2007. The entireties of the above applications are incorporated in their entirety herein by reference. The entire contents of each of the above-noted applications and their priority filings are incorporated herein by reference for all purposes.

BACKGROUND OF THE INVENTION

Embodiments of the present invention relate to integrated heating, ventilation, and air conditioning (HVAC) systems and methods, and in particular to approaches that include embedded coils and other heat exchangers.

In general, HVAC systems control the temperature and humidity of indoor air. In most HVAC systems, air is drawn in, filtered, cooled and dehumidified or heated and humidified, and then delivered to an air conditioned space. The greatest portion of incoming air is drawn from the air conditioned space for recirculation through the HVAC system. HVAC system includes fans and ductwork for moving conditioned air to where it is needed while passing it through cooling and/or a heating sections of the ductwork.

HVAC systems in residential, commercial, education and research buildings usually include metallic pipes, hollow composite materials such as tubes, and the like. The systems are typically supported from and between floor or ceiling joists. The HVAC system typically includes a primary or main duct. A series of smaller branch ducts which extend from the main duct are mounted between adjacent floor or ceiling joists. Such main and branch ducts are normally supported by metal hangers located between the joists. Often the branch ducts include pipes and conduit lines for transporting liquid or gases which are suspended from ceiling joists or an adjacent wall typically with Unistrut®, threaded rod, couplings, and various hanger brackets.

Piping and conduits that supply gas and/or liquids within buildings benefit from careful preparation. Builders or contractors typically use ladders or scaffolding to reach areas where piping is routed so installation may be cumbersome. Occasionally the pipe or conduits are prepared on the ground and installed by ladder as more complete assemblies. Pipe and conduit assemblies prepared on the ground or a floor of a building under construction are more unwieldy than the unassembled components, but pre-assembly is often more practical. Furthermore, conditions existing at construction sites and the number of differing types of components used in assembling a HVAC system render cataloging known HVAC components a challenge.

Generically, a terminal unit, also sometimes referred to as an air handling unit, is a HVAC system component that is located near an air conditioned space that regulates the temperature and/or volume of air supplied to the space. When providing air to a more critical environment such as a laboratory, an almost identical ductwork section is frequently referred to as a lab valve damper rather than as a terminal unit, with the distinction generally relating to the precision with which the unit controls the temperature and humidity of conditioned air. As used throughout this document, the phrase terminal unit encompasses either a terminal unit or a lab valve damper.

A HVAC system may be assembled using any one of several different types of terminal units. Generally, the mechanical portion of a terminal unit includes a casing through which air flows during operation of a HVAC system. Accordingly, the casing includes an inlet for receiving air from ductwork of a HYAC system, and an outlet for supplying air to a space in a building. Casings are usually fabricated from 22 gauge galvanized sheet steel. Due to the use of such light material, casings are easily damaged during shipping to a building site and during installation into the HVAC system. Those familiar with such damage to terminal unit casings frequently refer to it as "oil canning" because it resembles how a light gauge oil can collapses as the liquid flows out.

In a typical hydronic (all-water) HVAC system, the mechanical portion of a terminal unit includes a heat exchanging coil. Heated and/or cooled water is pumped from a central plant through pipes to the coil. Air from the HVAC system's ductwork passes through the coil after entering and before leaving the casing. Usually, a single terminal unit is dedicated for heating and/or cooling each air conditioned space. Air from the duct connected to the terminal unit passes through the coil to be heated and/or cooled by water flowing through the coil before the air enters the air conditioned space.

A Variable Air Volume ("VAV") HVAC system, in response to a control signal from a thermostat or room sensor, supplies only that volume of hot and/or cold air to an air conditioned space needed to satisfy the space's thermal load. A VAV HVAC system meets changing cooling and/or heating requirements by adjusting the amount, rather than the temperature, of air that flows to a space. For most buildings, a VAV HVAC system yields the best combination of comfort, first cost, and life cycle cost.

An AV terminal unit is a relatively complex assembly which includes sheet metal, plumbing, electrical and pneumatic components. For example, a VAV terminal unit includes an airflow sensor that senses the velocity of air entering the terminal unit. To adjust the volume of cold air, a VAV terminal unit frequently includes a damper which automatically opens and closes as needed.

As a thermal load of a space decreases, the damper starts closing thereby reducing the amount of heated or cooled air supplied to the space. Alternatively, the volume of air entering a space may be controlled by varying the speed of a fan included in the terminal unit. For either type of VAV terminal unit, VAV HVAC systems save energy consumed by fans in comparison with alternative HVAC systems by continually adjusting airflow to the heating and/or cooling required.

To be operable and fully-functional, terminal units for a hydronic HVAC system often include a coil, ductwork for supplying air to the coil and receiving air from the coil, plumbing for supplying water into and receiving water from the coil, and a control valve for regulating the amount of water flowing through the coil.

To match the flow of air through the terminal unit's ductwork to the profile of the coil, the terminal unit's ductwork may include transition sections both for air entering the coil and for air leaving the coil. In addition, a terminal unit may also include a re-heat coil, and/or a sound attenuator. In a terminal unit adapted for use in a VAV HVAC system, the terminal unit's ductwork may also include a damper and a damper actuator or variable speed fan for controlling the volume of air supplied by the terminal unit, and an airflow sensor for sensing the volume of air passing through the terminal unit.

Usually, all of the various parts needed to assemble a fully-functional VAV HVAC system's terminal unit arrive at building construction sites as separate components. Generally, these components are then assembled into a fully functional terminal unit at the construction site. Due to cluttered working conditions usually existing at a construction site where workers skilled in different crafts, e.g. plumbing, electrical, structural, etc., must concurrently collaborate to complete the building project, assembling the various components into a fully functional terminal unit may occupy the better part of a day. Furthermore, present practices and equipment are poorly adapted for swiftly constructing a high quality HVAC system that is easily commissioned.

For example, because it is less expensive to wire a HVAC system's terminal units with 24 volt low voltage electrical power rather than 220 or 110 volt power, presently sections of buildings include transformer trees which an electrician generally assembles by installing multiple step down transformers on an electrical panel. This technique permits wiring 220 or 110 volt electrical power to the transformer tree on each panel, with the 24 volt low voltage electrical power then being wired individually from a transformer on the panel over distances of five (5) to one hundred (100) feet to a terminal units for energizing its Direct Digital Control ("DDC") controller, and 2 way or 3 way automatic temperature control ("ATC") control valve.

Usually, terminal units are supported from a building using angle brackets, straps, or thread rod. Usually these support devices are attached directly to the terminal unit. Terminal unit casings are usually made using 22 gauge sheet metal. Due to the use of this light material, casings are easily dented or bent during installation.

With current construction site labor costing up to $80.00/hour or more, assembling a terminal unit at a construction site may cost $500.00 to $1,000.00 for labor alone. Furthermore, terminal units assembled at a construction site generally differ from one another due to assembly by different craftsmen, and insufficient use of identical components in assembling each terminal unit. Due to conditions existing at construction sites and the number of differing types of components used in assembling a HVAC system, cataloging the components used in assembling the system is impractical. Lastly, construction sites generally lack any facilities for individually pre-testing building components, such as terminal units, assembled on-site.

After assembling a HVAC system, it should be activated, tested and commissioned to ensure TAQ. Testing a HVAC system only after it is completely assembled inevitably results in many hours of problem-solving and leak-hunting. Usually, there are leaky joints, broken valves, damaged pipes, leaky coils and improperly assembled components that must be tracked down which further increases building costs. After finding a faulty component, it must be identified, ordered and replaced which takes time and delays completion of the building project. Furthermore, years after a building project is complete to maintain IAQ a building manager responsible for the HVAC system's maintenance will often have to identify and replace broken components.

The preceding considerations arising from construction site assembly of fully functional terminal units slows construction, increase building costs, requires rework when a terminal unit experiences an initial failure, and ultimately makes more difficult and expensive maintaining a building's HVAC system years after those responsible for its assembly are no longer available.

Current techniques for implementing HVAC systems often required ancillary components such as flow controls, ATC valves, and the like to be added to HVAC piping structures in the field or at a jobsite construction location. Relatedly, such ancillary components, piping structures, and the like may be susceptible to damage during transport. What is needed are improved HVAC systems and methods that allow HVAC components to be configured prior to shipping, and to be shipped without risk of damage. Embodiments of the present invention provide solutions for at least some of these needs.

BRIEF SUMMARY OF THE INVENTION

Embodiments of the present invention allow such ancillary components to be attached with piping structures in a factory setting, prior to shipment to the installation site. Accordingly, these enhanced and improved techniques are well suited for protecting ancillary HVAC system components from damage when they are attached with a piping structure during transport. These protective features avoid the situation where a mechanical contractor be compelled to charge a manufacturer due to damage incurred during shipping. Moreover, these techniques are very cost effective, as the pre-piping often does not have to comply with union work requirements. Embodiments of the present invention provide efficient solutions to situations where, depending on job specifications, various piping arrangements and components may be needed on one project but not on another. Still further, labor performed in the field is typically not depreciable. By providing techniques that can be performed in the factory setting, coils and other ancillary components can be considered capital equipment, which renders them amenable to lease paybacks, lease financing, and the like.

Bracket embodiments of the present invention may be configured with or without a handle. In some cases, a bracket provides a protective plane whereby damage to HVAC ancillary components is avoided during shipping, handling, and transport. For example, a bracket may include a portion that extends a certain distance, such as two to six inches, beyond a grommet or aperture, such that the bracket forms a plane or support barrier which prevents unwanted forces from impacting on a piping structure during transport. Another way of protecting the portable piping structure is to build or provide a removable box around the coil and the portable piping structure. Such protective features make it possible to embed valves, fittings, controls, sensors, processors, actuators, microchips, algorithmic devices, and other ancillary components on a coil or heat exchanger prior to shipping. Exemplary components also include digital devices, analog devices, and digital/analog combination devices. Embodiments of the present invention can be used for or otherwise integrate VAV boxes, fan coil units, air handling units, or any heating or cooling system or subsystem thereof. Any of a variety of HVAC ancillary components can be integrated with or embedded onto a coil or heat exchanger prior to shipping. Accordingly, these components can be installed on or coupled with a coil or piping assembly in a factory setting, and can avoid sustaining damage during subsequent transport to a job installation site. In some cases, the components may be coupled with the coil or heat exchanger. Similarly, the components may be coupled with an input piping that attaches with the coil or heat exchanger, or with an output piping that attaches with the coil or heat exchanger. Relatedly, ancillary components may be coupled with one or more brackets that are coupled with an input piping, or an output piping, or both.

In some embodiments, ancillary components may be embedded on a coil, and the assembly may not include a zone control unit. For example, a leaving air temperature sensor can be coupled with a coil or a pipe. The coil and piping assembly may also include a damper with a pickup sensor, a pressure sensor, and the like. Sensors may be coupled with a controller, such as a DDC controller, via a wired or wireless connection. The damper can be installed upstream of the coil, and scaled. In an illustrative example, the desired ambient air temperature in a room is 70 degrees and a thermostat can be set accordingly. If the leaving air temperature sensor detects air having a temperature of 69 degrees, an output signal can be sent to the controller, and the controller may send a signal to a valve or actuator so that warmer air is provided to the room. If or when the leaving air temperature sensor detects air having a temperature greater than 70 degrees, the output signal causes the controller to adjust the actuator accordingly, so as to reduce the air temperature of the room. Feedback loops or systems can be incorporated into a building, a room, a subset or rooms, and the like. Control mechanisms can provide for accurate and efficient temperature control of a building or structure, and can accommodate for doors and windows opening and closing within the building. These objectives can be achieved with a system that does not include a balancing valve.

In some current methods, when a worker needs to couple a coil with a duct box or other ancillary component it is necessary to perform this procedure at the actual jobsite, and the components have to be installed in situ within the confines of building structure or the existing HVAC system as it was built. Relatedly, in many current methods, an ancillary component cannot be attached with a piping structure or coil prior to transport, due to concerns that the assembly would be damaged during transport. Consequently, conventional wisdom is that coils are typically required to be piped in the field. Advantageously, embodiments of the present invention allow a manufacturer or other entity to pre-pipe, pre-wire, pre-program, or otherwise pre-fabricate a coil or a heat exchanger with any desired ancillary component or piping assembly in a factory setting, prior to transport to a construction site. Accordingly, it is possible to test, calibrate, preset, tune, or otherwise evaluate or control any aspect of a coil assembly in the factory setting or in a centralized location. Such approaches provide a significant savings in labor and installation time. Moreover, it may not be necessary to balance or adjust a coil or ancillary components when they are installed in the field.

Still further, embodiments of the present invention therefore provide for self-balancing control of an HVAC system. In other words, a coil assembly may not include a balancing element, but instead may include an embedded ATC valve, for example. The ATC can be coupled with a controller. In some cases, balancing elements can introduce additional pressure into an HVAC system, and therefore the system may require more horsepower for operation. By eliminating the need for a balancing element, it is possible to provide a system that has a lower energy requirement. Accordingly, the system may qualify for LEED points or an improved LEED rating (e.g. Leadership in Energy and Environmental Design Green Building Rating System™).

In one aspect, embodiments of the present invention provide a zone-control unit for use in a heating, ventilation, and air conditioning (HVAC) system. The zone-control unit includes a heat exchanger, an inlet piping assembly coupled with the heat exchanger for supplying fluid to the heat exchanger, an outlet piping assembly coupled with the heat exchanger for receiving fluid from the heat exchanger, a bracket that maintains the inlet piping assembly and the outlet piping assembly in positional relationship, and an ancillary component coupled with the heat exchanger.

In some cases, the ancillary component includes a direct digital control (DDC) controller. The ancillary component may be coupled with the heat exchanger. Optionally, the ancillary component may be coupled with the bracket. In some cases, the heat exchanger, the inlet piping, and the outlet piping form a closed and sealed system. The heat exchanger, the inlet piping, and the outlet piping may contain a pressurized fluid.

Embodiments of the present invention encompass zone-control units for use in a heating, ventilation, and air conditioning (HVAC) system. A zone-control unit may include a casing, a coil disposed at least partially within the casing, an inlet piping assembly coupled with the coil for supplying fluid to the coil, an outlet piping assembly coupled with the coil for receiving fluid from the coil, and a bracket that maintains the casing, the inlet piping assembly, and the outlet piping assembly in positional relationship. The zone-control unit may also include an ancillary component coupled with the coil, the bracket, or the casing. In some cases, the ancillary component includes a direct digital control (DDC) controller. The ancillary component may be coupled with the coil. Optionally, the ancillary component may be coupled with the bracket. In some cases, the ancillary component is coupled with the casing. The coil, the inlet piping, and the outlet piping may form a closed and sealed system. The coil, the inlet piping, and the outlet piping may contain a pressurized fluid.

Embodiments of the present invention also include methods of manufacturing a plurality of portable piping structures. Exemplary methods include providing a first heat exchange coil having a first dimension, providing a second heat exchange coil having a second dimension, coupling a first inlet piping assembly and a first outlet piping assembly with the first heat exchange coil to provide a first portable piping structure of the plurality of portable piping structures, and coupling a second inlet piping assembly and a second outlet piping assembly with the second heat exchange coil to provide a second portable piping structure of the plurality of portable piping structures. Methods may also include coupling a first bracket with the first inlet piping assembly and the first outlet piping assembly, where the first bracket provides a known spacing distance between a central longitudinal axis defined by the first inlet piping assembly and a central longitudinal axis defined by the first outlet piping assembly. Methods may also include coupling a second bracket with the second inlet piping assembly and the second outlet piping assembly, where the second bracket provides the known spacing distance between a central longitudinal axis defined by the second inlet piping assembly and a central longitudinal axis defined by the second outlet piping assembly.

According to some embodiments, methods may include coupling a first ancillary component with the first heat exchange coil of the first portable piping structure, and coupling a second ancillary component with the second heat exchange coil of the second portable piping structure. According to some embodiments, the first ancillary component may include a first direct digital control (DDC) controller and the second ancillary component may include a second direct digital control (DDC) controller. Optionally, methods may include coupling a first ancillary component with the first bracket, and coupling a second ancillary component with the second bracket. Further, methods may include coupling a first ancillary component with the first inlet piping assembly, and coupling a second ancillary component with the second inlet piping assembly. Still further, methods may include coupling a first ancillary component with the first outlet piping assembly, and coupling a second ancillary component with the second outlet piping assembly. According to some embodiments, methods may include sealing the first inlet piping assembly and the first outlet piping assembly such that the first portable piping structure comprises a sealed and closed system, and sealing the second inlet piping assembly and the second outlet piping assembly such that the second portable piping structure comprises a sealed and closed system.

The methods and apparatuses of the present invention may be provided in one or more kits for such use. For example, the kits may comprise a system for use in an HVAC system. Optionally, such kits may further include any of the other system components described in relation to the present invention and any other materials or items relevant to the present invention. The instructions for use can set forth any of the methods as described herein. It is further understood that systems according to the present invention may be configured to carry out any of the method steps described herein.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective view of an fully-functional zone-control unit ready for installation in a HVAC system which includes a zone-control unit having a casing from which a pair of handles project for supporting inlet and outlet piping assemblies included in the fully-functional zone-control unit, according to one embodiment of the present invention.

FIGS. 28A-28C illustrate various views of an HVAC unit assembly according to embodiments of the present invention.

FIGS. 31A-31F illustrate aspects of portable piping assemblies according to embodiments of the present invention.

DETAILED DESCRIPTION OF THE INVENTION

Figure 1:
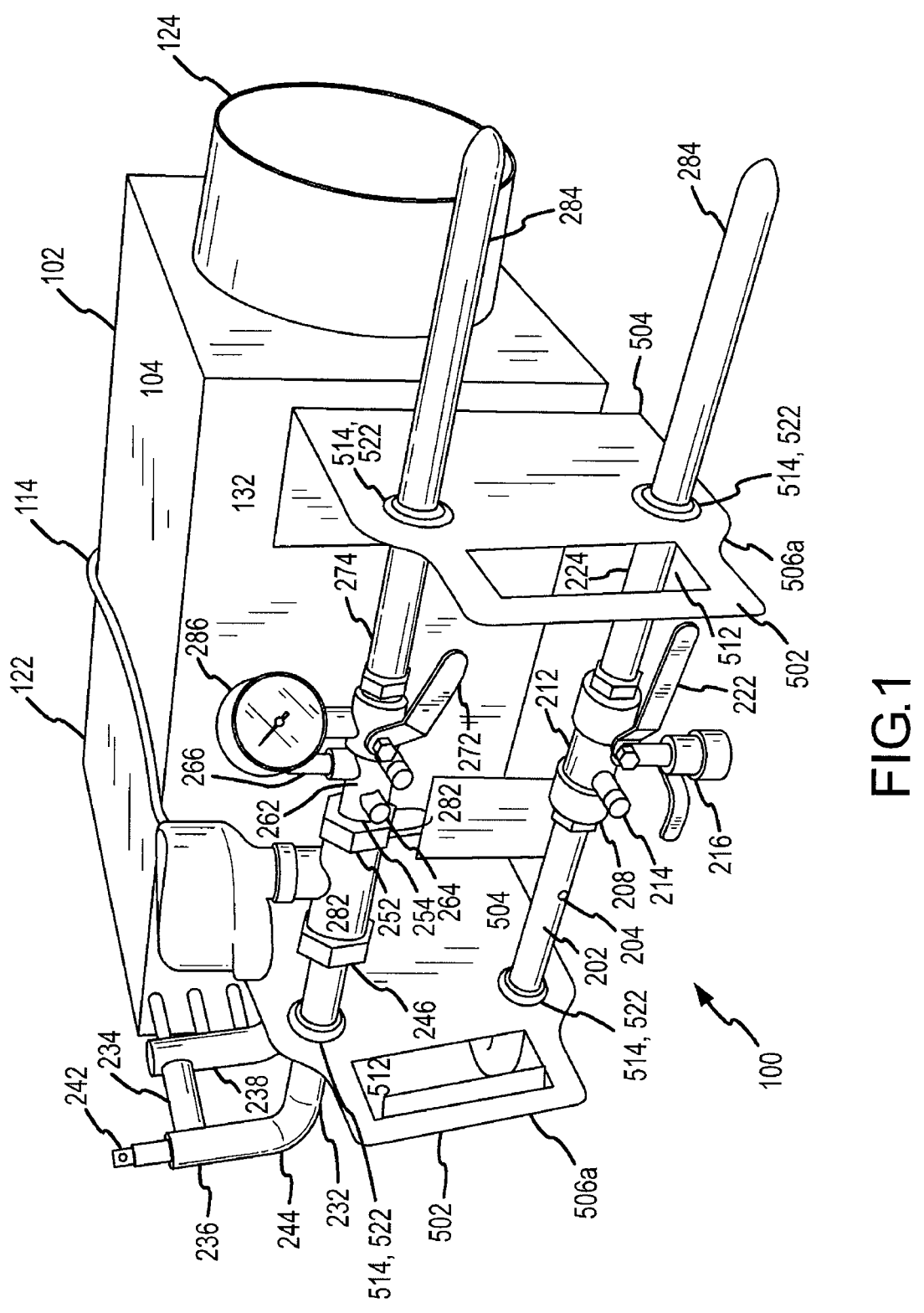
Figure 2:
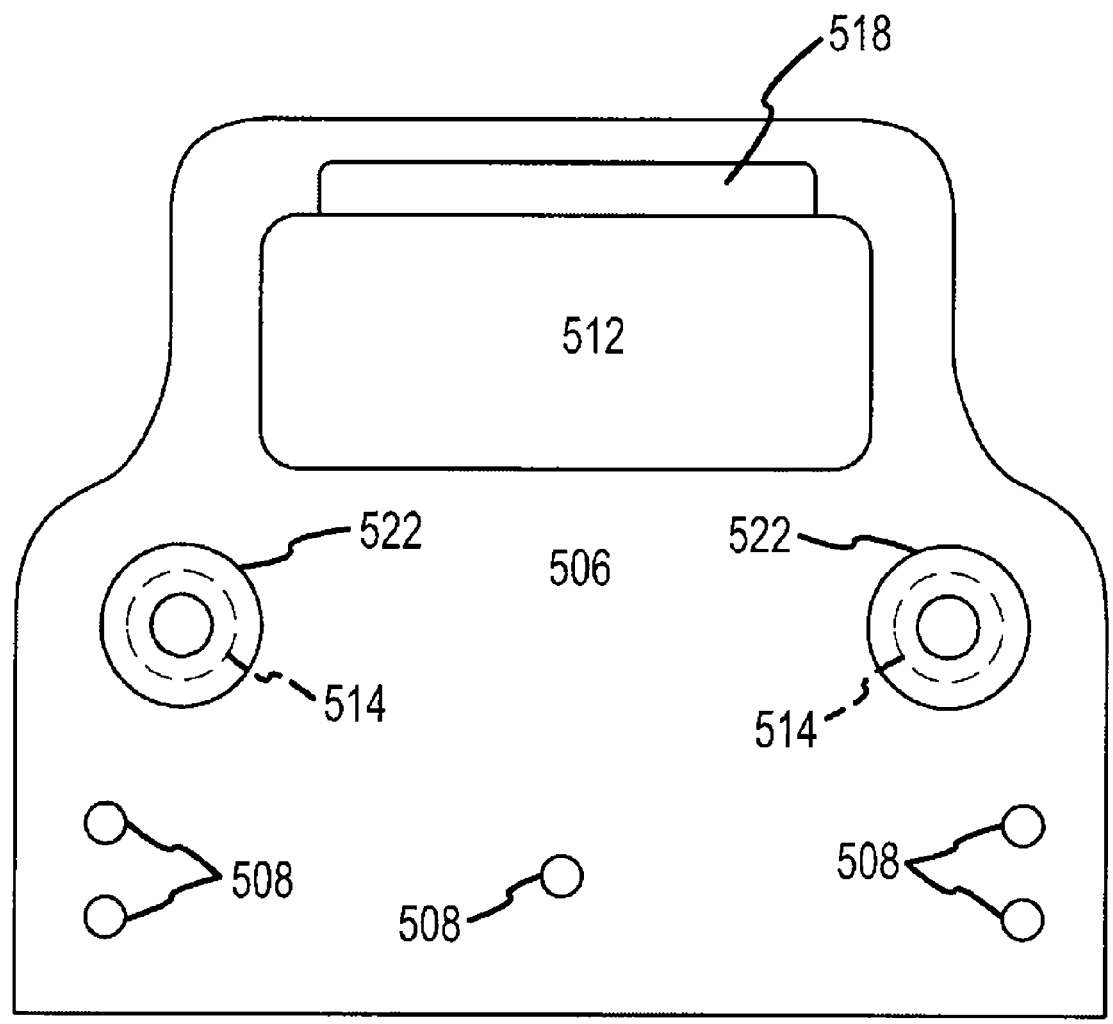
FIG. 2 is an elevation view of a plate that is included in the handles illustrated in FIG. 1 which project from the zone-control unit's casing and support the piping assemblies, according to one embodiment of the present invention.

The perspective view of FIG. 1 illustrates a fully-functional HVAC terminal unit referred to by the general reference character 100. The fully-functional zone-control unit 100 depicted in FIG. 1, which illustrates one embodiment of the present invention, preferably includes a mechanical terminal unit 102 having a casing 104 visible in FIG. 1. The casing 104, which can be made from various materials of differing thicknesses, is frequently made from galvanized sheet steel material. Frequently, the casing 104 is lined with a thermal insulation material, not visible in FIG. 1, which may be chosen from various different types such as fiberglass insulation, rigid duct board fiber insulation, polyolefin, closed cell, foam insulation, etc. In some embodiments, insulation contained in zone-control unit 100 complies with an industry standard, such as a standard set by the Office of Statewide Health and Planning Department (OSHPOD).

For VAV zone-control units 100, the mechanical terminal unit 102 preferably includes a damper assembly, not visible in FIG. 1. The damper assembly is supported for rotation within the casing 104 by a shaft which extends through and beyond the casing 104. The mechanical terminal unit 102 of a zone-control unit 100 that includes the damper assembly also includes a DDC controller 112 depicted in FIG. 3. The DDC controller 112 is coupled to a damper motor, not visible in any of the figures, which rotates the damper assembly. The DDC controller 112 receives a signal from a thermostat or room sensor and responsive thereto controls operation of the damper assembly to regulate the amount of heating or cooling provided by air leaving the zone-control unit 100. The DDC controller 112 may be selected from various different types such as pneumatic, analog electronic or direct digital electronic. The mechanical terminal unit 102 also includes an airflow sensor, also not visible in FIG. 1, which is usually located near an air inlet to the casing 104 and may be selected from various types for sensing the velocity of air entering the casing 104.

To heat or cool air flowing through the mechanical terminal unit 102, the casing 104 includes a coil 122 that is located near the air inlet thereto, and which adapts the mechanical terminal unit 102 for inclusion in a hydronic HVAC system. The casing 104 includes both an inlet collar, not visible in FIG. 1, and an outlet connection 124 each of which is adapted to mate with a building's HVAC ductwork. If a zone-control unit 100 were to be assembled at a construction site, the mechanical terminal unit 102 would arrive there with the various components listed above mostly assembled, other than the DDC controller 112 and the damper motor, by the terminal unit's manufacturer.

The mechanical terminal unit 102 is preferably selected from among various different types and styles sold by Krueger based in Richardson, Texas. Krueger is a division of Air Systems Components (ASC) which is part of the Dayton, Ohio Air System Components Division of Tomkins Industries, Inc. of London, England.

To fashion the mechanical terminal unit 102 into a zone-control unit 100 ready for installation into a building's HVAC system, various plumbing components must be added for circulating either hot or cold water through the coil 122. For supplying water to the coil 122 the zone-control unit 100 includes an inlet piping assembly 202. The piping assembly 202 includes an L-shaped section of pipe 204 which connects at one end to a lower header of the coil 122, not visible in FIG. 1. At its other end, the pipe 204 ends at a union 208. The other half of the union 208 connects to a tailpiece 212 which receives both a pressure/temperature ("P/T") port 214 and a drain 216. The drain 216 includes a ball valve integrated ¾" male garden hose end connection to facilitate draining the coil 122 when maintenance or repairs become necessary. A ball valve 222, which includes a strainer, connects to a side of the tailpiece 212 away from the union 208 to permit stopping hot or cold water from circulating through the coil 122. An opposite side of the valve 222 from the tailpiece 212 receives a length of pipe 224 which adapts the piping assembly 202 for connecting to a building's plumbing.

The zone-control unit 100 also includes an outlet piping assembly 232 for receiving water from the coil 122. A short length of pipe 234 which ends in a tee 236 connects to an header 238 of the coil 122. A manual air vent 242 is connected to and projects upward above the tee 236 to facilitate eliminating air from the piping assemblies 202, 232 following first assembling the HVAC system, or reassembly of the zone-control unit 100 when maintenance or repairs become necessary. An L-shaped section of pipe 244 is connected to and depends below the tee 236. Similar to the pipe 204, an end of the pipe 244 furthest from the tee 236 ends at a union 246. The other half of the union 246 connects to a 2 way or 3 way ATC control valve 252. The ATC control valve 252 may either be of a type depicted in FIG. 1 that provides only on-off control, or be of a type that provides proportional control. An electrical signal supplied to the ATC control valve 252 from the DDC controller 112 via a control signal cable 114 can energize operation of the ATC control valve 252.

A side of the ATC control valve 252 furthest from the union 246 connects to a union 254. Connecting the ATC control valve 252 into the piping assembly 232 on both sides with unions 246, 254 facilitates its replacement when maintenance or repairs become necessary. A tailpiece 262, connected to the other side of the union 254 furthest from the ATC control valve 252, receives both a P/T port 264 and a manual air vent 266. The PIT ports 214 and 264 facilitate measuring pressure and/or temperature of water circulating through the coil 122. The vent 266 facilitates eliminating air from the piping assembly 232 following first assembling the HVAC system, or reassembly of the zone-control unit 100 when maintenance or repairs become necessary. A manual balancing valve 272 connects to the other side of the tailpiece 262 from the furthest from the union 254. An opposite side of the valve 272 from the tailpiece 262 receives a length of pipe 274 which, similar to the pipe 224, adapts the piping assembly 232 for connecting to a building's plumbing. The valves 222,216, 272 and other plumbing fittings included in the piping assemblies 202, 232 are preferably manufactured by HCI of Madison Heights, Michigan. The valves 222,272 permit isolating from the building's plumbing, when maintenance or repairs become necessary, the coil 122 and those portions of the piping assemblies 202, 232 which connect to the valves 222,272.

As described thus far, the zone-control unit 100 including the piping assemblies 202,232 are substantially the same as those which a skilled sheet metal worker, controls contractor, electrician, and pipe fitter might collectively assemble at a building site. However, in assembling zone-control units 100 in accordance with embodiments of the present invention for a particular building project or significant portion thereof, all of the lengths of pipe, plumbing fittings, valves, vents, P/T ports, etc. are the same. Consequently, when a repair become necessary a building manager or the manager's personnel responsible for maintaining the HVAC system may confidently order a replacement part knowing that it will surely fit because the plumbing of each zone-control unit 100 is not unique. Rather, in accordance with the present invention the plumbing of zone-control units 100 is uniform throughout the building or significant portion thereof. Furthermore, because plumbing of zone-control units 100 is uniform throughout the building or significant portion thereof, acting either from prudence or caution a building manager may confidently maintain an inventory of plumbing components for the zone-control units 100 to have on hand when they need repair thereby significantly reducing downtime while also maintaining IAQ.

In addition to being assembled with uniform plumbing, in accordance with the present invention tags 282 are attached to each valve 252, 272 or other component that are likely to eventually require replacement. After the HVAC system has been commissioned, when a failure occurs and is located, the presence of an identifying tag 282 attached to a failed component simplifies its replacement and reduces the time required therefor. The tags 282 are particularly helpful if components from different manufacturers and/or different catalogs have been incorporated into the HVAC system. The tags 282 are preferably engraved plastic, but may also be made from metal, paper, or any other appropriate material. The tags 282 may carry barcodes or plain language, for example, and may be customized to provide information in the manner most useful for a particular project. In accordance with the present invention, performance requirements for each zone-control unit 100 such as GPM, CFM, CV and so on are marked thereon in an accessible and well defined location.

Also in accordance with embodiments of the present invention, each pipe 224, 274 is sealed by a spun copper cap 284 which is five (5) times thicker than the pipe 224, 274, and the assembled piping assemblies 202, 232 include a pressure gauge 286. Following fabrication and sealing of the piping assemblies 202, 232, they are pressure tested with, for example, a gas such as air. Other gasses, fluids, or liquids may be used as appropriate for materials used in the piping assemblies 202, 232. A typical pressure range used in testing assembled piping assemblies 202, 232 and coil 122 is 20-400 psi, and in one embodiment is preferably 140 psi. While pressurized, the piping assemblies 202, 232 and the coil 122 are checked for leaks, e.g. with a soap solution. Any defects in assembly found during pressure testing are repaired and/or defective components replaced. For example, experience in assembling zone-control units 100 in accordance with embodiments of the present invention indicates that about 3 to 7% of new coils 122 are defective and must be replaced.

When inspection and pressure testing indicates that no leaks appear to exist in the piping assemblies 202, 232 and the coil 122, they are then sealed and re-pressurized to at least 100 psi, preferably 140 psi, or any other desired negative or positive pressure, including a vacuum. After pressurization, the piping assemblies 202,232 and the coil 122 remain sealed for 24 hours throughout which they must hold the pressurization to confirm that the zone-control unit 100 is undergoing installation into a HVAC system. After the piping assemblies 202, 232 and the coil 122 pass this 24 hour quality assurance test, zone-control units 100 can be ready for shipping to a construction site. In accordance with one embodiment of the present invention, the piping assemblies 202,232 and coil 122 of zone-control units 100 ready for installation remain pressurized continuously after their 24 hour quality assurance test at a pressure of at least 60 psi until they are about to be installed into a building's HVAC system. In some cases, the shipping pressure can be 40 psi, or any other desired pressure.

Immediately before installing a zone-control unit 100 at a construction site, their readiness for installation can be confirmed by checking the pressure gauge 286. If the pressure gauge 286 fails to indicate a specified pressure, then the zone-control unit 100 may need further testing and/or repair, and should not be installed into the HVAC system. Instead an identically assembled zone-control unit 100 having a pressure gauge 286 which indicates the specified pressure may be immediately substituted for a defective one, and the defective zone-control unit 100 may either be repaired and re-tested at the construction site, or it may be returned to its vendor for repair.

Identifying and replacing faulty piping assemblies 202, 232 and/or coil 122 in this way prior to installing the zone-control unit 100 saves time and money. The present invention can eliminate an inability to test the piping assemblies 202, 232 and coil 122 of each zone-control unit 100 assembled at a construction site until the entire HVAC system is completely assembled and ready for commissioning. Off-site assembly and testing of zone-control units 100, rather than assembling the components at the construction site, improves quality control by individually assuring that each zone-control unit 100 is ready for installation in a HVAC system. In this way the present invention saves time and money that would otherwise be spent tracking down leaks that occur using traditional on-site assembly of zone-control units 100. Furthermore, by preventing pinhole leaks in the zone-control unit 100, which inevitably result in mold, biochemical hazards, etc., the present invention significantly improves IAQ both initially and throughout the HYAC system's service life. Relatedly, insulation can be applied to or incorporated into a zone-control unit or portable piping structure at the factory, instead of in the field or at the job site. Thus, units or structures can be made at the factory, pre-assembled, pre-calibrated, and pre-insulated, thus providing further cost savings and efficiencies.

One problem which arises with assembling zone-control units 100 at a location remote from a construction site is that during their transportation to the site and during installation into a building's ductwork zone-control units 100 may be manipulated by the piping assemblies 202, 232 and/or the coil 122 of the mechanical terminal unit 102. Such handling of zone-control units 100 during installation may damage seals between the components as well as the components themselves. For example, damage may occur to seals between a coil and a pipe, or between two pipes, or even to a seal or cap of a pipe or coil.

Furthermore, such damage may not be noticed until the HVAC system is pressurized for commissioning or at a later date. At that time, locating a leak or malfunctioning part may be time-consuming, virtually impossible and cost prohibitive. To reduce any possibility that a zone-control unit 100 might be damaged while being transported from its assembly, test and qualification location to a construction site and to facilitate handling the zone-control unit 100 during its installation into the HVAC system, in accordance with the embodiment of the present invention illustrated in FIG. 1 each zone-control unit 100 also includes a pair of handles 502 that are preferably secured to the casing 104 of the mechanical terminal unit 102 near opposite ends thereof.

Each of the handles 502 includes an L-shaped handle mounting bracket 504 which is rigidly secured to a wall 132 of the mechanical terminal unit 102 which is nearest to the piping assemblies 202, 232. As depicted in FIG. 1, the handle mounting brackets 504 are secured near opposite ends of the wall 132 of the zone-control unit's casing 104. Each of the handles 502, for example illustrated in FIG. 2, is formed by a plate 506a of sheet metal. Each plate 506a include a plurality of holes 508 through which fasteners pass for securing the plate 506a to a portion of the handle mounting bracket 504 that projects outward from the wall 132. The handle mounting brackets 504 and the plates 506a can be made from 12 gauge sheet steel. The handle mounting brackets 504 can be galvanized and the plates 506a can be powder coated, and can be made from various materials and gauge sizes.

For use with the zone-control unit 100, each plate 506a is also pierced by a rectangular-shaped hole 512, and by a pair of circularly-shaped holes 514 illustrated with dashed lines in FIG. 2. The holes 512 are large enough to accept many lifting devices including human hands, forklift, Unistrut®, pipe or other lifting device. Each hole 512 has a curved edge 518 to prevent hand injuries, and may lack any sharp edges or non-rolled edges. The holes 514 each receive a grommet 522 that fits snugly around the piping assemblies 202, 232 where they pass through plates 506a.

Arranged in this way, the handle mounting brackets 504 and plates 506a provide a structure for mechanically coupling the mechanical terminal unit 102 and the piping assemblies 202, 232 together thereby reducing any possibility that the zone-control unit 100 might be damaged while being transported from its assembly, test and qualification location to a construction site. Furthermore, the handles 502 protect zone-control units 100 during shipping, and facilitate their handling during installation into the HVAC system such as maneuvering zone-control units 100 into position in a building's ductwork. During installation, the handle mounting brackets 504 and plates 506a maintain positional relationships between the mechanical terminal unit 102 including the coil 122 and the piping assemblies 202, 232 because the handle mounting brackets 504 and plates 506a mechanically bind the entire zone-control unit 100 together into a single unit. Exemplary embodiments encompass an apparatus as generally depicted in FIG. 2 for use as a portable piping structure bracket with a universal handle. The bracket can be manufactured in multiple sizes, multiple configurations, with any desired constellation of piping openings or couplings, and can include any desired material or fastening mechanisms. Brackets can have any desired shape or configuration, and often include a portion that extends beyond piping apertures that provides protective mechanism for the piping, to prevent the piping from damage during transport or handling.

In renovating existing buildings by adding an up-to-date HVAC system, sometimes there exists no interior space for installing zone-control units 100. To permit installing zone-control units 100 on a renovated building's roof where its components are exposed to environmental hazards, an alternative embodiment of the zone-control unit 100, depicted in FIG. 3, includes a weatherproof NEMA enclosure 552. For this alternative embodiment zone-control unit 100, all of the electrical components together with their wiring are located within the NEMA enclosure 552, and outdoor grade conduit 554 encloses the cable 114 that interconnects the DDC controller 112 and the ATC control valve 252. Accordingly, in addition to the DDC controller 112, the NEMA enclosure 552 also encloses an on-off switch 562 and a transformer 564 for supplying 24 volt electrical power to the DDC controller 112.

Cooling for the components of the mechanical terminal unit 102 enclosed within the NEMA enclosure 552 may be provided by a mini-fan mounted within the NEMA enclosure 552. Alternatively, these components of the mechanical terminal unit 102 may be cooled by air flowing through the HVAC system's ductwork. For example, one end of a small duct may be connected into the plenum upstream from the coil 122 with the other end connecting to the NEMA enclosure 552. The ATC control valve 252 may also be cooled by enclosing it and connecting its enclosure to the HYAC system's plenum by a small duct. If the electrical wires connecting the coil 122 to the ATC control valve 252 are enclosed within a one (1) inch diameter outdoor grade conduit 554, cool air first supplied to the ATC control valve 252 flows to the NEMA enclosure 552 through the outdoor grade conduit 554.

The NEMA enclosure 552 may be selected from among NEMA Type 3R, 4 or 10 enclosures. NEMA Type 3R, 4 or 10 enclosures all provide a degree of protection for personnel against incidental contact with equipment enclosed therein. NEMA Type 3R enclosures are constructed for either indoor or outdoor use providing a degree of protection against falling dirt, rain, sleet, and snow, and are undamaged by the external formation of ice on the enclosure. NEMA Type 4 enclosures are also constructed for either indoor or outdoor use again providing a degree of protection against falling dirt, rain, sleet, snow, windblown dust, splashing water, and hose-directed water, and are also undamaged by the external formation of ice on the enclosure. NEMA Type 1 O enclosures are designed to contain an internal explosion without causing an external hazard, i.e. NEMA Type 10 enclosures meet the requirements of the Mine Safety and Health Administration, 30 CFR, Part 18.

Figure 3:
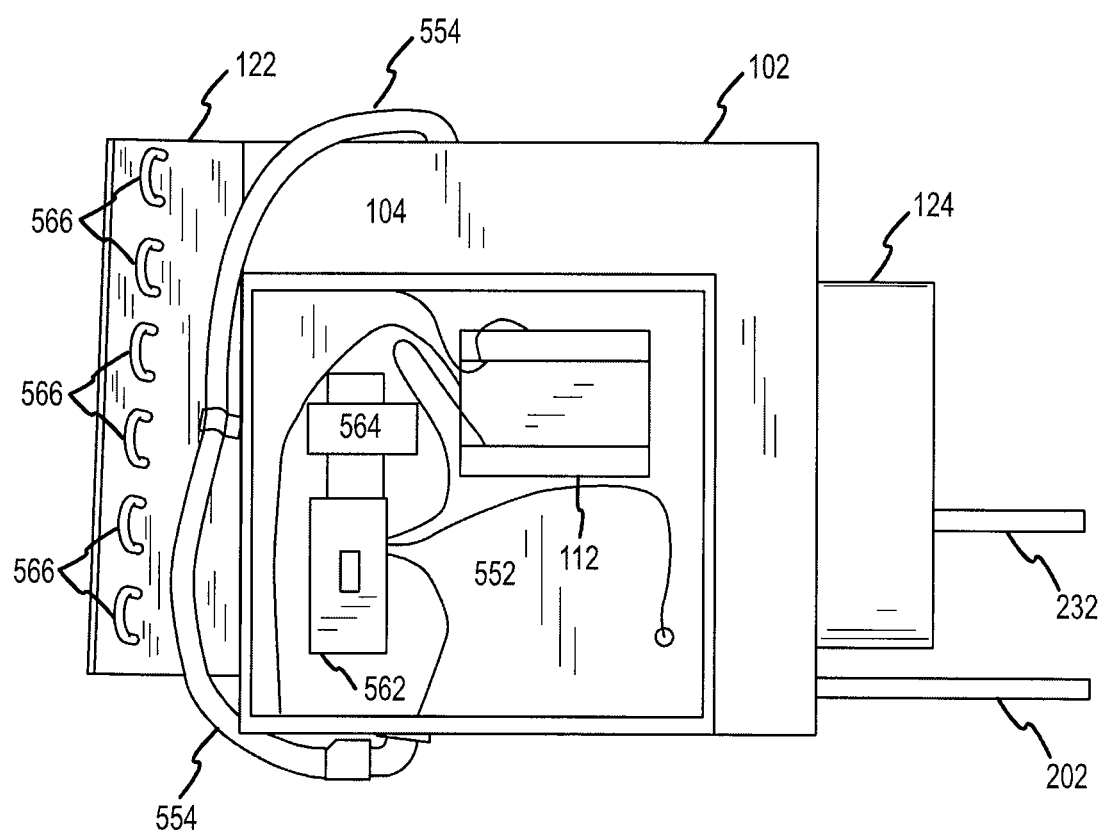
FIG. 3 is a perspective view of an alternative embodiment, fully-functional zone-control unit which includes a NEMA enclosure that adapts the unit for installation outside a building, according to one embodiment of the present invention.
Figure 4:
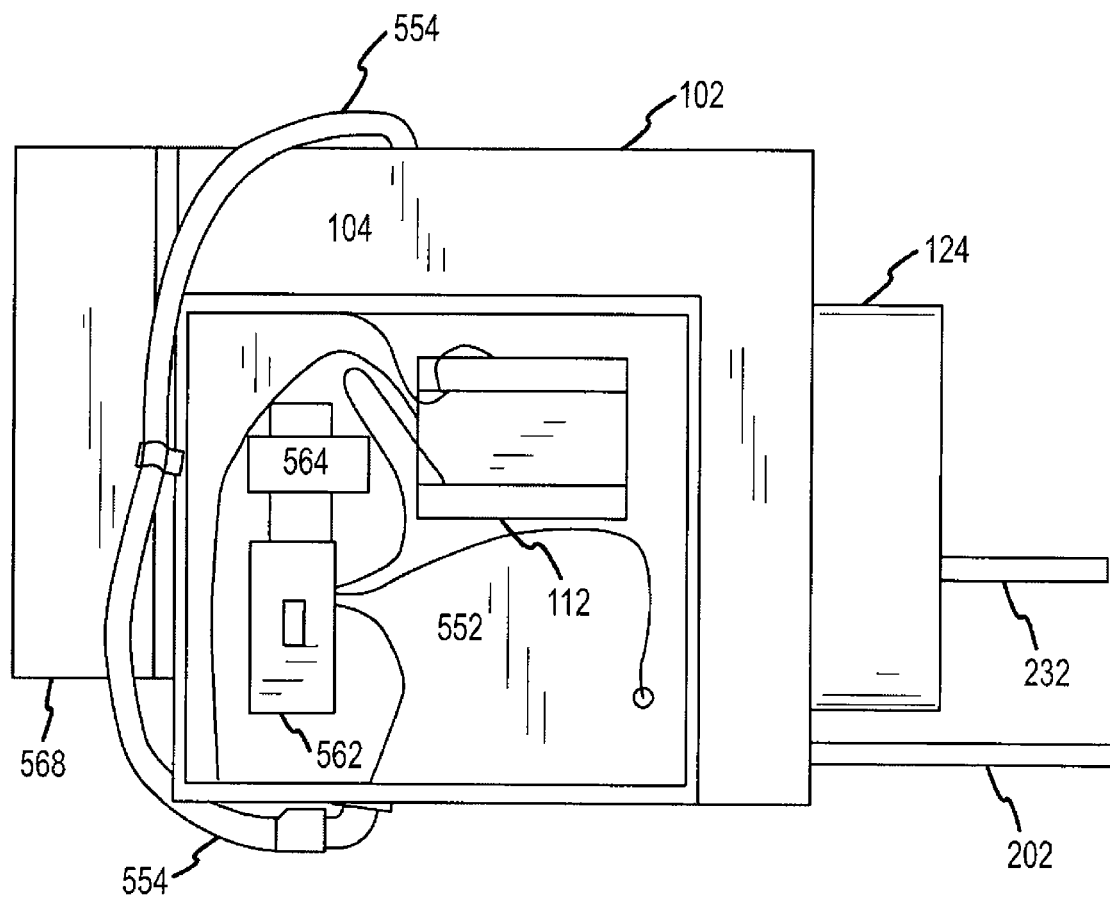
FIG. 4 is a perspective view of the alternative embodiment, fully-functional zone-control unit of FIG. 3 that includes a shield which protects coils included in the casing from mechanical damage, according to one embodiment of the present invention.

As described thus far, zone-control units 100 have exposed U-shaped portions 566 of tubes, best illustrated in FIG. 3, through which water circulates that are located at the end of the coil 122 furthest from the piping assemblies 202,232. To reduce the possibility that the exposed U-shaped portions 566 of these tubes might be damaged either during transportation of the zone-control unit 100 and/or its installation into a HVAC system, as illustrated in FIG. 4 an alternative embodiment of the zone-control unit 100 includes a shield 568 preferably made from sheet steel material.

The shield 568 is secured to the coil 122 and perhaps also the casing 104, and covers the U-shaped portions 566 of tubes included in the coil 122. Though not illustrated in FIG. 4, the shield 568 may be lined with insulation to further reduce heat loss from the U-shaped portions 566 of the coil 122 in addition to the heat loss reduction provided by installing an uninsulated shield 568.

Figure 5:
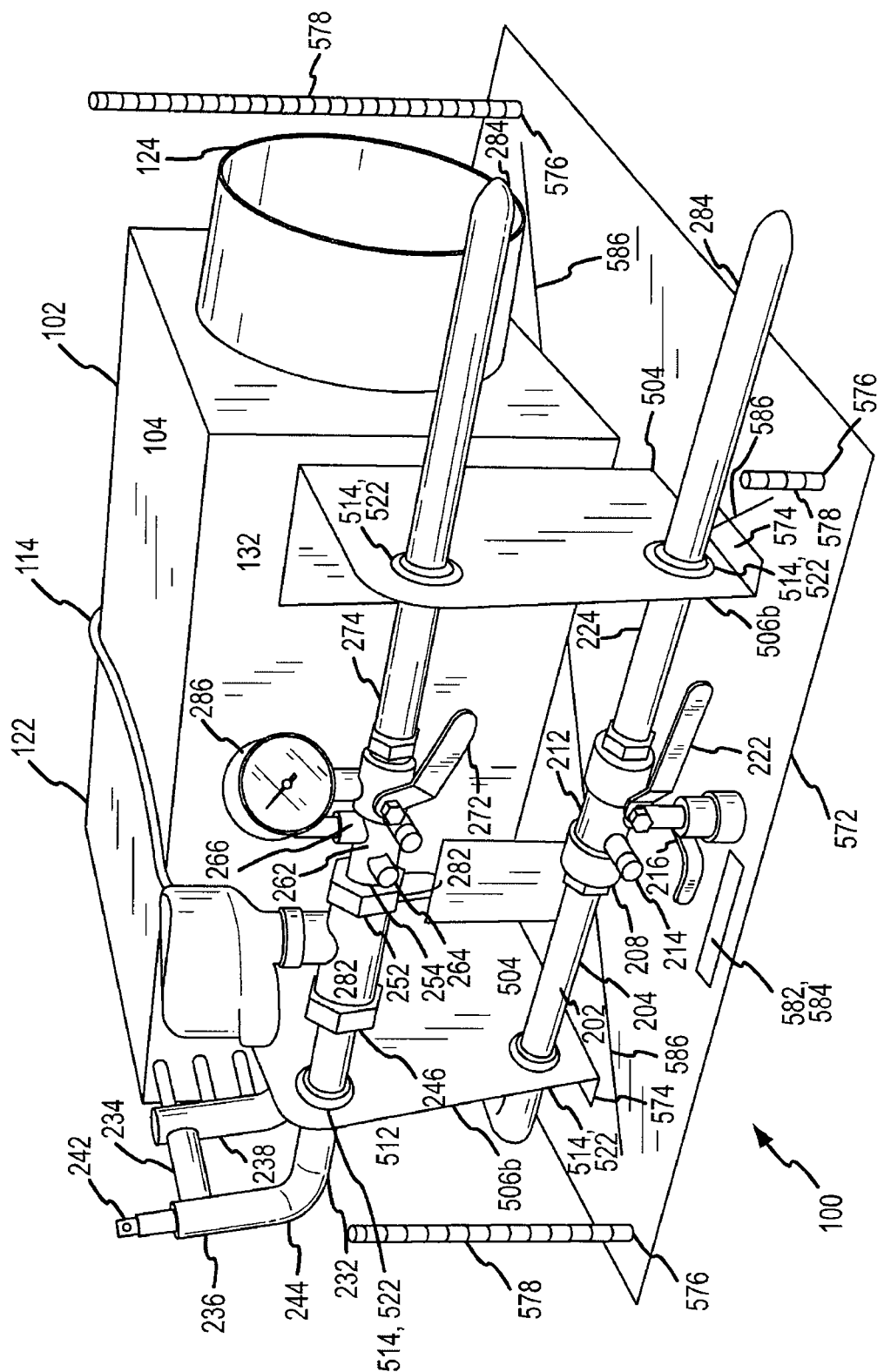
FIG. 5 is a perspective view of an alternative embodiment fully-functional zone-control unit similar to that depicted in FIG. 1, which includes a cradle located beneath the zone-control unit for supporting inlet and outlet piping assemblies included in the fully-functional zone-control unit, according to one embodiment of the present invention.

FIG. 5 is a perspective view of an alternative embodiment zone-control unit 100 in accordance with the present invention similar to the zone-control unit 100 depicted in FIG. 1. The zone-control unit 100 depicted in FIG. 4 includes a rectangularly-shaped cradle 572 disposed beneath and secured to the mechanical terminal unit 102. In the embodiment of the zone-control unit 100 depicted in FIG. 4, plates 506b, for mechanically securing the piping assemblies 202, 232 to the casing 104, omit the handles 502 established by the holes 512 formed in the plates 506a. Instead the plates 506b are narrower and L-shaped with a foot 574 which is secured to the cradle 572. The cradle 572 is pierced by holes 576 respectively located near each of its four corners, only three of which are visible in FIG. 4. In one embodiment, threaded rods 578 respectively pass through each of the holes 576 for supporting the cradle 572 from ceiling joists or an adjacent wall. Alternatively, an isolation spring (not illustrated in any of the figures) may be secured through each of the holes 576 and to an end of the threaded rod 578 nearest the hole 576. The cradle 572 is also pierced by a rectangularly-shaped hole 582 along an edge of the cradle 572 nearest to the piping assemblies 202, 232. The hole 582 provides the cradle 572 with a handle 584 for the zone-control unit 100 illustrated in FIG. 4 similar to the handles 502 provided by the holes 512 depicted in FIG. 1 that pierce the plates 506a.

Galvanized or stainless steel sheet material forming the cradle 572 includes linear, V-shaped troughs 586 formed therein in an X-shape which extend between diagonal pairs of holes 576. The troughs 586 cause the center of the cradle 572 where the troughs 586 intersect to be the lowest point thereof. Consequently, any water leaking from the piping assemblies 202,232 collects at the middle of the cradle 572. The cradle 572 preferably includes a threaded fitting (not illustrated in any of the figures) that is located at the intersection of the troughs 586. The cradle 572 may have a flask (not illustrated in any of the figures) secured to the threaded fitting so any water which collects at the middle of the cradle 572 may flow through the fitting and be collected in the flask. Alternatively, a moisture sensor (not illustrated in any of the figures) may be secured to the threaded fitting for sending an electrical signal to a monitoring station if water collects at the middle of the cradle 572.

Arranged in this way, the handle mounting brackets 504, plates 506b and the cradle 572 provide a structure for mechanically coupling the mechanical terminal unit 102 and the piping assemblies 202, 232 together thereby reducing any possibility that the zone-control unit 100 might be damaged while being transported from its assembly, test and qualification location to a construction site. Furthermore, the handle 584 facilitates handling zone-control units 100 during their installation into the HVAC system such as maneuvering zone-control units 100 into position for installation into a building's ductwork. During installation, the handle mounting brackets 504, plates 506b and the cradle 572 maintain positional relationships between the mechanical terminal unit 102 including the coil 122 and the piping assemblies 202, 232 because the handle mounting brackets 504, plates 506b and the cradle 572 mechanically bind the entire zone-control unit 100 together into a single unit.

Figure 6:
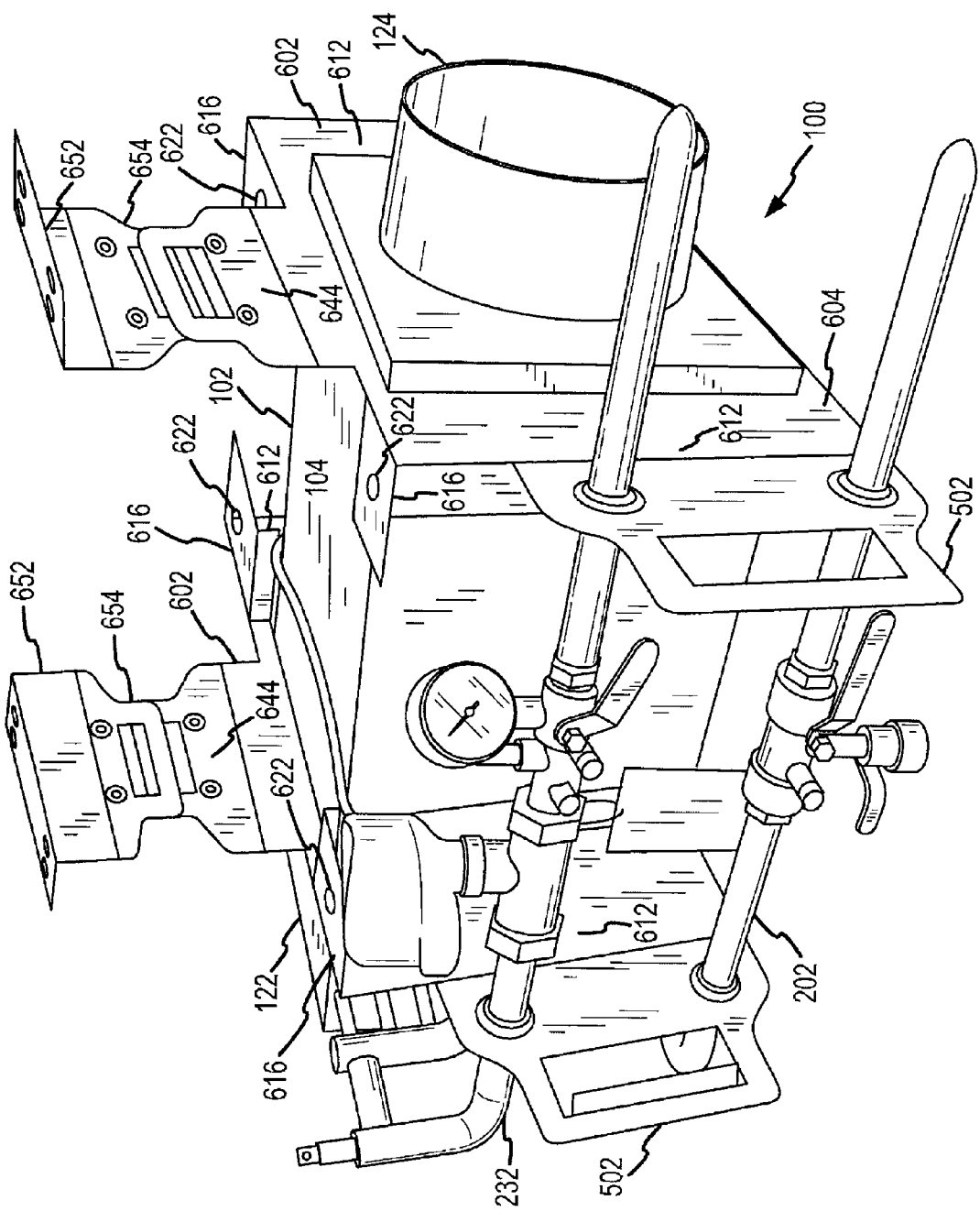
FIG. 6 is a perspective view of an alternative embodiment fully-functional zone-control unit in accordance with the present disclosure, similar to that depicted in FIG. 1, which includes a pair of sleeve mounting brackets that surround the casing, and support the zone-control unit when it is installed in a HVAC system.

FIG. 6 illustrates an alternative embodiment of the zone-control unit 100 that further facilitates its installation into a building's ductwork. In this embodiment, a pair of sleeve mounting brackets 602, which replace the handle mounting brackets 504 depicted in FIG. 1, surround the casing 104 near opposite ends thereof. As better illustrated in FIG. 7, each sleeve mounting bracket 602 includes a substantially planar, generally rectangular frame 604 which extends outward from and surrounds the casing 104.

Stiffeners 606a through 606d, which may be formed integrally with the frame 604, project at right angles from interior edges 608 of the frame 604 to extend respectively along sides of the casing 104.

Because each sleeve mounting bracket 602 replaces one handle mounting bracket 504 illustrated in FIG. 1, for the embodiment depicted in FIG. 6 the handle 502 is secured to either one or the other of vertically oriented sides 612 of the frame 604. Thus, the sleeve mounting bracket 602 permits attaching handles 502 to either side of the frame 604 for supporting the piping assemblies 202, 232.

A pair of hanging plates 616 respectively extend at right angles from upper edges 614 of the vertically oriented sides 612 of the frame 604, and are preferably formed integrally with the sides 612. An aperture 622 pierces each of the hanging plates 616 thereby adapting it to receive one end of a threaded rod or of a seismic fastening product for suspending the zone-control unit 100 when installed in a HVAC system. The sleeve mounting bracket 602 also includes a pair of reinforcing plates 626 each of which spans between a depending edge 628 of the hanging plates 616 and an upper edge 629 respectively of the stiffeners 606b and 606d, and is welded thereto.

Figure 8:
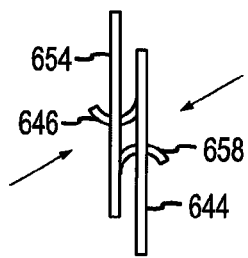
FIG. 8 is an elevational view taken along a line 8-8 in FIG. 7. illustrating mating of a pair of handles included in the zone-control unit mounting bracket depicted in FIGS. 6 and 7.
Figure 7:
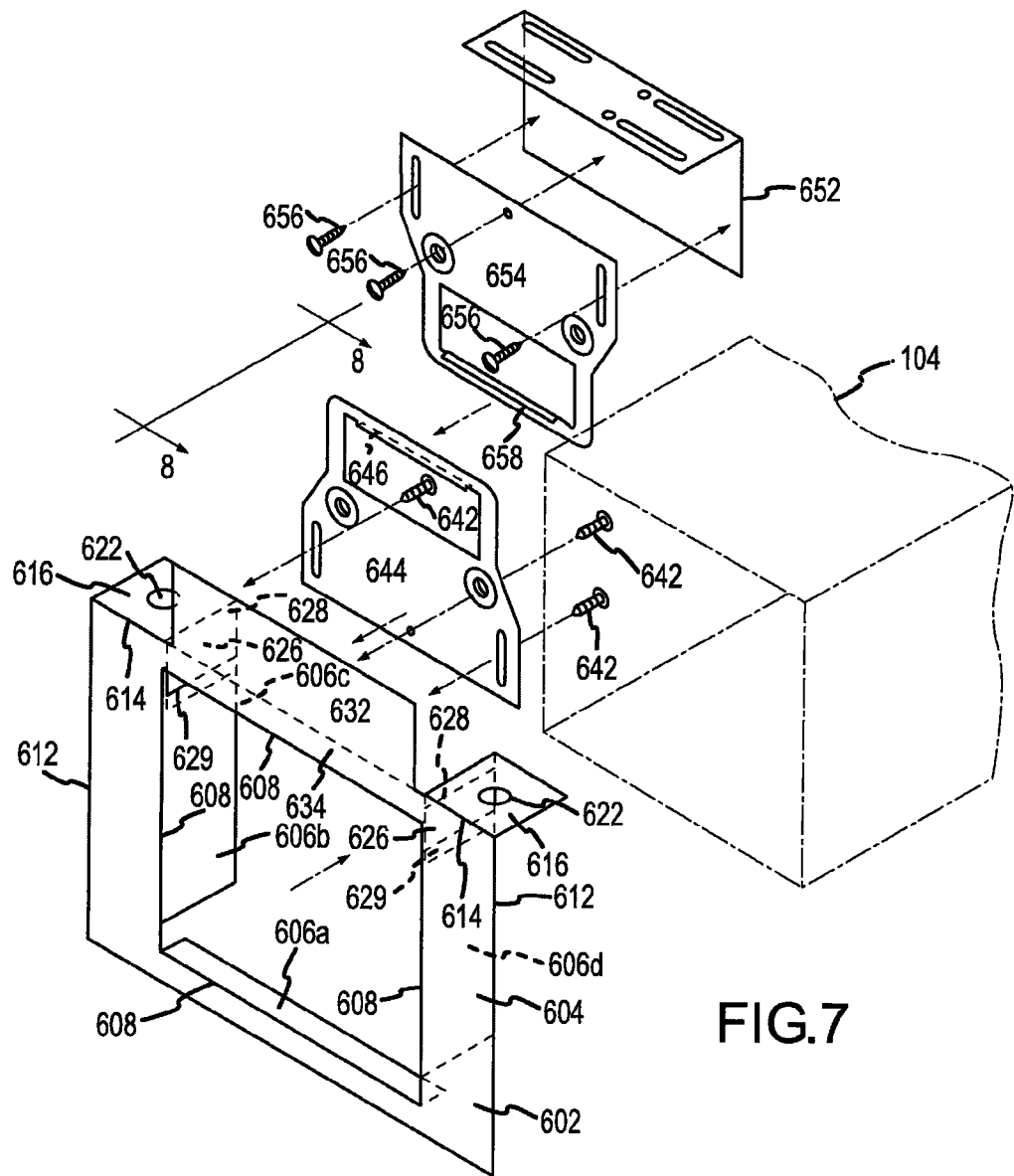
FIG. 7 is an exploded perspective view of one of the zone-control unit mounting brackets depicted in FIG. 6.

An elongated tab 632 projects upward as part of a horizontally oriented top side 634 of the frame 604. Fasteners 642, such as sheet metal screws, secure to the tab 632 a handle 644, which is shaped similar to or the same as the handle 502. Similar to the handle 502, as best illustrated in FIG. 8 the handle 644 preferably includes a curved edge 646. For suspending zone-control units 100 within a building using the handle 644 secured to the tab 632 of the sleeve mounting bracket 602, an L-shaped upper mounting bracket 652 depicted in FIG. 7 is secured to a joist or other building structural member. A handle 654 identical to the handle 644 is secured to the upper mounting bracket 652 with fasteners 656 such as sheet metal screws. As illustrated in FIG. 8, a curved edge 658 of the handle 654 receives and mates with the curved edge 646 of the handle 644. Configured in this way, the mated handles 644, 654 provide a hanger for suspending the zone-control unit 100 which seismically isolates the zone-control unit 100 from the building. Seismic and vibration insulation between the building and the zone-control unit 100 can be enhanced by inserting between the curved edges 654, 658 a sheet of elastomeric material such as rubber (not illustrated in any of the figures). The handles 644, 654 can also be further secured to each other with fasteners such as screws. While the curved edges 654, 658 are preferred for coupling the handles 644, 654 together, other locking mechanisms can be used such as clips or/and screws, or metal on metal, etc. if the zone-control unit 100 needs to be located further from the joist or other structural member than that provided by the handles 644, 654, appropriate lengths of sheet metal may be interposed between the tab 632 and the handle 644 and/or between the upper mounting bracket 652 and the handle 654.

Figure 9:
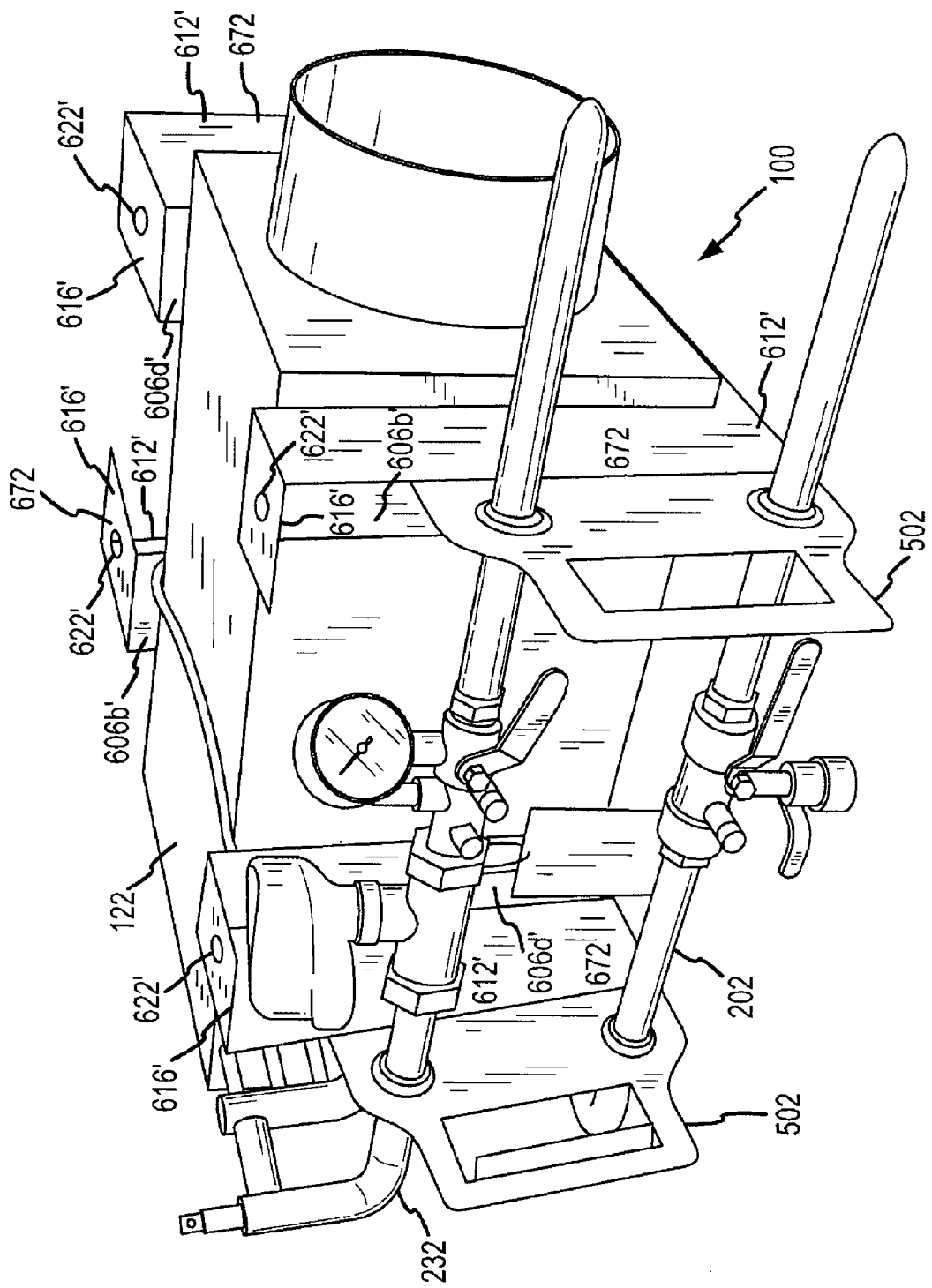
FIG. 9 is a perspective view of another alternative embodiment fully-functional zone-control unit in accordance with the present disclosure, similar to that depicted in FIG. 1, which includes four columnar mounting brackets that are secured to the casing, and support the zone-control unit when it is installed in a HVAC system.

FIG. 9 illustrates yet another alternative embodiment of the zone-control unit 100 that further facilitates its installation into a building's ductwork. Analogously to the sleeve mounting bracket 602 of FIGS. 6-8, in the embodiment of FIG. 9 four (4) columnar mounting brackets 672 replace the handle mounting brackets 504 depicted in FIG. 1. Those elements depicted in FIG. 9 that are common to the sleeve mounting bracket 602 illustrated in FIGS. 6-8 carry the same reference numeral distinguished by a prime ("'") designation. Comparing FIG. 9 with FIGS. 6-8 reveals that each columnar mounting bracket 672 includes the side 612', the apertured hanging plate 616', the reinforcing plate 626 and either the stiffener 606b' or 606d' of the sleeve mounting bracket 602. Because each pair of columnar mounting brackets 672 lack the top side 634 of the sleeve mounting bracket 602 with its tab 632 and the handle 644 fastened thereto, when installed in a HVAC system the zone-control unit 100 illustrated in FIG. 9 must be hung from threaded rod or a seismic fastening product. The sleeve mounting brackets 602 and the columnar mounting brackets 672 may be formed from 14 gauge sheet steel.

Using 14 gauge sheet steel for the sleeve mounting brackets 602 and the columnar mounting brackets 672 may significantly increase the structural rigidity the lighter 22 gauge sheet steel generally used in fabricating the casing 104 of the mechanical terminal unit 102. Thus, either the sleeve mounting brackets 602 or the columnar mounting brackets 672 may be used advantageously in securing a zone-control unit 100 to a pallet for shipping to a building site. For example, either the sleeve mounting brackets 602 or the columnar mounting brackets 672 may be appropriately pierced by an aperture (not illustrated in any of the FIGS.) that receives strapping for securing the zone-control unit 100 to a pallet. Thus, both the sleeve mounting brackets 602 and the columnar mounting brackets 672 facilitate shipping zone-control units 100 to a building site without defects and/or damage.

Figure 10:
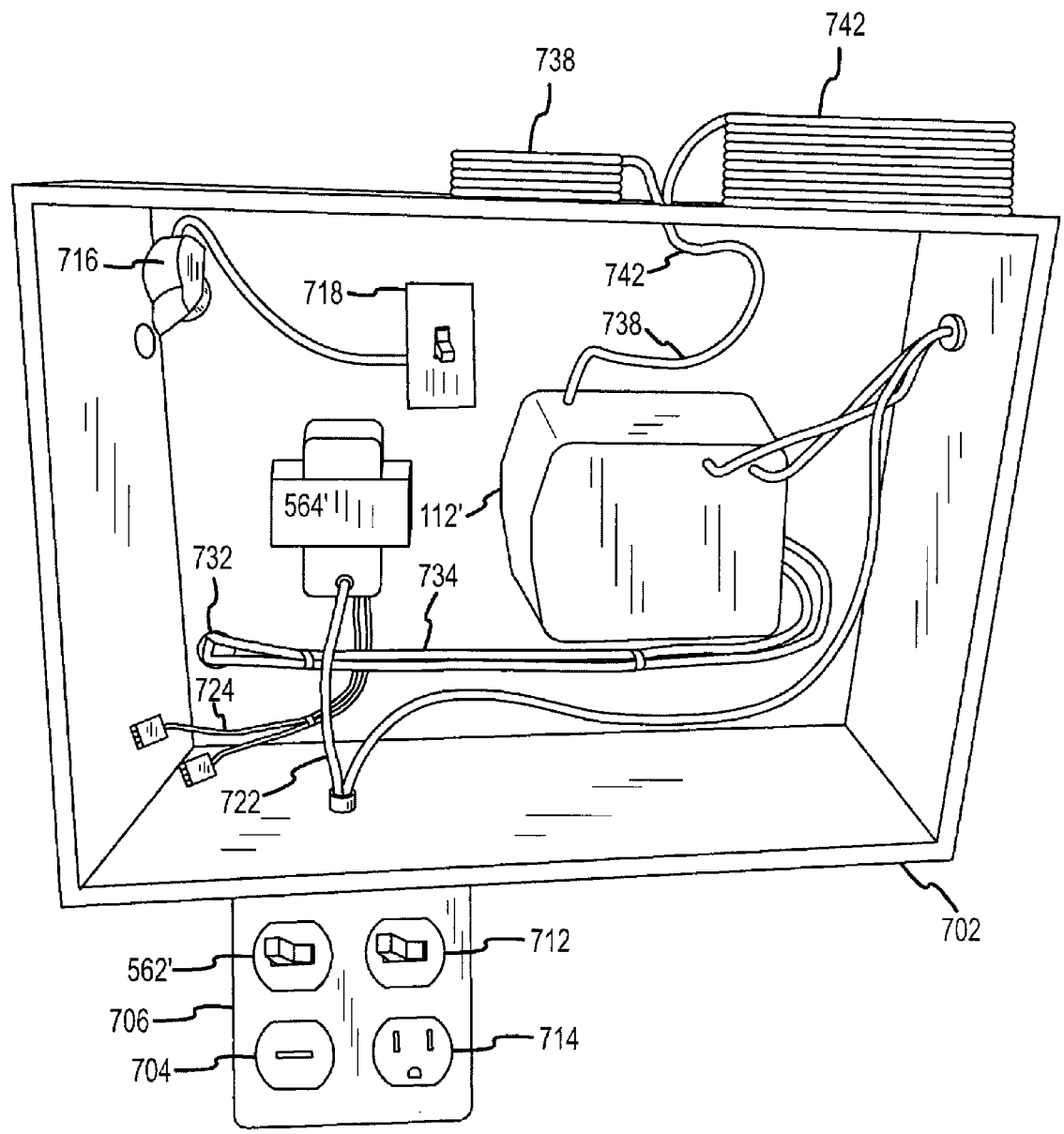
FIG. 10 is a perspective view of an electrical components enclosure for a fully-functional zone-control unit in accordance with the present disclosure adapted for use inside a building.

FIG. 10 depicts an electrical components enclosure 702, analogous to the NEMA enclosure 552 depicted in FIG. 3, which may be included in a zone-control unit 100 in accordance with the present disclosure that is suitable for installation only inside a building. Those elements depicted in FIG. 10 that are common to the zone-control unit 100 depicted in FIG. 1 and to the NEMA enclosure 552 illustrated in FIG. 3 carry the same reference numeral distinguished by a prime ("'") designation. With respect to the casing 104 included in the zone-control unit 100, the electrical components enclosure 702 may be secured to the top, to the bottom or to the side of the casing 104 opposite to that on which the piping assemblies 202, 232 and handles 502 are located.

Differing from the on-off switch 562 that is located inside the NEMA enclosure 552 depicted in FIG. 3, the on-off switch 562' illustrated in FIG. 10 and an associated LED power indicator 704 are both located in a separate utility box 706 attached outside the electrical components enclosure 702. However, similar to the NEMA enclosure 552 depicted in FIG. 3, both the DDC controller 112' and the transformer 564' are located within the electrical components enclosure 702 depicted in FIG. 10.

Including an individual transformer 564' in each zone-control unit 100 eliminates any need for an electrician to assemble multiple step down transformers on an electrical panel, or to install 24 volt low voltage wiring between a remotely located transformer and a terminal unit as described above. If the zone-control unit 100 is installed near a light and power conduit within the building, supplying the zone-control unit 100 with electrical power requires perhaps only a 1 to 5 foot connection of electrical wire and/or conduit. Buildings equipped with newer low energy (high efficiency) lighting, require less electrical power than that required by prior, less efficient lighting. DDC controllers, such as the DDC controller 112 and 112' respectively depicted in FIGS. 3 and 10, draw less than one-half (0.5) ampere of 115 volt alternating current ("AC") electrical power. Therefore, the zone-control unit 100 can be connected to a building's individual lighting circuits without a danger of electrical overload.

Differing from the NEMA enclosure 552 depicted in FIG. 3, the utility box 706 may include a second on-off switch 712 and power outlet 714 located in the utility box 706. The on-off switch 712 and the power outlet 714 provide a source of electrical power at the zone-control unit 100 to be used when servicing the zone-control unit 100. The embodiment of the electrical components enclosure 702 depicted in FIG. 10 also includes a service lamp 716 connected to an on-off switch 718. Analogous to the on-off switch 712 and the power outlet 714, the service lamp 716 facilitates servicing the zone-control unit 100.

For the electrical components enclosure 702 depicted in FIG. 10, electrical wires 722 connect the on-off switch 562' to the transformer 564' for energizing operation of the DDC controller 112' with 115 volt alternating current ("AC") electrical power. The electrical components enclosure 702 also preferably includes another set of electrical wires 724 connected to the transformer 564' which alternatively permit energizing operation of the zone-control unit 100 with 277 volt AC electrical power.

The electrical components enclosure 702 also preferably includes a pressure sensor inlet 732 for receiving air from the HVAC system's ducts connected to the zone-control unit 100. Within the electrical components enclosure 702, the pressure sensor inlet 732 supplies air from the ducts to the DDC controller 112' via tubes 734. The electrical components enclosure 702 also includes a length of electrical wire 738 connected to the DDC controller 112' which facilitates connecting the zone-control unit 100 to a temperature sensor located in the zone of the HVAC system supplied by the zone-control unit 100.

In general, DDC HVAC system controllers such as the DDC controller 112 and 112' respectively depicted in FIGS. 3 and 10 continually monitor and provide individual zones with a supply of fresh air. Presently, conventional DDC controllers include a communication capability that permits a central computer to monitor a building's HVAC system's operating status, and to coordinate operation of the various portions of the system including all of its terminal units. Presently, DDC controllers such as the 112 and 112' respectively depicted in FIGS. 3 and 10 are equipped with Local Area Network ("LAN") communications capability. To facilitate installing the zone-control unit 100, as illustrated in FIG. 10 the electrical components enclosure 702 is preferably equipped with a 100 ft. length of LAN cable 742 connected to the DDC controller 112'. Establishing the LAN that interconnects groups of zone-control units 100 all which include LAN cables 742 requires only that the LAN cable 742 of all but one of the zone-control units 100 in the group be connected to another one of the group's zone-control units 100.

Figure 11:
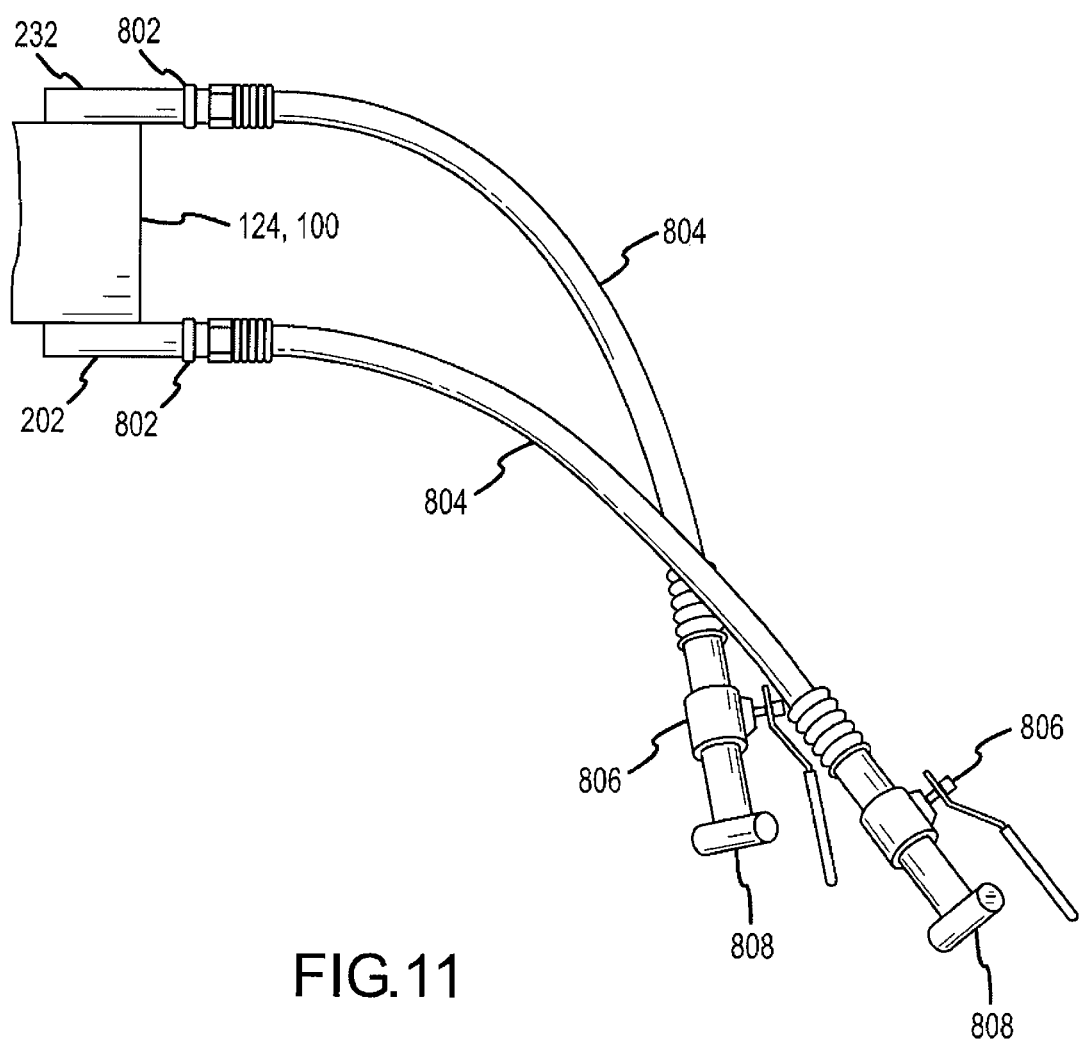
FIG. 11 is an elevational view of yet another alternative embodiment of a fully-functional zone-control unit in accordance with the present disclosure, in which appears a portion of the zone-control unit appearing in FIG. 1, that includes flexible braided hoses which facilitate connecting the zone-control unit's inlet and outlet piping assemblies to a building's plumbing.

To further facilitate installing zone-control units 100 into a building's HVAC system, FIG. 11 illustrates yet another alternative embodiment of the zone-control unit 100 which replaces the caps 284 on the piping assemblies 202, 232 with fittings 802 for connecting to flexible braided hoses 804 or other HVAC piping or hose components. Fittings 802 may be any type of fitting suitable for joining pipes, hoses, and the like. Fittings 802 may include press-fittings, push fittings, and various kinds of solder-less fittings. Another valve 806 connects to each end of the braided hoses 804 furthest from the piping assemblies 202, 232. Similar to the caps 284, closing both valves 806 connected to the end of each of the braided hoses 804 permits pressurizing both braided hoses 804, the piping assemblies 202, 232 and the coil 122 for leak testing, the 24 hour pre-shipment qualification pressure test, and assuring that the zone-control unit 100 remains leak free until installed into ductwork of a building's HVAC system.

A copper tee plumbing fitting 808 may connect to each valve 806 on the braided hoses 804 furthest from the piping assemblies 202, 232 on the side of the valves 806 furthest from the braided hoses 804. By including the tee plumbing fitting 808 in the zone-control unit 100, this particular embodiment permits a building's mechanical contractor, who is responsible for its plumbing, to make straight runs of copper pipe for the HVAC system's water which are located reasonably close to places where zone-control units 100 are to be installed, e.g. within 2 feet.

Then when installing zone-control units 100 into the building's ductwork, rather than being required to plumb the HVAC system's piping to the piping assemblies 202,232, zone-control units 100 can be connected with the HVAC system's piping by cutting out a small length of the previously plumbed piping, and inserting the tee plumbing fitting 808 into the piping followed by sweating the connection of the tee plumbing fitting 808 to the HVAC system's piping.

Figures 12A, 12B:
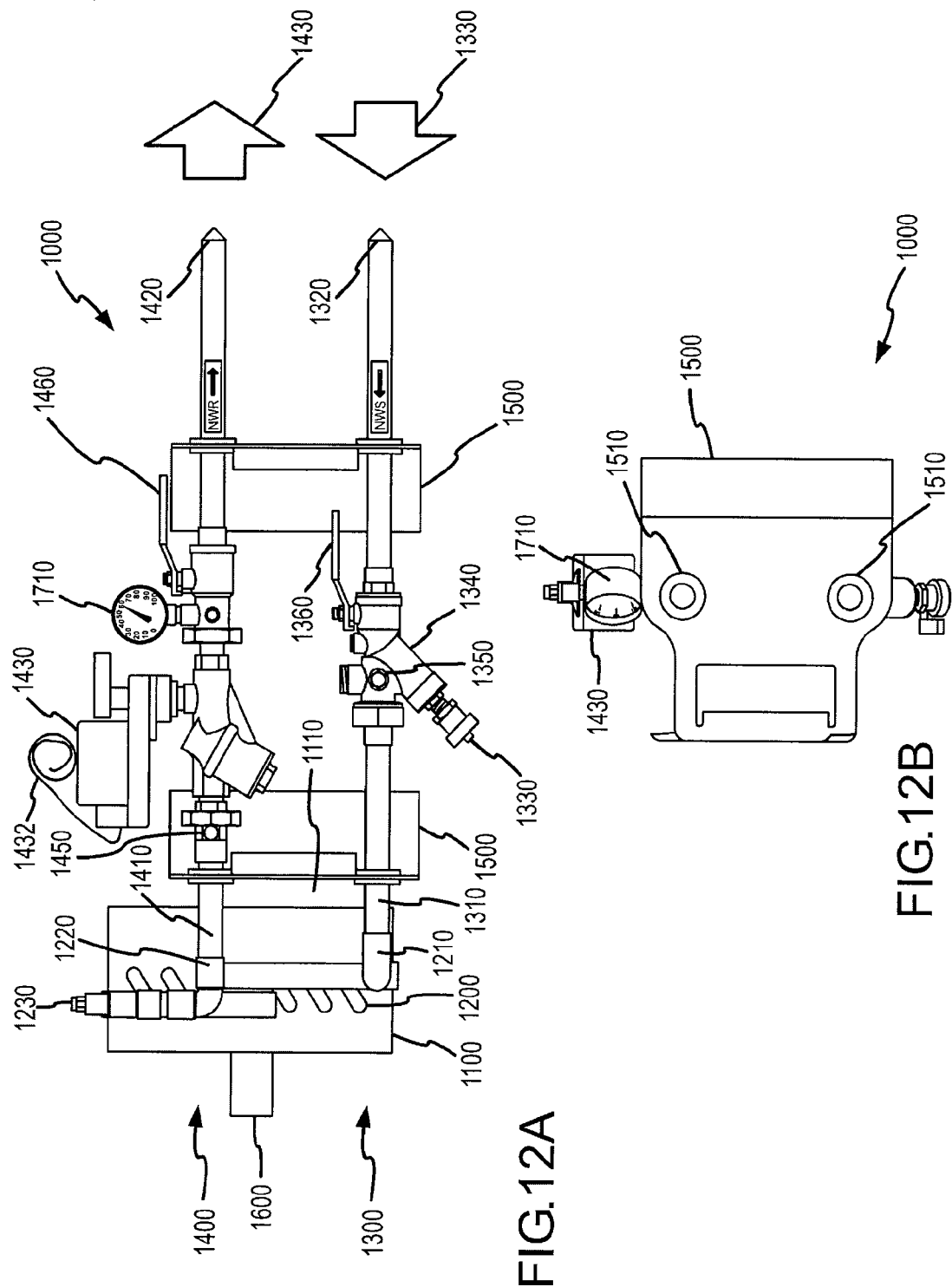
FIGS. 12A and B illustrate a zone-control unit according to one embodiment of the present invention.

FIG. 12A illustrates a side view of a zone-control unit 1000 for use in an HVAC system, according to one embodiment of the present invention, and FIG. 12B illustrates the corresponding end view. Zone-control unit 1000 includes a duct or casing 1100, a thermal transfer unit 1200, an inlet piping assembly 1300, an outlet piping assembly 1400, and at least one bracket 1500. In some embodiments, bracket 1500 can be a powder-coated handle shipping bracket. Bracket 1500 may include any of a variety of suitable materials, including metals, composites, and the like. Inclusion of bracket 1500 can allow zone-control unit 1000 to be pre-engineered, sealed, pressure-tested, and shipped to jobsite in working condition, free of defects. Zone-control unit 1000 may include military rubber Nitrile grommets 1510 for isolation between bracket 1500 and piping assemblies 1300 and 1400. Grommets 1510 can help secure and protect zone-control unit 1000, and can help reduce or eliminate the possibility of galvanic corrosion at the interface between bracket 1500 and piping assemblies 1300 and 1400. Grommets 1510 can be manufactured to withstand heat, and in some cases can withstand a direct flame of 220 degrees F., or higher. Bracket 1500 may include openings that are designed to fit the fork of a forklift, a steel pole, or a human hand. In some embodiments, bracket 1500 may not include an opening. Bracket 1500 is well suited for reducing or preventing field damage. For example, with known systems and methods, field personnel typically lift or move HVAC components simply by grasping various piping or probe elements, which often results in destruction or serious damage to the component. Bracket 1500 confers the ability to ship and maneuver zone-control unit 1000 in a standardized and safe manner. Often, thermal transfer unit 1200, which may include a coil, is at least partially disposed within casing 1100. Inlet piping assembly 1300 is coupled with thermal transfer unit 1200 for supplying liquid or gas to coil 1200, and outlet piping assembly 1400 is coupled with coil 1200 for receiving liquid or gas from coil 1200. This can be accomplished by coupling a first passage 1310 of inlet piping assembly 1300 with a supply port 1210 of thermal transfer unit 1200, and coupling a first pas sage 1410 of the outlet piping assembly 1400 with a return port 1220 of thermal transfer unit 1200. A second passage 1320 of inlet piping assembly 1300 can be coupled with an upstream fluid source 1330, and a second passage 1420 of outlet piping assembly 1400 can be coupled with a downstream fluid destination 1430. In some embodiments, a portable piping structure may include a heat exchanger coupled with a bracket and a pipe. The bracket is often also coupled with the pipe.

It is appreciated that inlet piping assembly second passage 1320 and outlet piping assembly second passage 1420 each can be sealed, inlet piping assembly first passage 1310 can be in sealed communication with thermal transfer assembly supply port 1210, and outlet piping assembly first passage 1410 can be in sealed communication with the thermal transfer assembly return port 1220. When sealed in this fashion, thermal transfer unit 1200 can contain a vacuum, a non-pressurized fluid, or a pressurized fluid. Inlet piping assembly second passage 1320 and outlet piping assembly second passage 1420 can be manufactured from, for example, ¾ inch type L copper water pipe. They can be sealed according to a heating and spinning procedure that introduces no annealing or distortion of the pipe. After zone-control unit 1000 is placed in the desired location relative to the HVAC system, distal tips of inlet piping assembly second passage 1320 and outlet piping assembly second passage 1420 can be cut, and connected with other HVAC piping or hose elements, such as a hot water piping building loop. Relatedly, zone-control unit 1000 includes a pressure gauge 1710 coupled with inlet piping assembly 1400. In some embodiments, pressure gauge 1710 may be coupled with thermal transfer unit 1200 or outlet piping assembly 1300. Inlet piping assembly 1300 may be coupled with a drain valve 1330, a Y-strainer 1340, a pressure/temperature port 1350, or a supply shutoff valve 1360, or any combination thereof. Outlet piping assembly 1400 may be coupled with control valve 1430, a balancing valve (not shown), a vent (not shown), a pressure/temperature port 1450, or a return shutoff valve 1460, or any combination thereof. Control valve 1430 may be an automatic temperature control (ATC) valve having a compensated ball valve including an integral pressure limiting and flow setting apparatus. Valve 1430 can assure consistent flow response regardless of the head pressure. In some cases, there is no CV setting on the valve. Relatedly, zone-control unit 1000 may include a field set manual or factory programmable maximum flow setting. In some embodiments, valve balancing may be accomplished in less than 30 seconds. Valve 1430 may have a shutoff pressure of 200 psi. Conveniently, valve 1430 may have a pressure sufficient to counteract a heating loop dead head pressure, which can be 50 psi or more. In related embodiments, valve 1430 can be a ½ inch, a ¾ inch, or 1 inch valve. Control valve 1430 may be a modulating Siemens ATC.

In some embodiments, a mechanical pressure/temperature port may be replaced, supplemented, or operatively coupled with one or more analog or digital electronic sensors, including sensors enabled for wireless communication, that detect or sense flow volume, for example in gallons per minute (gpm), or other flow variables such as pressure, temperature, and the like. Advantageously, the incorporation of such electronic sensors can eliminate the need for a technician to manually access a heat exchanger to perform troubleshooting or diagnostic procedures with gauges. These electronic sensors can replace such gauges, and can be pre-calibrated or pre-programmed at a manufacturer factory prior to installation. Accordingly, many of all flow variables can be monitored remotely through a building automation control system. A technician can check these variables remotely or wirelessly with a personal digital assistant (PDA), a laptop, or other suitable device. These sensors may also be operatively coupled with a damper assembly controller, a direct digital controller, an analog electronic controller, or other desired component of a zone-control unit.

Thermal transfer unit 1200 may be coupled with a vent 1230 such as an air vent. In some instances, vent 1230 is a manual air vent disposed at or toward the highest point of thermal transfer unit 1200. Vent 1230 can help ensure proper drainage of air or other unwanted fluids or gasses that enter the system, which can have deleterious effects on an HVAC system. For example, unwanted air in a hot water system can cause cavitation in a hot water pump, which may cause malfunction or destruction of the pump or other system components. Vents can also help ensure optimum flow characteristics when draining thermal transfer unit 1200 or other zone-control unit 1000 components. Full drainage of such components can facilitate the removal of unwanted particles such as rust or other chemical buildup. In some embodiments, vent 1230 is constructed of a non-corrosive military grade brass. In the embodiment shown here, zone-control unit 1000 includes a duct interface 1110 which is coupleable with duct or casing 1100, which may be attached with or integral to a duct or ductwork of an HVAC system. Bracket 1500, which may include a handle, supports duct interface 1110, inlet piping assembly 1300, and outlet piping assembly 1400 with relative positions appropriate for use in an HVAC system or other climate control system. In some cases, bracket 1500 may be a handle configured to maintain duct or casing 1100, inlet piping assembly 1300, and outlet piping assembly 1400 in positional relationship.

As shown in FIG. 12A, zone-control unit 1000 can include a damper assembly controller 1600, which may be coupled with casing 1100. Damper assembly controller 1600 may be configured to receive a signal from a thermostat or a room sensor (not shown). In some embodiments, damper assembly controller 1600 can include, for example, an analog electronic controller, or a direct digital control (DDC) controller equipped with Local Area Network (LAN) communication capability. In some cases, controller 1600 can be a pneumatic DDC. Controller 1600 can also be configured to operatively associate with or have connectivity with a LonWorks or BACnet system. Unit 1000 can also include an automatic temperature control (ATC) valve 1430, which is typically coupled with or part of outlet piping assembly 1400, and configured to receive a signal from damper assembly controller 1600, for example, by connection with plenum rated actuator wires 1432. Other embodiments may employ wireless signal transmission technologies. In certain embodiments, ATC valve 1430 is a Ncma 1 24V Bclimo proportional actuator. Accordingly, in some embodiments the present invention provides a proportional hot water valve package (PICCV). Often, zone-control unit 1000 will be configured to have one piping interface, one electrical interface, and one sheet metal interface, so as to provide a "plug and play" unit for ease of shipping and installation.

Figures 13A, 13B:
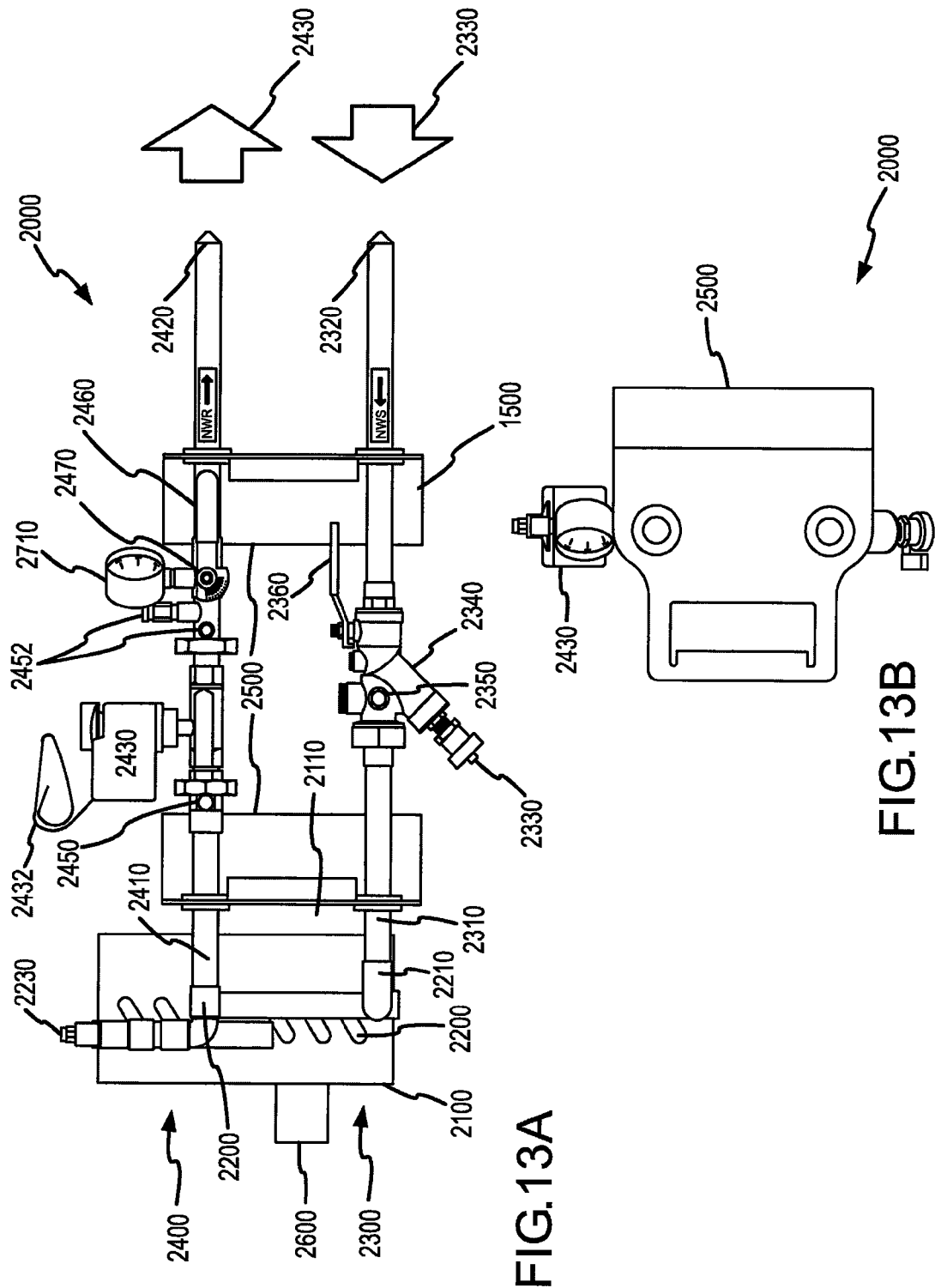
FIGS. 13A and B illustrate a zone-control unit according to one embodiment of the present invention.

FIG. 13A illustrates a side view of a zone-control unit 2000 for use in an HVAC system, according to one embodiment of the present invention, and FIG. 13B illustrates the corresponding end view. Zone-control unit 2000 includes a duct or casing 2100, a thermal transfer unit 2200, an inlet piping assembly 2300, an outlet piping assembly 2400, and at least one bracket 2500. Often, thermal transfer unit 2200, which may include a coil, is at least partially disposed within casing 2100. Inlet piping assembly 2300 is coupled with thermal transfer unit 2200 for supplying liquid or gas to coil 2200, and outlet piping assembly 2400 is coupled with coil 2200 for receiving liquid or gas from coil 2200. This can be accomplished by coupling a first passage 2310 of inlet piping assembly 2300 with a supply port 2210 of thermal transfer unit 2200, and coupling a first passage 2410 of the outlet piping assembly 2400 with a return port 2220 of thermal transfer unit 2200. A second passage 2320 of inlet piping assembly 2300 can be coupled with an upstream fluid source 2330, and a second passage 2420 of outlet piping assembly 2400 can be coupled with a downstream fluid destination 2430.

It is appreciated that inlet piping assembly second passage 2320 and outlet piping assembly second passage 2420 each can be sealed, inlet piping assembly first passage 2310 can be in sealed communication with thermal transfer assembly supply port 2210, and outlet piping assembly first passage 2410 can be in sealed communication with the thermal transfer assembly return port 2220. When sealed in this fashion, thermal transfer unit 2200 can contain a vacuum, a non-pressurized fluid, or a pressurized fluid. Relatedly, zone-control unit 2000 includes a pressure gauge 2710 coupled with inlet piping assembly 2400. In some embodiments, pressure gauge 2710 may be coupled with thermal transfer unit 2200 or inlet piping assembly 2300. Inlet piping assembly 2300 may be coupled with a drain valve 2330, a Y-strainer 2340, a pressure/temperature port 2350, or a supply shutoff valve 2360, or any combination thereof. Outlet piping assembly 2400 may be coupled with control valve 2430, a manual balancing valve 2470, a vent (not shown), a pressure/temperature port 2450 disposed upstream of control valve 2430, a pressure/temperature port 2452 disposed downstream of control valve 2430, or a return shutoff valve 2460, or any combination thereof. In some cases, balancing valve 2470 may be a Griswold pressure independent balancing valve. Thermal transfer unit 2200 may be coupled with a vent 2230 such as an air vent. In the embodiment shown here, zone-control unit 2000 includes a duct interface 2110 which is coupleable with duct or casing 2100, which may be attached with or integral to a duct or ductwork of an HVAC system. Bracket 2500, which may include a handle, supports duct interface 2110, inlet piping assembly 2300, and outlet piping assembly 2400 with relative positions appropriate for use in an HVAC system or other climate control system. In some cases, bracket 2500 may be a handle configured to maintain duct or casing 2100, inlet piping assembly 2300, and outlet piping assembly 2400 in positional relationship. In some cases, a coil or heat exchanger, an inlet piping, and an outlet piping can form a closed and sealed system. In some cases, a coil or heat exchanger, a inlet piping, and the outlet piping can contain a pressurized fluid. Optionally, one or more headers may be coupled with a coil or heat exchanger, and form part of the sealed and pressurized space.

As shown in FIG. 13A, zone-control unit 2000 can include a damper assembly controller 2600, which may be coupled with casing 2100. Damper assembly controller 1600 may be configured to receive a signal from a thermostat or a room sensor (not shown). In some embodiments, damper assembly controller 2600 includes a direct digital control (DDC) controller equipped with Local Area Network (LAN) communication capability. Unit 2000 can also include an automatic temperature control (ATC) valve 2430, which is typically coupled with or part of outlet piping assembly 2400, and configured to receive a signal from damper assembly controller 2600, in some embodiments by connection with plenum rated actuator wires 2432, via wireless signal transmission systems, or the like. In certain embodiments, ATC valve 2430 is a Nema 1 24V Belimo on/off actuator. Accordingly, in some embodiments the present invention provides a two way water valve package (CCV).

Figures 14A, 14B:
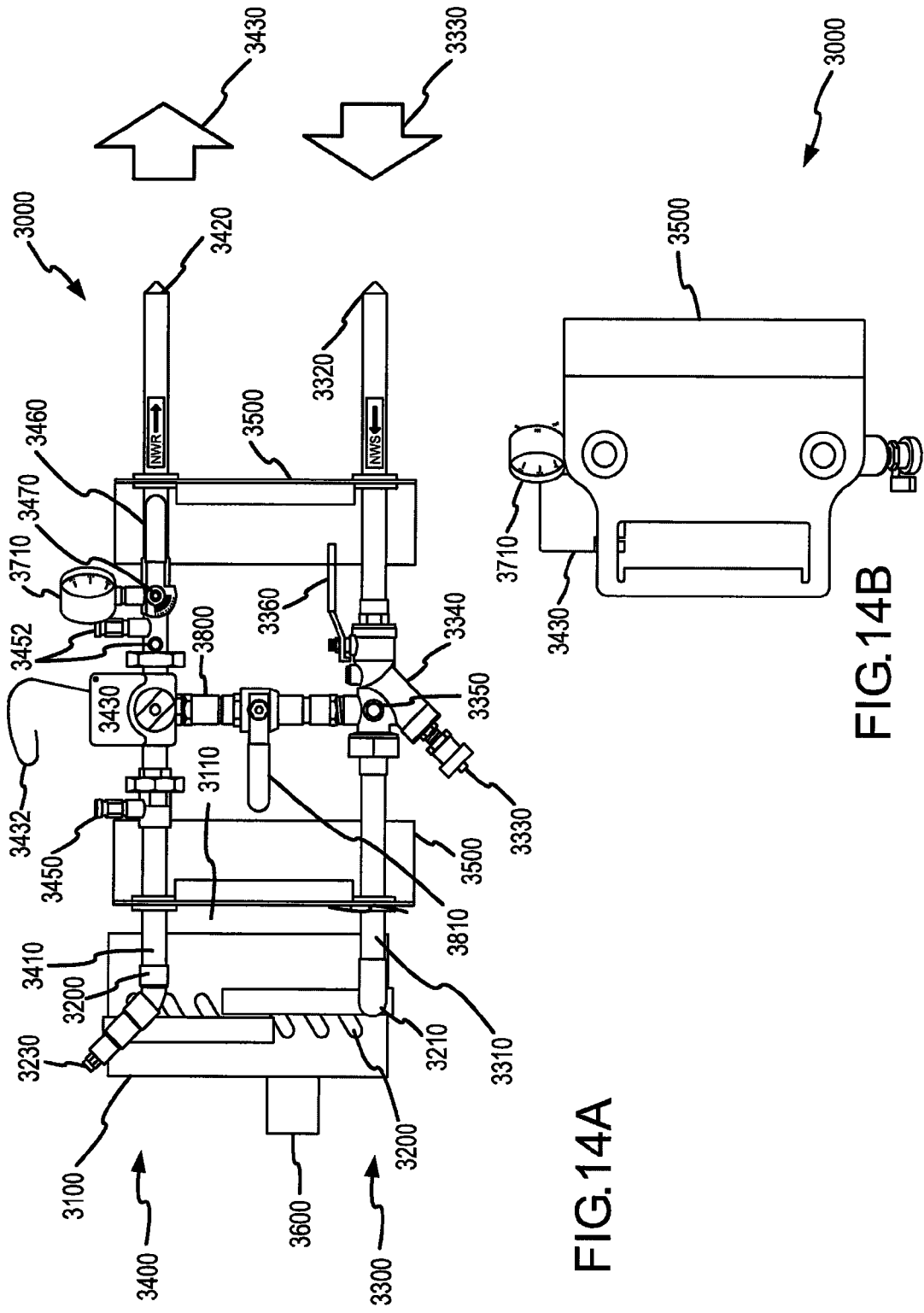
FIGS. 14A and B illustrate a zone-control unit according to one embodiment of the present invention.

FIG. 14A illustrates a side view of a zone-control unit 3000 for use in an HVAC system, according to one embodiment of the present invention, and FIG. 14B illustrates the corresponding end view. Zone-control unit 3000 includes a duct or casing 3100, a thermal transfer unit 3200, an inlet piping assembly 3300, an outlet piping assembly 3400, a bypass piping assembly 3800, and at least one bracket 3500. Often, thermal transfer unit 3200, which may include a coil, is at least partially disposed within casing 3100. Inlet piping assembly 3300 is coupled with thermal transfer unit 3200 for supplying liquid or gas to coil 3200, and outlet piping assembly 3400 is coupled with coil 3200 for receiving liquid or gas from coil 3200. This can be accomplished by coupling a first passage 3310 of inlet piping assembly 3300 with a supply port 3210 of thermal transfer unit 3200, and coupling a first passage 3410 of the outlet piping assembly 3400 with a return port 3220 of thermal transfer unit 3200. A second passage 3320 of inlet piping assembly 3300 can be coupled with an upstream fluid source 3330, and a second passage 3420 of outlet piping assembly 3400 can be coupled with a downstream fluid destination 3430.

It is appreciated that inlet piping assembly second passage 3320 and outlet piping assembly second passage 3420 each can be sealed, inlet piping assembly first passage 3310 can be in sealed communication with thermal transfer assembly supply port 3210, and outlet piping assembly first passage 3410 can be in sealed communication with the thermal transfer assembly return port 3220. Similarly, bypass piping assembly 3800 can be in sealed communication with inlet piping assembly 3300 and outlet piping assembly 3400 so as to provide a fluid passage therebetween, whereby the passage can be open and closed via operation of bypass shutoff valve 3810. When scaled in this fashion, thermal transfer unit 3200 can contain a vacuum, a non-pressurized fluid, or a pressurized fluid. Relatedly, zone-control unit 3000 includes a pressure gauge 3710 coupled with outlet piping assembly 3400. In some embodiments, pressure gauge 3710 may be coupled with thermal transfer unit 3200 or inlet piping assembly 3300. When bypass shutoff valve 3810 is in the open position, fluid can flow directly from inlet piping assembly 3300 to outlet piping assembly 3400 without flowing through thermal transfer unit 3200. When bypass shutoff valve 3810 is in the closed position, fluid can flow from inlet piping assembly 3300 to outlet piping assembly 3400 through thermal transfer unit 3200, without flowing through bypass piping assembly 3800. Inlet piping assembly 3300 may be coupled with a drain valve 3330, a Y-strainer 3340, a pressure/temperature port 3350, or a supply shutoff valve 3360, or any combination thereof. Outlet piping assembly 3400 may be coupled with control valve 3430, a manual balancing valve 3470, a vent (not shown), a pressure/temperature port 3450 disposed upstream of control valve 3430, a pressure/temperature port 3452 disposed downstream of control valve 3430, or a return shutoff valve 3460, or any combination thereof. Thermal transfer unit 3200 may be coupled with a vent 3230 such as an air vent. In the embodiment shown here, zone-control unit 3000 includes a duct interface 3110 which is coupleable with duct or casing 3100, which may be attached with or integral to a duct or ductwork of an HVAC system. Bracket 3500, which may include a handle, supports duct interface 3110, inlet piping assembly 3300, and outlet piping assembly 3400 with relative positions appropriate for use in an HVAC system or other climate control system. In some cases, bracket 3500 may be a handle configured to maintain duct or casing 3100, inlet piping assembly 3300, and outlet piping assembly 3400 in positional relationship. In some cases, a coil or heat exchanger, an inlet piping, and an outlet piping can form a closed and sealed system. In some cases, a coil or heat exchanger, a inlet piping, and the outlet piping can contain a pressurized fluid. Optionally, one or more headers may be coupled with a coil or heat exchanger, and form part of the sealed and pressurized space.

As shown in FIG. 14A, zone-control unit 3000 can include a damper assembly controller 3600, which may be coupled with casing 3100. Damper assembly controller 3600 may be configured to receive a signal from a thermostat or a room sensor (not shown). In some embodiments, damper assembly controller 3600 includes a direct digital control (DDC) controller equipped with Local Area Network (LAN) communication capability. Unit 3000 can also include an automatic temperature control (ATC) valve 3430, which is typically coupled with or part of outlet piping assembly 3400, and configured to receive a signal from damper assembly controller 3600 by connection with plenum rated actuator wires 3432, wireless transmission systems, or the like. In certain embodiments, ATC valve 3430 is a Nema 1 24V Belimo three way actuator. Accordingly, in some embodiments the present invention provides a three way water valve package (CCV).

Figure 15:
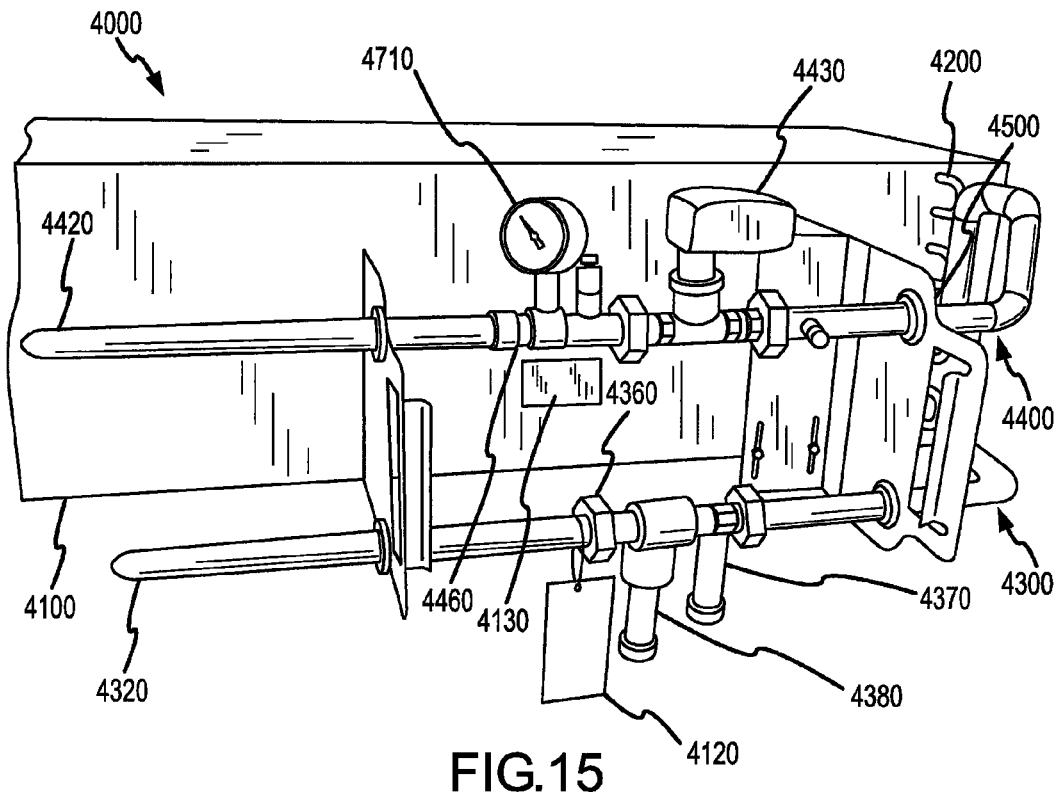
FIG. 15 illustrates a zone-control unit according to one embodiment of the present invention.

FIG. 15 illustrates a side view of a zone-control unit 4000 for use in an HVAC system, according to one embodiment of the present invention. Zone-control unit 4000 includes a duct or casing 4100, a thermal transfer unit 4200, an inlet piping assembly 4300, an outlet piping assembly 4400, and at least one bracket 4500. Often, thermal transfer unit 4200, which may include a coil, is at least partially disposed within casing 4100. Inlet piping assembly 4300 is coupled with thermal transfer unit 4200 for supplying liquid or gas to coil 4200, and outlet piping assembly 4400 is coupled with coil 4200 for receiving liquid or gas from coil 4200. Zone-control unit 4000 includes a pressure gauge 4710 coupled with outlet piping assembly 4400. In some embodiments, pressure gauge 4710 may be coupled with thermal transfer unit 4200 or inlet piping assembly 4300. Inlet piping assembly 4300 may be coupled with a basket strainer 4380. Zone-control unit 4000 can be cleaned by fluid or water pressure without removing basket strainer 4380. Inlet piping assembly may also be coupled with a blow down drain 4370 for basket strainer 4380. Outlet piping assembly 4400 may be coupled with a control valve 4430. In the embodiment shown here, zone-control unit 4000 includes a casing 4100 which may be attached with a duct or ductwork of an HVAC system. Bracket 4500, which may include a handle, supports casing 4100, inlet piping assembly 4300, and outlet piping assembly 4400 with relative positions appropriate for use in an HVAC system or other climate control system. Zone-control unit 4000 may also include a custom digital imaging tag 4130 or custom PC router tag or validation package 4120 containing information regarding the configuration or manufacture of the unit. Information may be provided in electronic or paper format, and may include submittal information, O&M's of unit components, digital pictures of the product or components, QC sheets, wiring and piping diagrams, parts lists with model numbers and serial numbers, and the like. In some cases, a coil or heat exchanger, an inlet piping, and an outlet piping can form a closed and sealed system. In some cases, a coil or heat exchanger, a inlet piping, and the outlet piping can contain a pressurized fluid. Optionally, one or more headers may be coupled with a coil or heat exchanger, and form part of the sealed and pressurized space.

Figure 16:
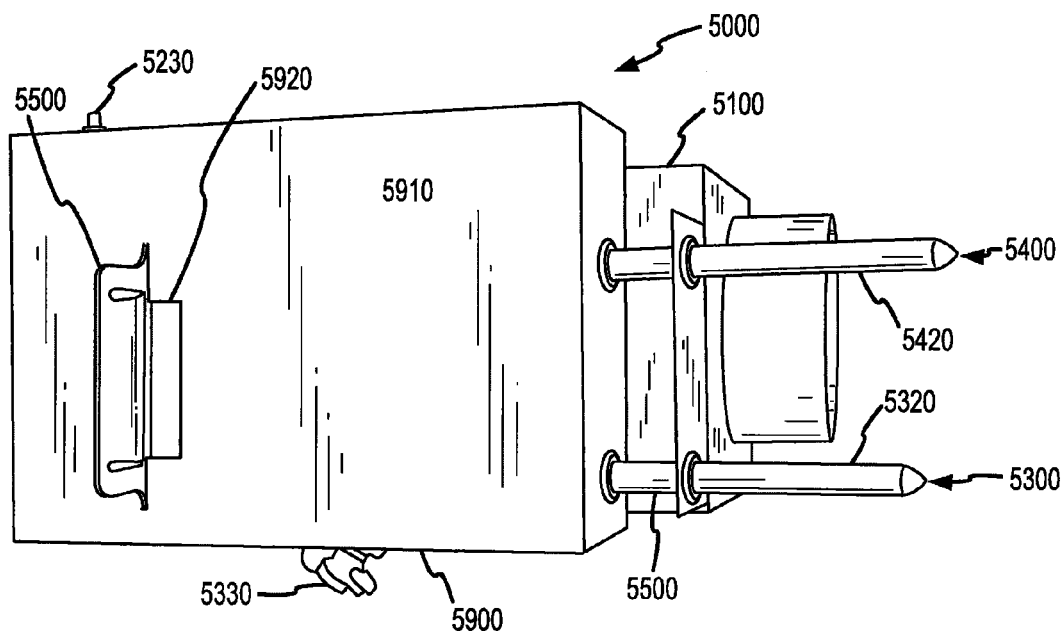
FIG. 16 illustrates a zone-control unit according to one embodiment of the present invention.

FIG. 16 illustrates a side view of a zone-control unit 5000 for use in an HVAC system, according to one embodiment of the present invention. Zone-control unit 5000 includes a duct or casing 5100, a thermal transfer unit (not shown), an inlet piping assembly 5300, an outlet piping assembly 5400, and at least one bracket 5500. Zone-control unit 5000 also includes a housing 5900 coupled with casing 5100, such that housing 5900 encompasses ATC valve (not shown) and other components of zone-control unit 5000 as described elsewhere herein. For comparative reference with other figures of the present disclosure, zone-control unit 5000 is depicted here showing a vent 5230, a drain valve 5330, an inlet piping assembly second passage 5320 and an outlet piping assembly second passage 5420. A housing cover 5910 of housing 5900 may have an aperture 5920 through which bracket 5500 may extend, or through which bracket 5500 may be otherwise accessible via an operator's hands, a forklift, or other maneuvering apparatus used during transportation, shipping, or installation. Zone-control unit 5000 may also have a validation package 4120, which may include a digital picture of the zone-control unit 5000 or components thereof, a quality control sheet, an operations and maintenance document, a parts list with model and serial numbers, an Indoor Air Quality (IAQ) certification, or a piping, electrical, and controls schematic, or any combination thereof. These components of validation package 4120 may be stored in a plastic pouch and attached with unit 6000. It is appreciated therefore that the present invention can be conveniently tested, validated, standardized, cataloged, and certified prior to shipping or installation.

Figure 17:
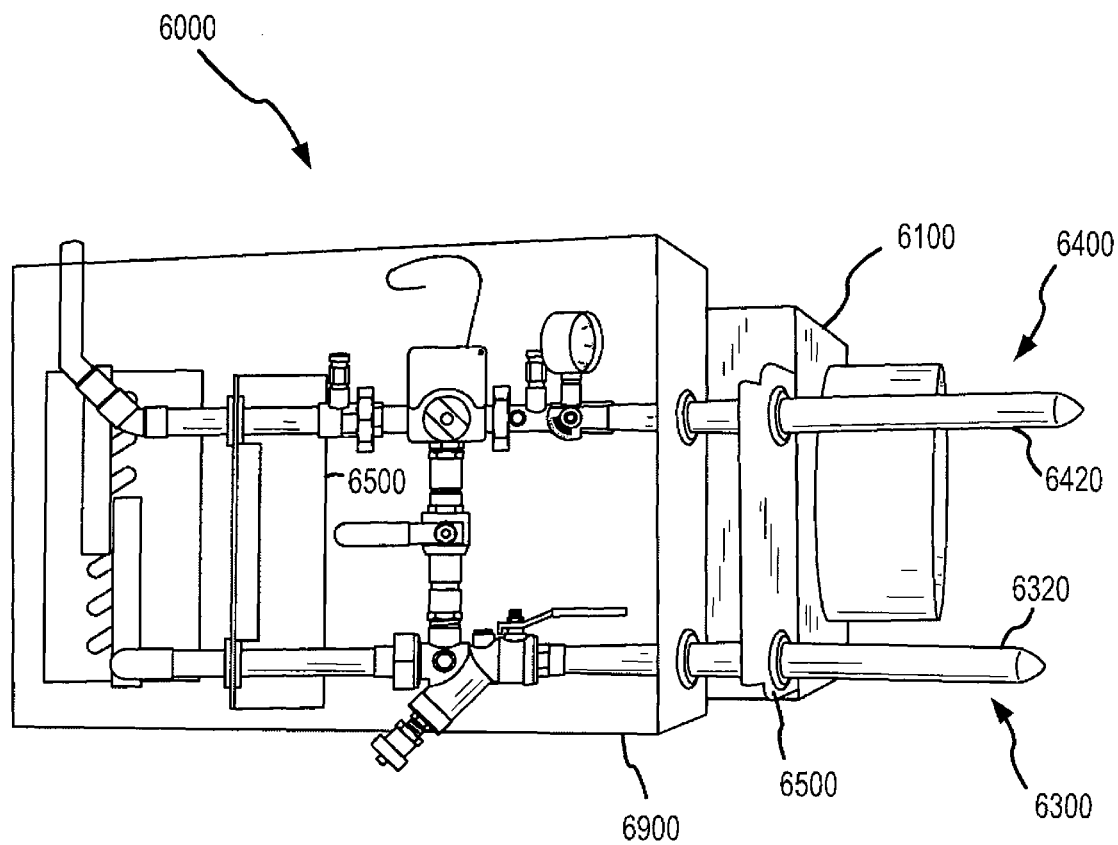
FIG. 17 illustrates a zone-control unit according to one embodiment of the present invention.
Figure 18A:
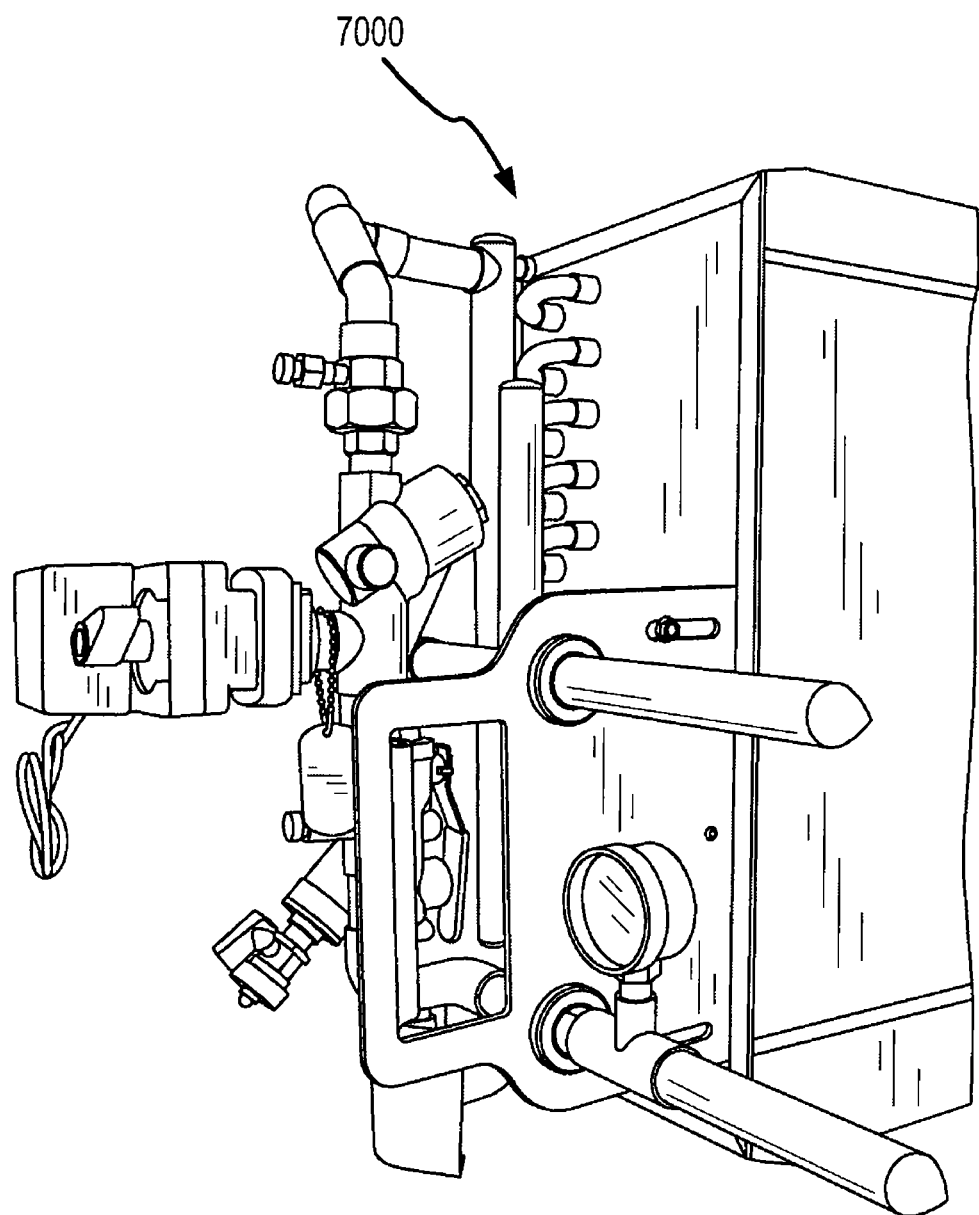
FIGS. 18A-18E illustrate a heat exchanger/coil packaged with ancillary components.
Figure 18B:
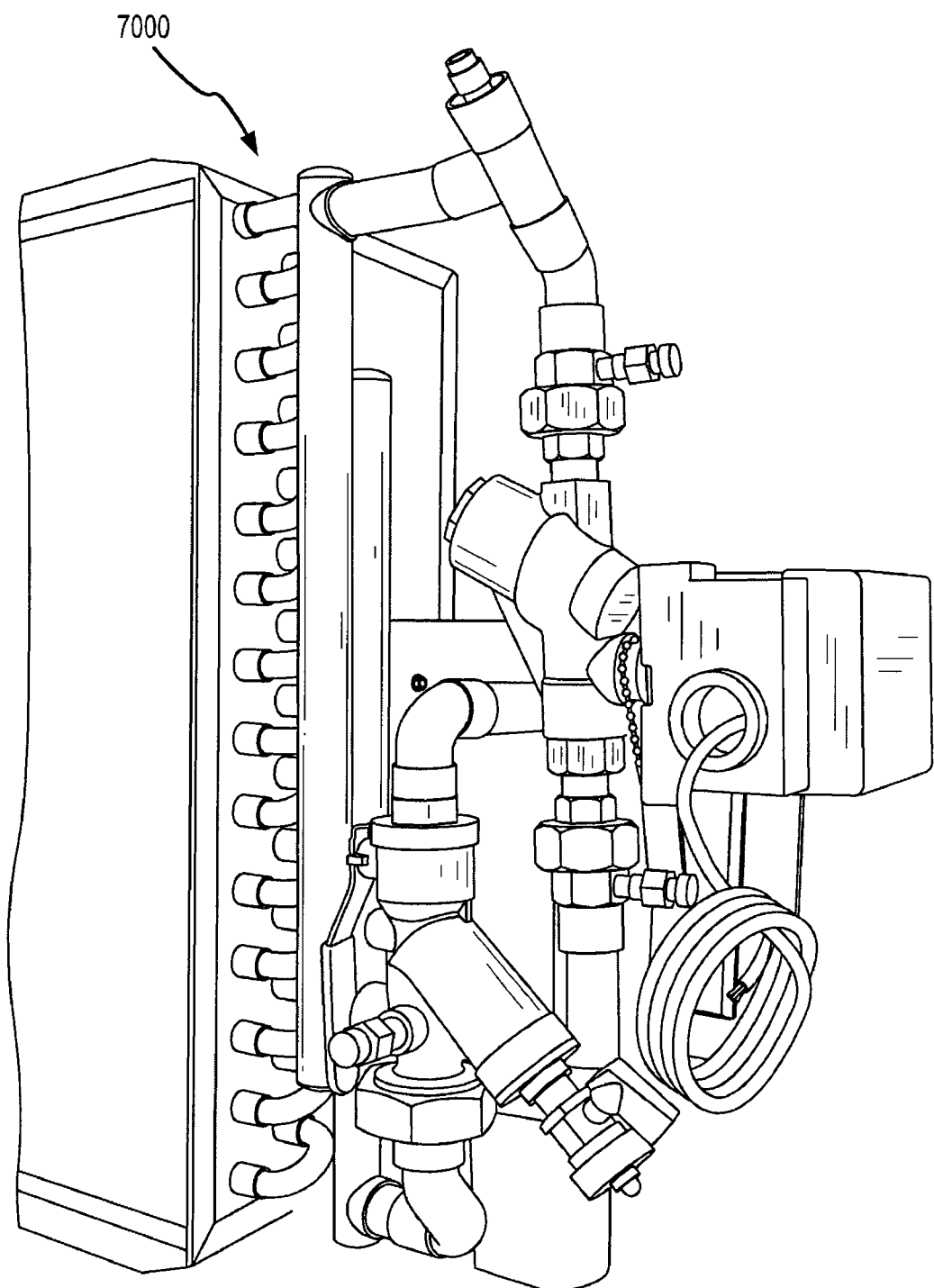
Figure 18C:
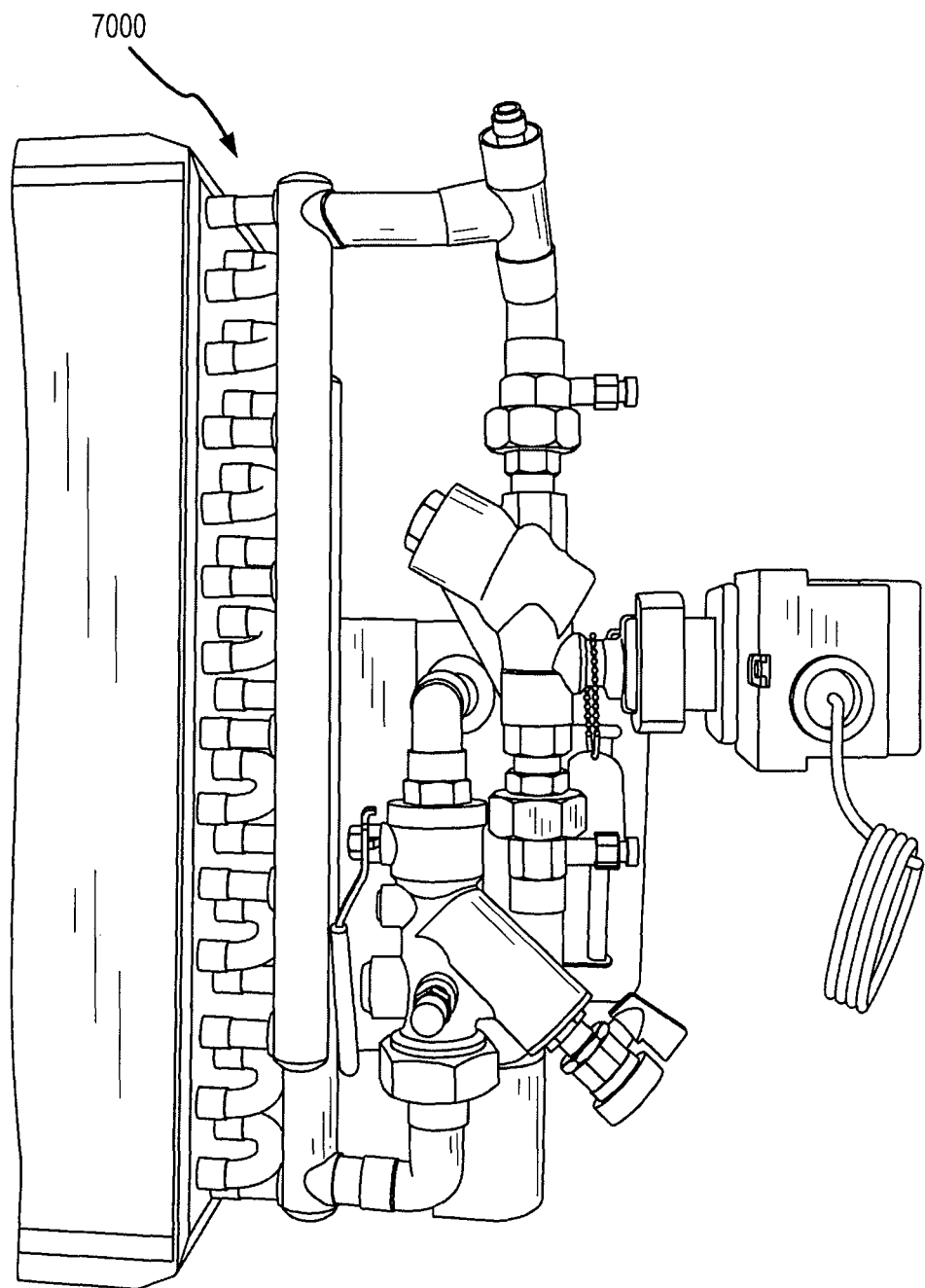
Figure 18D:
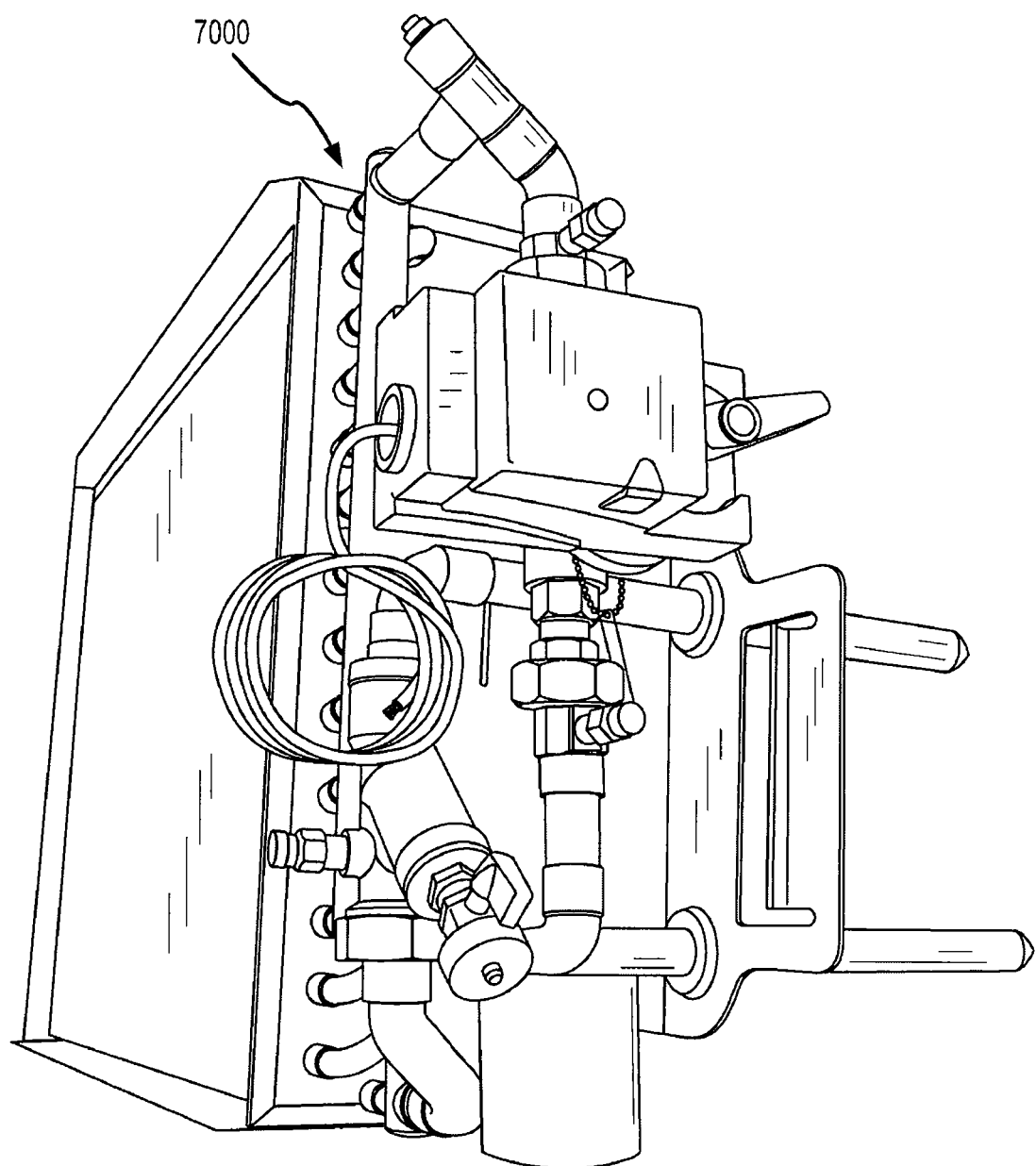
Figure 18E:
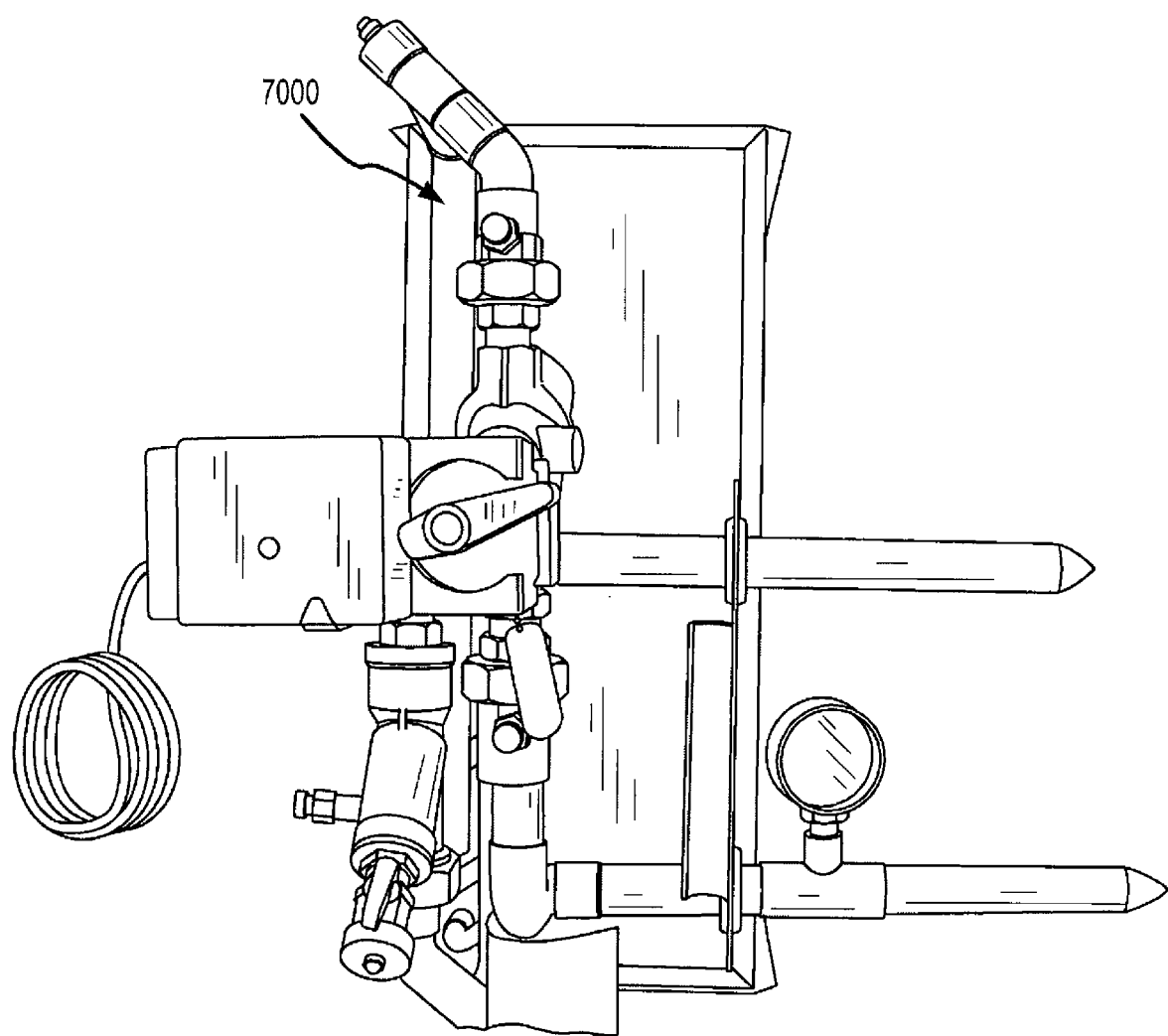

FIG. 17 illustrates a side view of a zone-control unit 6000 for use in an HVAC system, according to one embodiment of the present invention. In many ways, the embodiment shown in FIG. 17 is similar to that shown in FIG. 16. Zone-control unit 6000 includes a duct or casing 6100, an inlet piping assembly 6300, an outlet piping assembly 6400, and at least one bracket 6500. Zone-control unit 6000 also includes a housing 6900 coupled with casing 6100, such that housing 6900 encompasses various components of zone-control unit 6000 as described elsewhere herein, and to avoid prolixity are not described in detail here. The zone-control unit 6000 embodiment shown in FIG. 17 differs from the zone-control unit 5000 shown in FIG. 16, however, in a housing cover (not shown) of zone-control unit 6000 is removed, thereby exposing various elements contained in housing 6900. In some embodiments, the zone-control unit complies with a standard such as a Leadership in Energy and Environmental Design (LEED) standard, an American Society of Heating, Refrigerating, and Air Conditioning Engineers (ASHRAE) standard, an Air-Conditioning and Refrigeration Institute (ARI) standard, or a building code standard, or any combination thereof. Zone-control unit 6000 may be a capital piece of equipment, depreciable, and can be stocked by local distributors anywhere in the world as an "off the shelf" product. Zone-control unit 6000 is well suited for installation in a new HVAC system, or for retrofit in an existing HVAC system. It is also appreciated that the present invention also provides for the manufacture and installation of the zone-control units discussed herein. Such manufacture will often occur remotely from a job installation site, and may be performed by a union member selected from the group consisting of the United Association of Journeymen and Apprentices of the Plumbing and Pipefitting Industry of the United States and Canada, the construction sheet metal union, and the electrical union. In other embodiments, such union(s) may certify the fabrication site and/or supplier as being in compliance with the applicable union rules, that use of certain catalogued HVAC units complies with applicable union requirements and/or docs not constitute a customized product so as violate work preservation rules. Relatedly, zone-control units or components thereof may be constructed by a manufacturing facility that is a signatory to any of these unions. Such manufacturing facilities may also have an Underwriter's Laboratory certification. Accordingly, zone-control units may include or be affixed with certain union, standards, or certification compliance labels.

FIGS. 18A-18E illustrate a heat exchanger coil 7000 packaged with components similar to those described above, with some or all of the components supported by support structures or handles. The heat exchanger coil, piping, valves, and/or valve controllers may be pre-assembled prior to shipping to a construction job site, with some or all of the assembly optionally being performed using robotic fabrication techniques and systems. The support structures or handles can facilitate handling and installation of the assembled unit, protect the unit and components thereof during shipping, and may also be used to support the unit after installation. The piping may terminate with sealed piping stubs during shipping and installation, with a pressure sensor and gauge allowing quick verification of the piping assembly integrity. Along with heat exchanger/coil units, other HVAC units such as fan coil units and the like may benefit from the systems and methods described herein. Standardization, quality control and tracking, and other improved structures and method described herein may also be implemented with such units. In some cases, a coil or heat exchanger, an inlet piping, and an outlet piping can form a closed and sealed system. In some cases, a coil or heat exchanger, a inlet piping, and the outlet piping can contain a pressurized fluid.

Figure 19A:
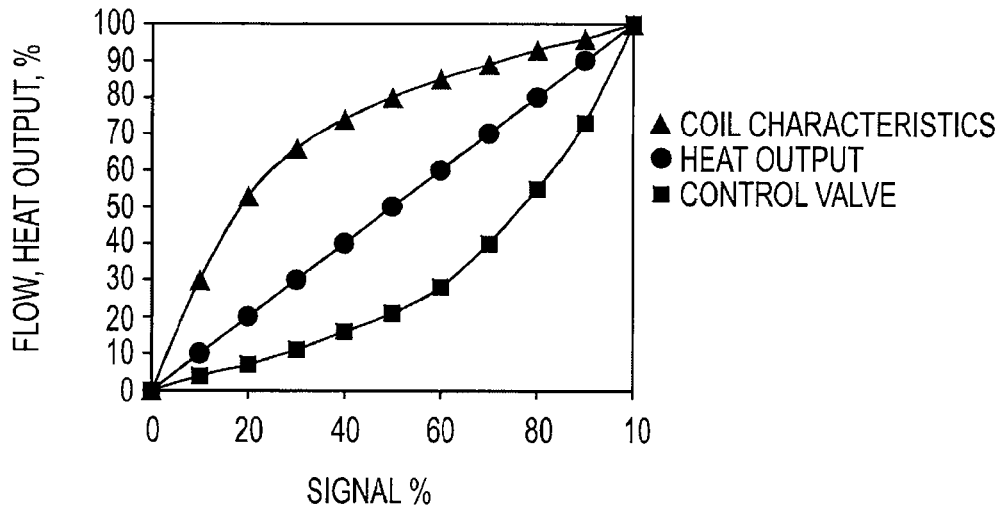
FIGS. 19A-19B illustrate differing HVAC units having standardized components, along with aspects of those components.
Figure 19B:
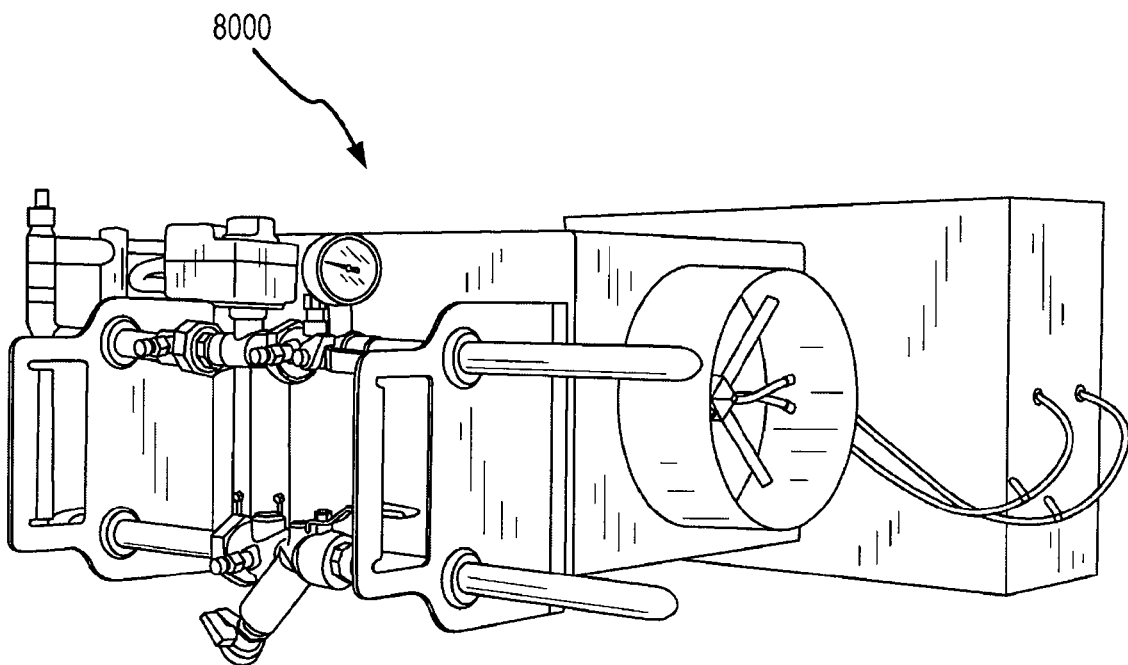

FIGS. 19A-19B generally illustrate standardization of components in differing HVAC units. Rather than attempting to minimize the costs of individual components of the many HVAC units in an HVAC system (which can lead to extensive on-site work, delays, and large installation labor costs), overall system installation efficiencies can be enhanced through the use of more standardized components, even if those components have capacities that exceed the requirements of some units.

Proportional valves (including those having characteristics similar to those graphically illustrated in FIG. 19A, such as the Belimo™ PICCV pressure independent proportional ball valve) and the like can facilitate integration of a single type of HVAC unit in multiple locations having differing specifications, tailoring the functioning of the unit by though appropriate use of the electronic controller software. FIG. 19B illustrates an HVAC hot water coil piping package unit 8000, while FIGS. 12A and 13A illustrate an HVAC proportional hot water valve package unit and a 2 way water valve package unit, respectively. FIG. 12B illustrates a support structure or handle which may be used in both, and FIG. 14A illustrates a 3 way water valve package unit. Despite the significant differences between these units, many, most, or all of the components (including piping components) may be common, with the aspect ratio of the piping optionally being identical. In some embodiments, zone-control units or heat exchanges can have pipe components with dimensions or configurations that are standardized or customized. For example, zone-control units can be manufactured to provide spun copper caps that are of a standard length or dimension, that are separated by a standard distance, and that are oriented in a standard direction. Relatedly, zone-control units can be manufactured to provide piping assemblies, pipes, and other piping aspects that conform with a prescribed specification. In some cases, pipe components such as piping assemblies or end caps can have equal or otherwise prescribed lengths, or can spaced apart from each other at certain known or predetermined distances. Similarly, zone-control units can be configured so as to provide a standardized or customized distance between the piping assemblies of a single unit. Accordingly, sets of two or more zone-control units can be manufactured according to certain piping component specifications (e.g. length, dimension, orientation, and the like). Such standardization or customization can be applied to any of a variety of sizes and configurations of zone-control units or heat exchangers, and can provide heretofore unrecognized advantages and efficiencies in building construction and repair. For example, multiple zone-control units, each having a different size and configuration, can be manufactured having a standardized distance between piping assemblies or end caps, or between central longitudinal axes defined by such components.

Figure 20:
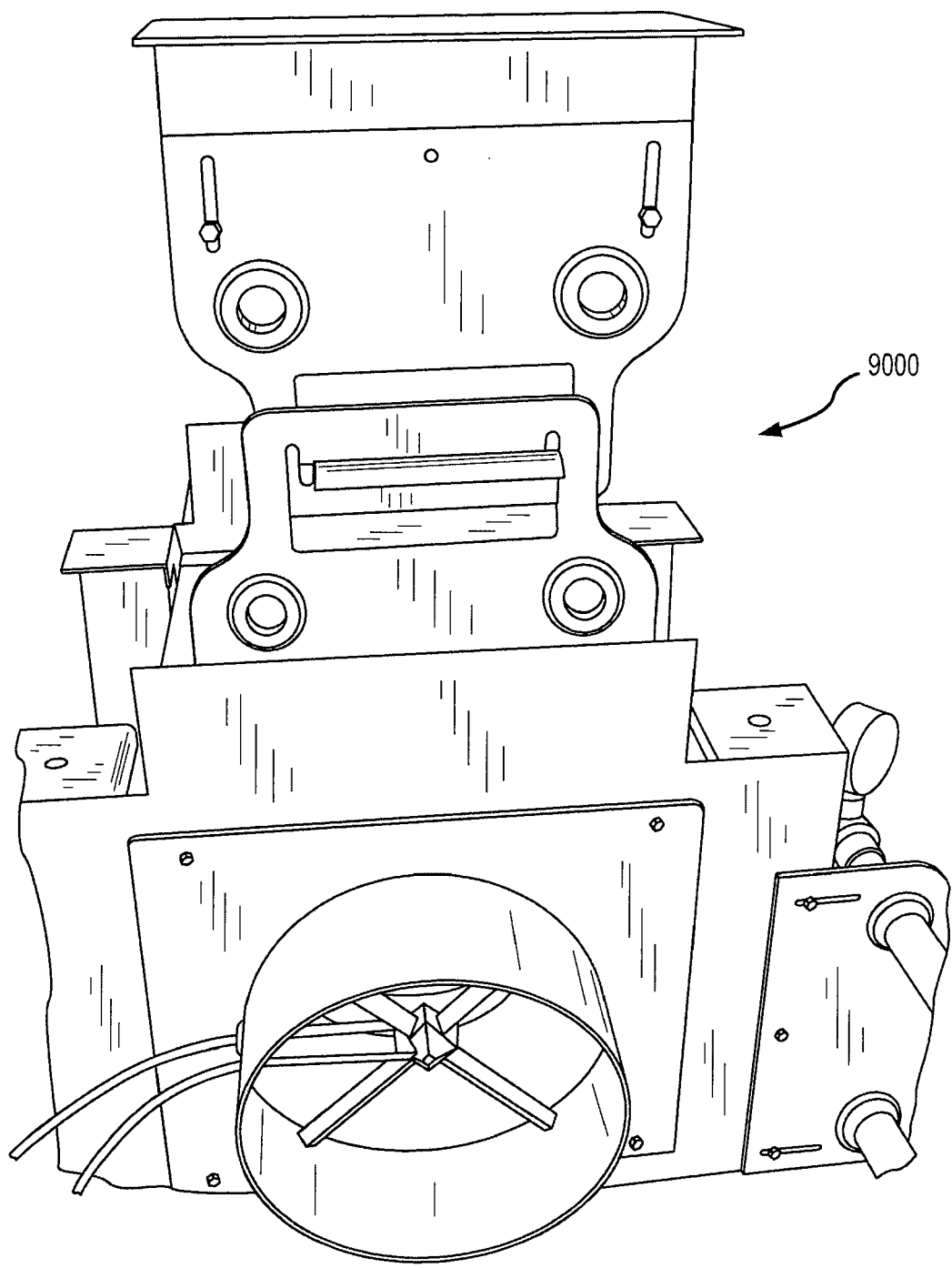
FIG. 20 illustrates interfacing of HVAC unit support structures, showing that the support structures can be used to suspend and support the HVAC unit for use in an HVAC system.

FIG. 20 illustrates engagement between the support structure or handle 9000 mounted to an HVAC unit and another similar corresponding support structure, allowing the support structures to be used as mounting fasteners. A plurality of different configurations of support structures can be provided with different sizes, different numbers, sizes, and configurations of holes and grommets for receiving piping, and the like. One or more supports may be secured to a joist, beam, or other building structure where the HVAC unit is to be installed. The unit support structure or handle is then lifted into engagement with the secured support(s), and the engaging surface at least temporarily "hanging" or maintaining the position of the HVAC unit. Fasteners may then affix the corresponding engaged support structures together to provide a secure and/or permanent installation. Deformable damping materials such as rubber, neoprene, resilient polymers, or the like along one or both of the engaging support surfaces can provide vibration and/or sound isolation. The support structures or handles may comprise carbon fiber, stainless steel, aluminum, plastic, or the like, and the engaging support structures may have similar shapes (as shown) or different shapes.

Figure 21A:
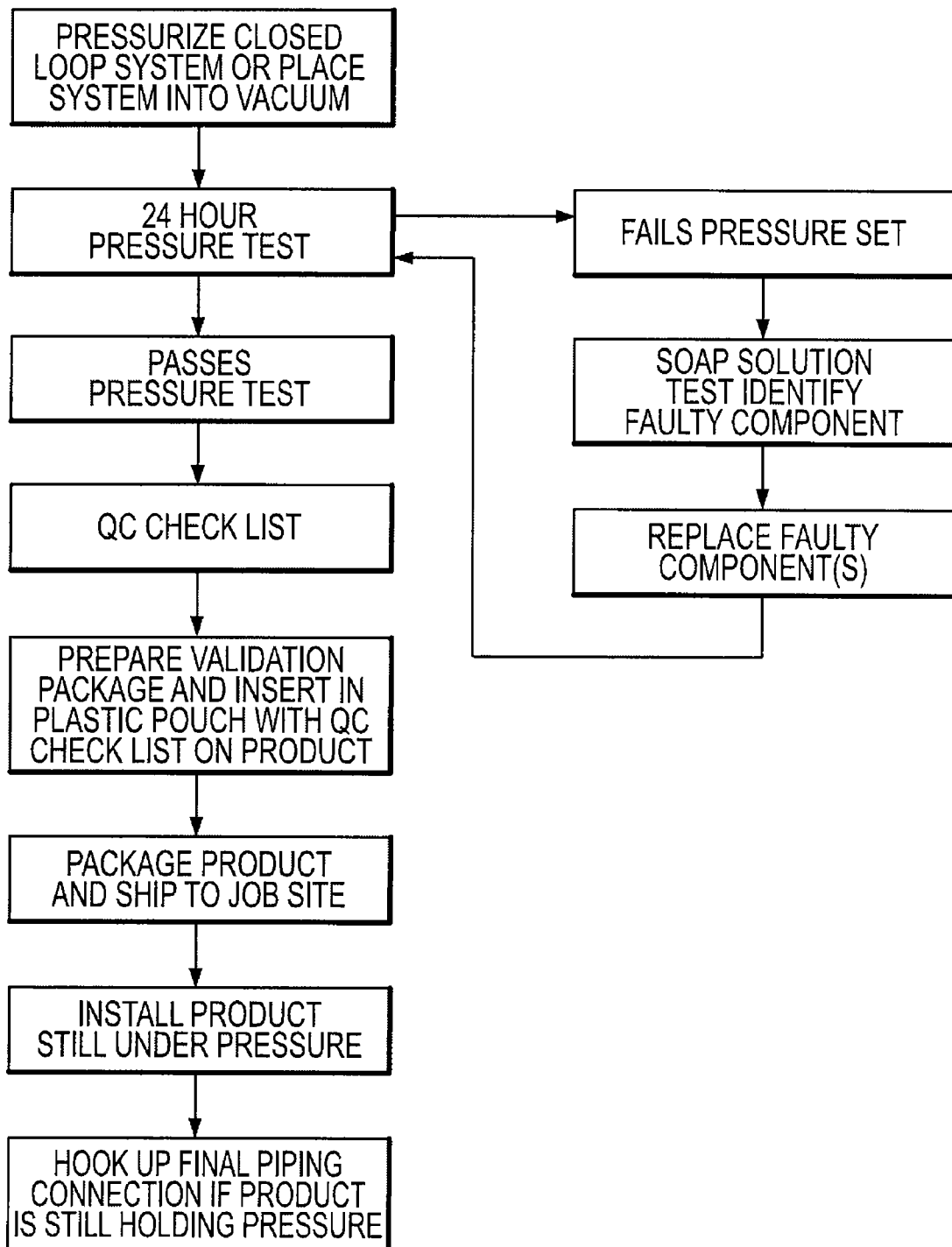
FIGS. 21A and 21B illustrate a quality control process and method for providing HVAC units and assembling and HVAC system.
Figure 21B:
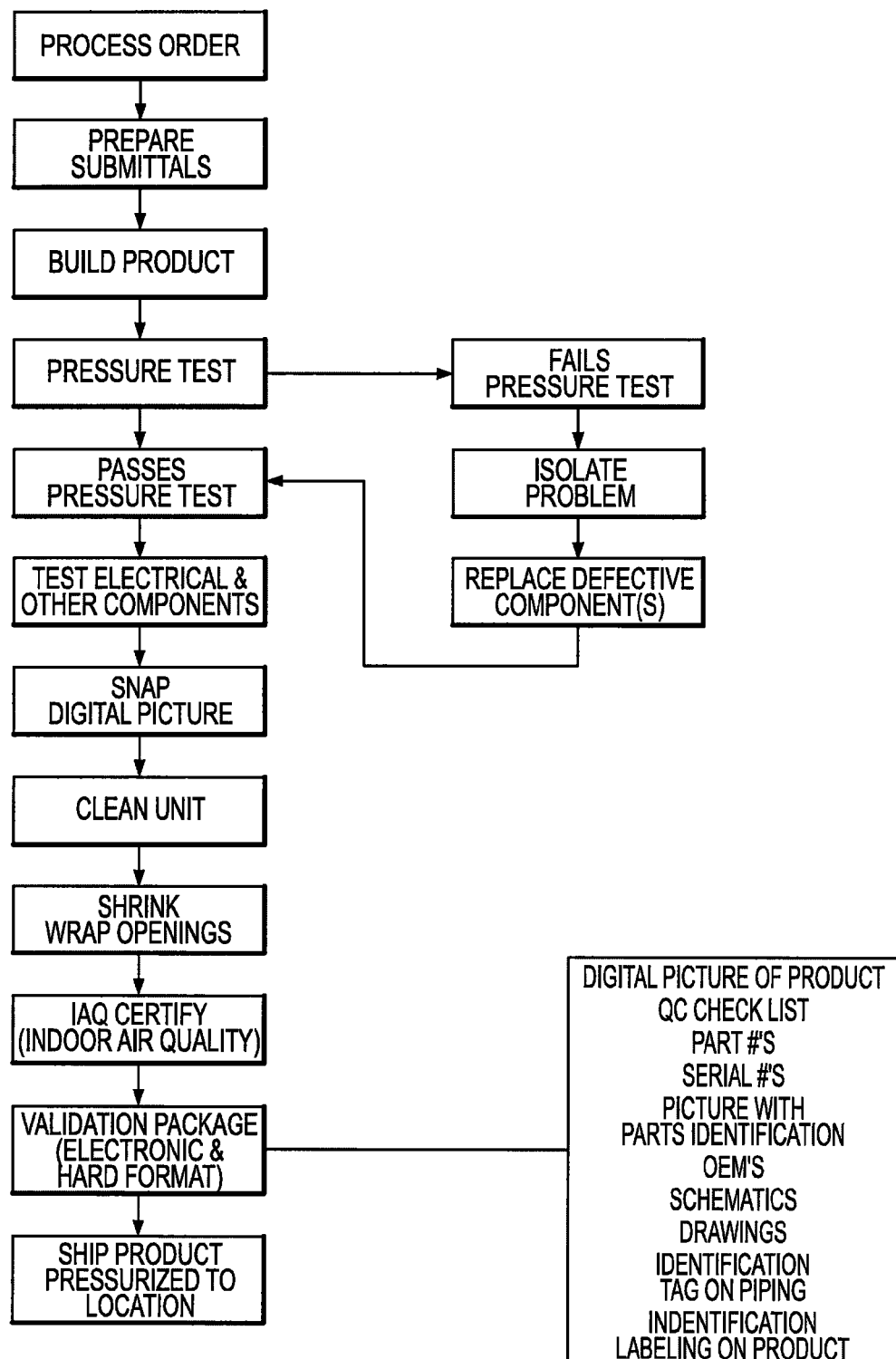

FIGS. 21A and 21B illustrate methods for testing and validation of HVAC units. HVAC units. Unit ordering and fabrication can be automated, and testing of piping by pressurizing piping assemblies, sealing, and verifying an acceptable pressure is maintained after a test period (for example, 24 hours) ensures leak-free fabrication. Any rework can be identified and completed prior to shipping to a constructions site, and quality control documentation (optionally comprising a magnetic media such as a floppy disk, an optical media such as a mini CD, a memory such as a flash memory stick, or some other tangible media embodying machine readable computer data, a print-out, a digital photograph, and/or the like) can be associated with each unit to validate the components and testing. In some embodiments, such quality control may be integrated into the HVAC signal transmission system so as to facilitate remote validation via LAN conductors or a wireless network system, and/or radio frequency identification or RFID techniques and structures may be employed.

Figure 22:
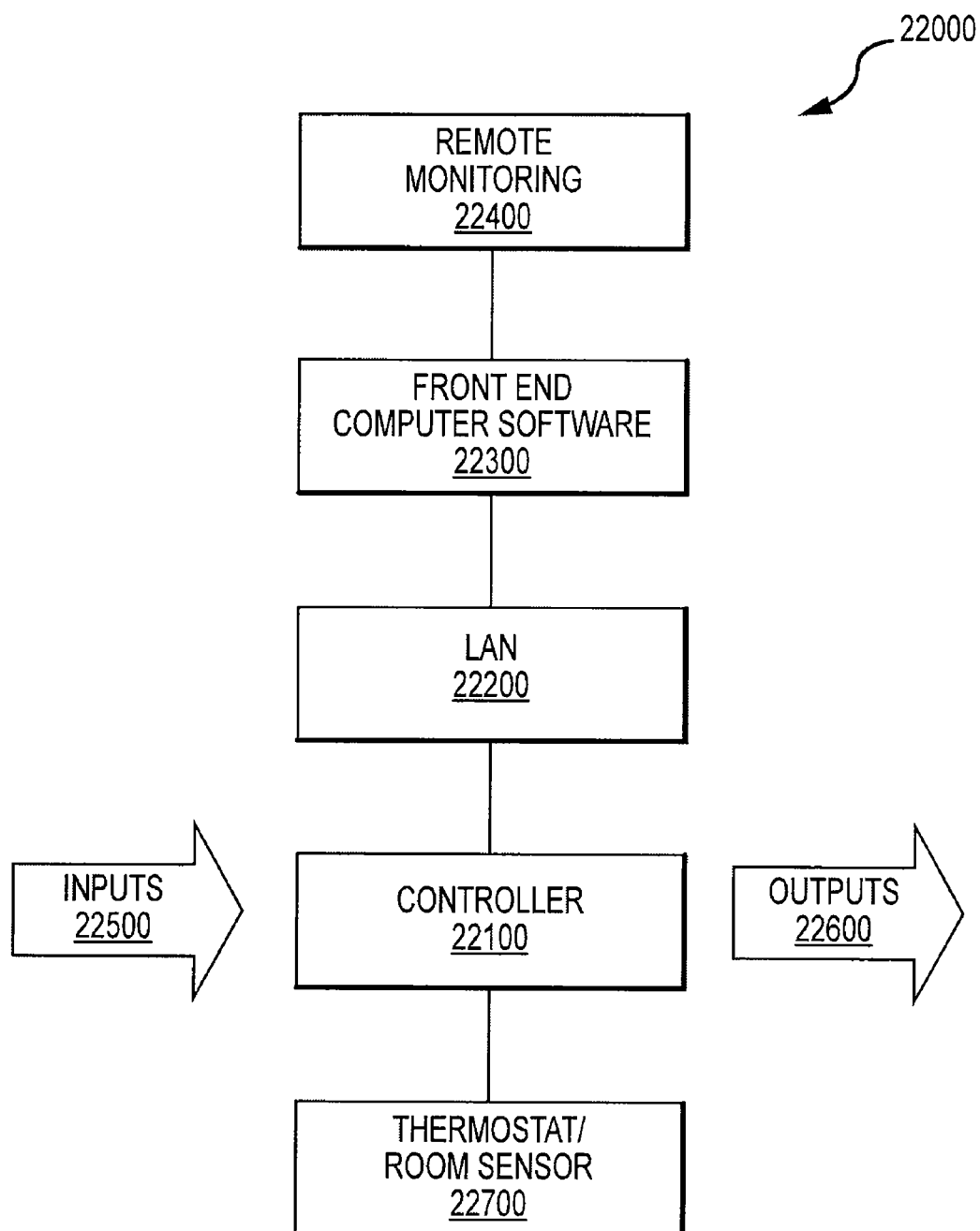
FIG. 22 shows a control assembly for an HVAC system according to embodiments of the present invention.

FIG. 22 shows a control assembly 22000 for an HVAC system according to one embodiment of the present invention. Control assembly 22000 includes a controller 22100, a LAN 22200, a front end computer software 22300, a remote monitoring component 2240, and a thermostat or room sensor 22700. Control assembly 22000 may also receive a variety of inputs 22500 from, and transmit a variety of outputs 22600 to, a zone control unit or other HVAC component such as a proportional hot water valve package (PICCV), a two way water valve package (CCV), and the like. In some cases, control assembly 22000 can be in operative association with, for example, a factory precalibrated self balancing zone control unit or heat exchanger. Zone control units can include pressure/temperature ports, discharge air sensors, analog or digital pressure gauges, temperature resistors, and the like which can provide input to controller 22100. Similarly, controller 22100 can provide output to various components of a zone control unit, such as proportional actuators. These interconnectivities can allow a zone control unit to regulate pressure automatically. In some cases, a thermostat or room sensor 22700 may have a setpoint, and contain a digital display for showing pressure, gpm, space temperature, leaving air temperature, setpoint, and the like. Often these attributes or aspects thereof are transmitted from controller 22100 to thermostat 22700. Relatedly, room temperature, setpoints, and other variables can be transmitted from thermostat 22700 to controller 22100. Connectivity between various components of control assembly 22000, and between components of control assembly 22000 and other HVAC components, can be hardwired, wireless, or a combination thereof.

In one embodiment, a zone control unit includes a Belimo PICCV pressure independent automatic control valve or other pressure independent balancing valve on a heat exchanger such that water field balancing is eliminated or reduced. Components and sensors can be pre-calibrated at the factory. A sensor can be mounted in a plenum near the heat exchanger that senses leaving air temperature, pressure, and other variables. The plenum can be added at the factory. A room sensor or thermostat can be mounted in a desired room or zone. Controllers such as a DDC controller can be used with this system, and can be mounted, wired and pre-programmed at the factory. The controller can take inputs from the various sensors that are pre-wired to the controller at the factory. An exemplary sequence of operation can be described as follows. The temperature in the room is 70° F. and the occupant wishes to raise the temperature to 72° F. by adjusting the room sensor or thermostat to the desired set point. That signal is sent to the DDC controller. The leaving air temperature sensor senses or reads 70° F. at a heat exchanger discharge, and provides an input signal to the DDC controller. The DDC controller processes the two inputs: the room sensor and the leaving air sensor. The controller then sends a signal to the actuator on the automatic temperature control (ATC) valve actuator to open the valve and increase the gpm flow to heat exchanger coil thus raising the leaving air temperature (LAT) to an effective set point (e.g. 74° F.) until the room sensor measures the room air at 72° F. A balancing valve can be pressure independent and set at the factory so as to maintain a gpm regardless of pressure. In some cases, if more flow or hotter water is needed, a controller can send signals to a computer with front end software, and the computer can send signals to pumps or a boiler to adjust the temperature or gpm. Once the room sensor measures the desired set point, the controller closes the ATC valve thus limiting the gpm/flow through the heat exchanger device and maintaining the desired set point to extreme or programmed tolerances. This sequence of operation can occur every second. If the room temperature sways in any direction by even 0.01° F. or less, the LAT temperature can be adjusted immediately at the heat exchanger to maintain the desired temperature. This process can save significant amounts of energy, can control the space temperature precisely, can provide for better indoor air quality, and can qualify the system for LEED building points/Green building initiative. Furthermore, the entire water side of the system can be completely self balancing. The need for technicians to go to the job site and balance, calibrate, take readings, and the like can be eliminated or reduced. Regulation can be accomplished through the building automation control system and can be self correcting automatically. This can be accomplished by providing a portable piping structure on the heat exchanger, which confers the ability to ship the heat exchanger with the portable piping structure attached, without incurring damage. By doing this, it is possible to add these features and benefits, including pre-calibration and pre-programming, to the portable piping structure of the heat exchanger on a cost effective basis, and also to associated products into which heat exchangers are installed. Similarly, it is possible to add these features and benefits to stand alone heat exchangers.

These approaches are well suited for a variety of environments, including biotech laboratories, clean rooms, offices, and the like. These techniques can provide for constant, realtime adjustments to maintain desired setpoints. Embodiments disclosed herein can be used to replace or reduce the need for manual balancing, and can modulate ATC valves to keep gpm appropriately adjusted.

Figure 23:
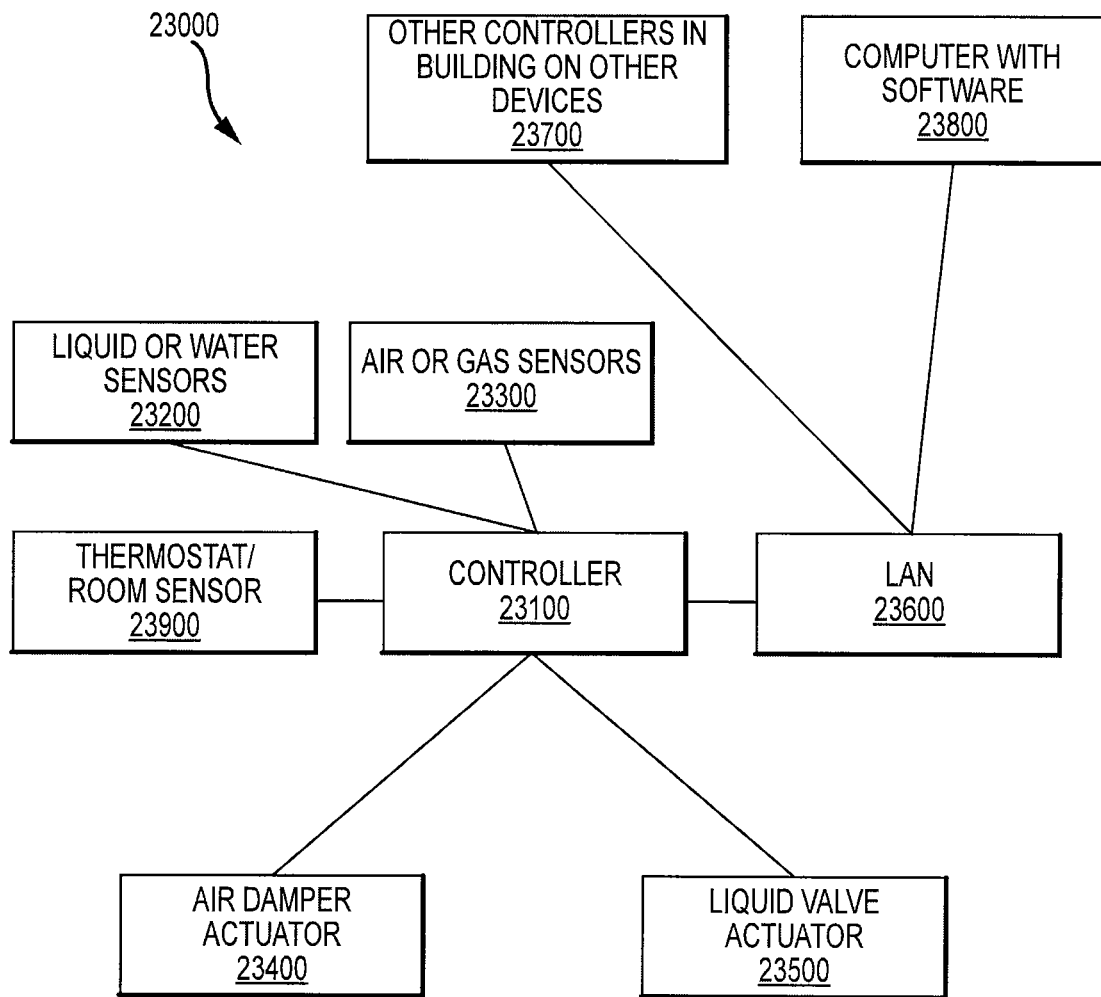
FIG. 23 shows a zone control unit or heat exchanger smart control configuration according to embodiments of the present invention.

FIG. 23 shows an embodiment of a zone control unit or heat exchanger smart control configuration 23000. Configurations such as these can be used for one or more zones or products. A controller 23100, which optionally includes a read out or display, receives input from liquid sensors 23200 such as flow sensors, pressure sensors, and the like. Controller 23100 also receives input from air sensors 23300 such as leaving air temperature sensors, pressure sensors, and the like. Controller 23100 can provide output to an air damper actuator 23400, a liquid valve actuator 23500, or other zone control unit or heat exchanger component. Controller 23100 may also receive data from, and transmit data to, a LAN, which may be in operative association with one or more controllers 23700 of other devices in the building, and with a computer 23800 containing operational software. Controller 23100 may also receive data from, and transmit data to, a thermostat 23900 with a room sensor and a setpoint adjustment with read out. Thermostat 23900 can display any parameter of a zone control unit or heat exchanger including flows, temperatures, pressures, and the like. Similarly, thermostat 23900 can display all data transmitted between controller 23100 and thermostat 23900. A technician can trouble shoot this configuration via readouts from thermostat 23900, controller 23100, or other components. In some embodiments, a technician can trouble shoot from a wireless PDA which is in operative association with one or more components of configuration 23000. Any parameter of configuration 23000 can be set at a manufacturer's factory and can be pre-calibrated. For example, air and water balancing and calibration can be done at the factory. Thereafter, any air and water balancing changes in the field can be accomplished via a computer which may be remotely linked with the configuration. In this way, a system can be self-balancing and energy efficient. Moreover, the system exhibits improved indoor air quality (IAQ) control, comfort, and response time.

Table 1 shows an example of a PICCV pressure independent ATC valve three point floating with ninety second stroke time values.

TABLE 1

| Range | Setpoint | Actual | Value | Open | op | Stroke Time |
|-------|----------|--------|-------|------|-----|-------------|
| .1-2  | 72       | 71     | 1     | 10%  | 75  | 9           |
|       |          | 70     | 2     | 20%  | 80  | 9           |
|       |          | 69     | 3     | 30%  | 85  | 9           |
|       |          | 68     | 4     | 40%  | 90  | 9           |

TABLE 1-continued

| Range | Setpoint | Actual | Value | Open | op  | Stroke Time           |
|-------|----------|--------|-------|------|-----|-----------------------|
|       |          | 67     | 5     | 50%  | 95  | 45 second stroke time |
|       |          | 66     | 6     | 60%  | 100 | 9                     |
|       |          | 65     | 7     | 70%  | 105 | 9                     |
|       |          | 64     | 8     | 80%  | 110 | 9                     |
|       |          | 63     | 9     | 90%  | 115 | 9                     |
|       |          | 62     | 10    | 100% | 120 | 90 seconds full open  |

Figure 24:
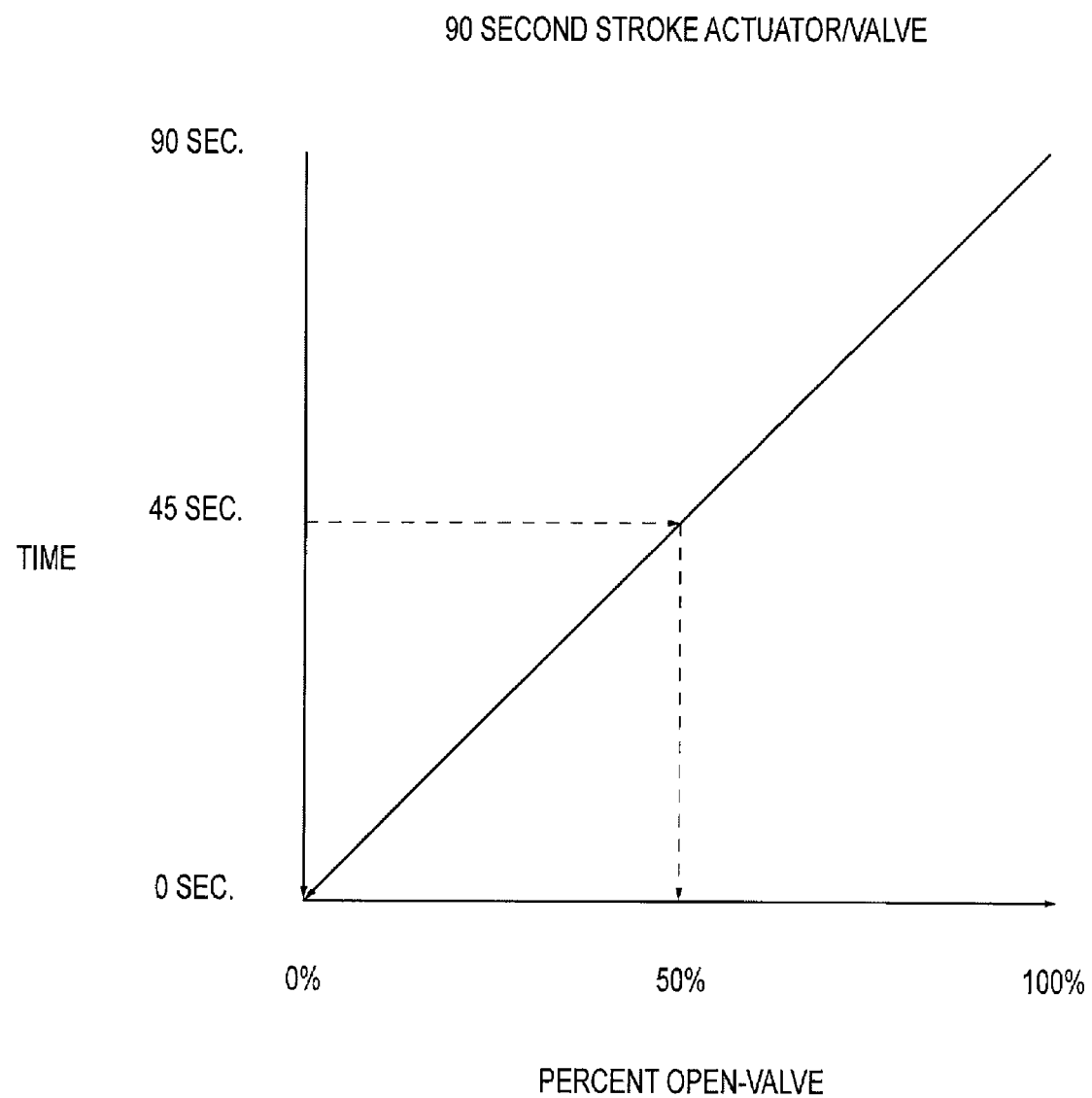
FIG. 24 shows graph of a front end mathematical calculation or algorithm based on desired performance and time values.

FIG. 24 shows graph of a front end mathematical calculation or algorithm based on desired performance and time values. Units can be accordingly bench tested and pre-calibrated and balanced at the factory.

Although zone control units, thermal transfer units, and other elements of environmental control systems discussed herein are often referred to in terms of HVAC units, it is appreciated that such zone control units, thermal transfer units, and the like may find use in any of a variety of control systems. Moreover, although transfer units are often described as, for example, coil structures, embodiments encompassed herein include any of a variety of transfer unit or control unit configurations. Piping structures and configurations disclosed herein can be used in any of a variety of heat exchanger devices, systems, or methods.

Heat exchangers can include fluid coils, steam coils, hot water coils, chilled water coils, de-humidification coils, sensible water coils, and the like. According to some embodiments, the terms "heat exchanger" and "coil" may be used interchangeably. Heat exchangers may also encompass evaporative coolers (e.g. direct, indirect, or combination), condenser water systems, air washers, humidifiers, plate and frame heat exchangers, shell and tube heat exchangers, and the like. Heat exchangers can transfer heat from one fluid to another, often without the fluids coming in direct contact with each other. Heat transfer can occur in a heat exchanger when a fluid changes from a liquid to a vapor (evaporator), a vapor to a liquid (condenser), or when two fluids transfer heat without a phase change. The transfer of energy can be caused by a temperature difference. In many HVAC or heating, ventilation, air conditioning, and refrigeration (HVAC&R) applications, heat exchangers are selected to transfer either sensible or latent heat. Sensible heat applications involve the transfer of heat from one liquid to another. Latent heat transfer results in a phase change of one of the liquids; transferring heat to a liquid by condensing steam is a common example. Heat exchangers for HVAC or HVAC&R applications can include counter-flow shell-and-tube or plate units. While both types physically separate the fluids transferring heat, their construction may be very different, and each can have unique application and performance qualities.

Equipment for cooling and dehumidifying an air stream under forced convection can incorporate a coil section that contains one or more cooling coils assembled in a coil bank arrangement. Such coil sections can be used as components in room terminal units, larger factory-assembled self-contained air conditioners, central station air handlers, and field built-up systems. In currently used approaches, applications of each coil type may be limited to the field within which the coil is rated. Other limitations may be imposed by code requirements, proper choice of materials for the fluids used, the configuration of the air handler, and economic analysis of the possible alternatives for each installation.

Coils can be used for heating and air cooling with or without accompanying dehumidification. Examples of cooling applications without dehumidification include (1) pre-cooling coils that use well water or other relatively high-temperature water to reduce load on the refrigerating equipment and (2) hot water/chilled-water coils that remove/add sensible heat from a chemical moisture-absorption apparatus. A heat pipe coil can also be used as a supplementary heat exchanger for preconditioning in air-side sensible cooling. Coil sections can provide air sensible cooling and dehumidification simultaneously.

An HVAC coil assembly can include a means of cleaning air to protect the coil from dirt accumulation and to keep dust and foreign matter out of the conditioned space. Although cooling and dehumidification are among their principal functions, cooling coils can also be wetted with water or a hygroscopic liquid to aid in air cleaning, odor absorption, or frost prevention. Coils can also be evaporatively cooled with a water spray to improve efficiency or capacity.

In finned coil embodiments, the external surface of the tubes is primary, and the fin surface is secondary. The primary surface generally consists of rows of round tubes or pipes that may be staggered or placed in line with respect to the airflow. Flattened tubes or tubes with other non round internal passageways can be used. The inside surface of the tubes is often smooth and plain. Some coil designs have various forms of internal fins or turbulence promoters (either fabricated or extruded) to enhance performance. The individual tube passes in a coil can be interconnected by return bends through the process of brazing (or hairpin bend tubes) to form the serpentine arrangement of multi pass tube circuits. Coils can include different circuit arrangements and combinations offering varying numbers of parallel water flow passes within the tube core.

Cooling coils for water, aqueous glycol, brine, or halocarbon refrigerants can have aluminum fins on copper tubes. Copper fins on copper tubes and aluminum fins on aluminum tubes (excluding water) can also be used. Adhesives can be used to bond header connections, return bends, and fin-tube joints, particularly for aluminum-to-aluminum joints. Certain coils can include an all-aluminum extruded tube-and-fin surface.

Core tube outside diameters can be $5/16$, $3/8$, $1/2$, $5/8$, $3/4$, and 1 inch, with fins spaced 4 to 18 per inch. Tube spacing can range from 0.6 to 3.0 inch on equilateral (staggered) or rectangular (in-line) centers. Spacing may depend on the width of individual fins and on other performance considerations. Fins can be spaced according to the job to be performed, with attention given to air friction, possibility of lint accumulation, and frost accumulation, especially at lower temperatures.

Tube wall thickness and the use of alloys other than copper can be determined by the coil's working pressure and safety factor for hydrostatic burst (pressure). Maximum allowable working pressure (MAWP) for a coil can be derived, for example, according to ASME's *Boiler and Pressure Vessel Code*, Section VIII, Division 1 and Section II (ASTM material properties and stress tables). The entire contents of this code are incorporated herein by reference. Pressure vessel safety standards compliance and certifications of coil construction may be required by regional and local codes before field installation. Fin type and header construction can also play a part in determining wall thickness and material. Local job site codes and applicable nationally recognized safety standards can be consulted in coil design and application.

Air-cooling constructions can have a shiny aluminum air-side surface. For some applications, a fin surface may include copper or have a brown or blue-green dip-process coating. These coatings can protect the fin from oxidation that can occur when common airborne corrosive contaminants are diluted on a wet (dehumidifying) surface. Corrosion protection may be important as indoor air quality (IAQ) guidelines continue to call for higher percentages of outside air. In some cases, baked-on or anodized coating can improve the expected service life compared to plain aluminum fins under similar conditions. In some situations, uncoated fins on non-dehumidifying, dry cooling coils may not be affected by normal ambient airborne chemicals, except, to some extent, in a saline atmosphere. Often, once a coil is installed, little can be done to improve air-side protection.

Incoming air stream stratification across a coil face can reduce coil performance. Proper air distribution can be defined as having a measured airflow anywhere on the coil face that does not vary more than 20%. Moisture carryover at a coil's air leaving side or uneven air filter loading may be an indication of uneven airflow through the coil. Corrective procedures can include installation of inlet air straighteners or an air blender if several airstreams converge at the coil inlet face. Additionally, in some cases condensate water should not be allowed to saturate the duct liner or stand in the drain pan or trough. Relatedly, in some cases the coil frame (or its bottom sheet metal member) should not be allowed to sit in a pool of water, to prevent rusting.

Exemplary coils include water and aqueous glycol coils. In some cases, desired performance of water-type coils may involve eliminating air and water traps in the water circuit and the proper distribution of water. Unless properly vented, air may accumulate in the coil tube circuits, reducing thermal performance and possibly causing noise or vibration in the piping system. Air vent and drain connections are often installed in the field at the job site on the piping components, but this typically does not eliminate the need to install, operate, and maintain the coil tube core in a level position. Individual coil vents and drain plugs are often incorporated on the ancillary field piping. Water traps in tubing of a properly leveled coil are often caused by (1) improper non draining circuit design and/or (2) center-of-coil downward sag. Such a situation may cause tube failure (e.g. freeze-up in cold climates or tube erosion because of untreated mineralized water).

Depending on performance requirements, fluid velocity inside the tube can range from approximately 1 to 8 fps for water and 0.5 to 6 fps for glycol. In some turbulators or grooved tube cases, in-tube velocities should not exceed 4 fps. The design fluid pressure drop across the coils can vary from about 5 to 50 ft of water head. For some nuclear HVAC applications, ASME Standard AG-1, Code on Nuclear Air and Gas Treatment, a minimum tube velocity of 2 fps may be desired or necessary. ARI Standard 410 may require a minimum of 1 fps or a Reynolds number of 3100 or greater. In some cases, such configurations may yield more predictable performance. The entire contents of these standards are incorporated herein by reference.

In some cases, the water may contain considerable sand and other foreign matter (e.g. pre-cooling coils using well water, or where minerals in the cooling water deposit on and foul the tube surface). It may be desirable to filter out such sediment. Where build-up of scale deposits or fouling of the water-side surface is expected, a scale factor can be included when calculating thermal performance of the coils. Cupronickel, red brass, bronze, and other tube alloys can help protect against corrosion and erosion deterioration caused by internal fluid flow abrasive sediment. The core tubes of properly designed and installed coils can feature circuits that (1) have equally developed line length, (2) are self-draining by gravity during the coil's off cycle, (3) have the minimum pressure drop to aid water distribution from the supply header without requiring excessive pumping head, and (4) have equal feed and return by the supply and return header. Design for proper in-tube-water velocity can determine the circuitry style required or desired. Multirow coils can be circuited to the cross-counter flow arrangement and oriented for top-outlet/bottom-feed connection.

The cooling capacity of water coils can be controlled by varying either water flow or airflow. Water flow can be controlled by a three-way mixing, modulating, and/or throttling valve. For airflow control, face and bypass dampers can be used. In some cases, when cooling demand decreases, the coil face damper starts to close, and the bypass damper opens. In some cases, airflow is varied by controlling fan capacity with speed controls, inlet vanes, or discharge dampers. Chapter 45 of the 2003 *ASHRAE Handbook-HVAC Applications* addresses air-cooling coil control to meet system or space requirements and factors to consider when sizing automatic valves for water coils. The entire contents of this handbook are incorporated herein by reference.

In an HVAC system, the relation of the fluid flow arrangement in the coil tubes to coil depth can influence performance of the heat transfer surface. Often, air-cooling and dehumidifying coils are multi row and circuited for counter flow arrangement. Inlet air may be applied at right angles to the coil's tube face (coil height), which may also be at the coil's outlet header location. Air can exit at the opposite face (side) of the coil where the corresponding inlet header is located. In some cases, counter flow can produce the highest possible heat exchange in the shortest possible (coil row) depth, because it may have the closest temperature relationships between tube fluid and air at each (air) side of the coil. The temperature of the entering air may more closely approach the temperature of the leaving air. The potential of realizing the highest possible mean temperature difference can thus be arranged for optimum performance. Coil hand can refers to either the right hand (RH) or left hand (LH) for counter flow arrangement of a multi row counter flow coil. A manufacturer can establish a RH or LH convention for their own coils.

A typical arrangement of coils can be present in a field built-up central station system. A cooling coil (and humidifier, when used) can include a drain pan under each coil to catch condensate formed during cooling (and excess water from the humidifier). A drain connection can be downstream of the coils, be of ample size, have accessible cleanouts, and discharge to an indirect waste or storm sewer. The drain may also include a deep-seal trap so that no sewer gas can enter the system. Precautions can be taken if there is a possibility that the drain might freeze. The drain pan, unit casing, and water piping can be insulated to prevent sweating.

Coil design features (e.g. fin spacing, tube spacing, face height, type of fins), together with the amount of moisture on the coil and the degree of surface cleanliness, can determine the air velocity at which condensed moisture blows off the coil. Often, condensate water begins to be blown off a plate fin coil face at air velocities above 600 fpm. It may be desirable to prevent water blow off from coils into air ductwork external to the air-conditioning unit. However, water blow off may not be a problem if coil fin heights are limited to, for example 45 inches, and the unit is set up to catch and dispose of condensates.

When selecting a coil, various factors can be considered. Job requirements may involve cooling, dehumidifying, and the capacity required to properly balance with other system components (e.g., compressor equipment in the case of direct-expansion coils). Factors may also encompass entering air dry-bulb and wet-bulb temperatures, available cooling media and operating temperatures, space and dimensional limitations, air and cooling fluid quantities, including distribution and limitations. Factors may also include allowable frictional resistances in air circuit (including coils), allowable frictional resistances in cooling media piping system (including coils), characteristics of individual coil designs and circuitry possibilities, individual installation requirements such as type of automatic control to be used, the presence of a corrosive atmosphere, any design pressures, and the durability of tube, fins, and frame material.

A cooling coil's airflow resistance (air friction) may depend on the tube pattern and fin geometry (tube size and spacing, fin configuration, and number o fin-line or staggered rows), coil face velocity, and amount of moisture on the coil. The coil air friction may also be affected by the degree of aerodynamic cleanliness of the coils core. Burrs on fin edges may increase coils friction and increase the tendency to pocket direct of lint on the faces. A completely dry coil, removing only sensible heat, may offers approximately one-third less resistance to airflow than a dehumidifying coil removing both sensible and latent heat. For a given surface and airflow, increasing the number of row or fins often increases airflow resistance. Therefore, final selection can involve economic balancing of the initial cost of the coil against the operating costs of the coil geometry, combinations available to adequately meet the performance requirements.

The heat transmission rate of air passing over a clean tube (with or without extended surface) to a fluid flowing within it may be impeded by certain thermal resistances: (1) surface air-side film thermal resistance from the air to the surface of the exterior fin and tube assembly, (2) metal thermal resistance to heat conductance through the exterior fin and tube assembly, and (3) in-tube fluid-side film thermal resistance, which impedes heat flow between the internal surface of the internal metal and the fluid flowing within the tube. For some applications, an additional thermal resistance can be factored in to account for external and/or internal surface fouling. Often, the combination of metal and tube-side film resistance is considerably lower than the air-side surface resistance.

Valves are often embodied by manual or automatic fluid-controlling elements in a piping system. Valves can be constructed to withstand a specific range of temperature, pressure corrosion, and mechanical stress. Valves can function to start, stop, and direct flow. Valves can also regulate, control, or throttle flow. Moreover, valves can prevent backflow, and can relieve or regulate pressure.

Any of a variety of service conditions can be considered when specifying or selecting a valve. A type of valve desired may depend on whether a fluid is liquid, vapor, or gas. A valve may be selected on the basis of whether the fluid is a true fluid or whether it contains solids. The selection may depend on whether the fluid remains a liquid throughout its flow, or whether it vaporizes. The selection may depend on whether the fluid is corrosive or erosive. Similarly, the selection can depend on the pressure and temperature of the fluid, and whether these parameters vary in the system. In some cases, the selection for the valve or valve material may depend on whether a worst case (e.g. maximum or minimum values) is considered. Flow considerations may also be taken into account. A valve selection may depend on whether a pressure drop is critical. In some cases, a valve design can be chosen for maximum wear. Other criteria involve whether the valve is used for simple shutoff or for throttling flow, whether the valve is used to prevent backflow, and whether the valve is used for directing (e.g. mixing or diverting) flow. The frequency of operation may also have an impact on valve selection. Criteria can involve whether the valve is operated frequently, whether the valve is normally open with infrequent operation, and whether the valve operation is manual or automatic.

A ball valve often includes a precision ball held between two circular seals or seats. Ball valves can have various port sizes. A 90 degree turn of the handle can change operation from fully open to fully closed. Ball valves for shutoff service may be fully ported. Ball valves for throttling or controlling and/or balancing service can have a reduced port with a plated ball and valve handle memory stop. Ball valves may be on one-, two-, or three-piece body design.

Automatic valves can be considered as control valves that operate in conjunction with an automatic controller or device to control the fluid flow. The "control valve" as used here can include a valve body and an actuator. The valve body and actuator may be designed so that the actuator is removable and/or replaceable, or the actuator may be an integral part of the valve body.

Computer-based control of automatic control valves can provide many benefits, including speed, accuracy, and data communication. Often, care should be exercised in selecting the value of control loop parameters such as loop speed and dead band (allowable set-point deviation). In some cases, high loop speed coupled with zero dead band can cause the valve-actuator to seek a new control position with each control loop cycle unless the actuator itself has some type of built-in protection against this. For example, a 1 s control loop with zero dead band can result in 30,000,000 repositions (corrections) in 1 year of service. Generally, valves control the flow of fluids by an actuator, which can move a stem with an attached plug. A plug can seat within the valve port and against the valve seat with a composition disk or metal-to-metal seating. Based on the geometry of the plug, distinct flow conditions can be developed.

Automatically controlled valves can be applied to control many different variables, including temperature, humidity, flow, and pressure. In some cases, a valve can be used directly to control flow or pressure. In some cases, when flow is controlled, a pressure drop is implied, and when pressure is controlled, some maximum flow rate is implied. These two factors can be considered in selecting control valves. Control valves can be used with hot water, chilled water, steam, and virtually any fluid. The fluid characteristics can be considered in selecting materials for the valve. In some cases, requirements may be strict for use with high-temperature water and high-pressure steam.

Approaches for balancing hydronic systems include (1) a manual valve with integral pressure taps and a calibrated port, which permits field proportional balancing to the deign flow conditions, and (2) an automatic flow-limiting valve selected to limit the circuit's maximum flow to the design flow. Manual balancing valves can be provided with various features, such as manually adjustable stems for valve port opening or a combination of a venturi or orifice and an adjustable valve, a stem indicator and/or scale to indicate the relative amount of valve opening, pressure taps to provide readout of the pressure difference across the valve port or the venturi/orifice, the capability to be used as a shutoff for future service of the heat transfer terminal, a locking device for field setting the maximum opening of a valve, or a body tapped for attaching drain hose.

Embodiments encompass automatic flow-limiting valves and pressure independent valves. A differential pressure-actuated flow valve, also called an automatic flow-limiting valve, can regulate the flow of fluid to a preset value when the differential pressure across it is varied. This regulation (1) helps prevent an overflow condition in the circuit where it is installed and (2) aids the overall system balance when other components are changing (modulating valves, pump staging, etc.). Often, the valve body contains a moving element containing an orifice, which adjusts itself based on pressure forces so that the flow passage area varies. A balancing valve can include a flow control device that is selected for a lower pressure drop than an automatic control valve (e.g. 5 to 10% of the available system pressure). Selection of any control valve can be based on the pressure drop at maximum (design) flow to ensure that the valve provides control at all flow rates. A properly selected balancing valve can proportionally balance flow to its terminal with flow to the adjacent terminal in the same distribution zone.

In current HVAC approaches, various types of heat exchangers can be manufactured as discussed above to transfer heat. The components to control/regulate the heat transfer rate and to filter the fluid are made by various other manufacturers. Often, these other components are installed, tested, and calibrated in the field at the project location. Heat exchangers such as coils can ship stand-alone to a project site and be incorporated into the HVAC system or/and shipped to a product manufacturer where the coil is inserted into the product. Then the product is shipped to the project destination, where the "other" piping components are installed at the project location. Some of these other piping components include control valves/automatic temperature controls valves supplied by the Controls Contractor. The Controls Contractor has a contract to install all the building automation controls (BAS) in the building. There are several large Controls companies including Johnson, Siemens, and Honeywell, and the like. Temperature sensors, pressure sensors and other control instrumentation are typically supplied by the Controls Contractor who has a contract to install all the building automation controls (BAS) in the building. Balancing valves, including automatic type (pressure independent) and manual balancing valves are supplied by a water side sales representative and sold directly to the Piping Contractor. There are several manufacturers of balancing valves such as Griswold, Flow design, Nexus, and the like. Isolation valves, drains, air vents and other ancillary piping components are supplied by a water side sales representative and sold directly to the Piping Contractor. There are several manufacturers of these types of products such as Nibco, Gerhard, and the like. Strainers and other ancillary components to filter out containments in the water are supplied by a water side sales representative and sold directly to the Piping Contractor. The Contractor acts as the systems integrator and tries to assemble all the components in the field with various union labor trades such as the Pipefitters union, the Sheet metal union, the Electricians union, and the like. The Contractor is interested in maximizing his profit and therefore always buys the most economic products per job by various manufacturers. Each project uses different manufacturers depending on which manufacturer meets the job specifications and is the most economical. The fact the Contractor buys on low price does not allow him to over design/engineer a product that meets the majority of the specifications. Additionally, the Contractor is not a manufacturer. The end product is non-catalogued components assembled with no uniformity, standardization of part numbers, nomenclature, drawings, model numbers, test data, and the like. There is no standardization of the end product form one project to the other. The coils and ancillary field piping components are in the mature/decline stage of the product life cycle. The emphasis is on cutting production costs, low price and not on innovations. The fact that the market for the final product is segmented by niche manufacturers makes it more difficult to innovate. The fact the unions have work preservation rights upheld by the Supreme Court docs not allow innovation of the ancillary components and coils. Absent the advantages provided by embodiments of the present invention, shipping damage of the field components integrated on to a coil could be cost prohibitive. Multiple piping configurations currently exist for each product based on the project making it difficult for universal standardization. Contractors pay 60%+ over OEM/factory costs. Therefore the smallest item that is something all the owners would like becomes cost prohibitive for the Contractor to offer. Whereas according to embodiments of the present invention, it is possible to include this benefit for a nominal cost and therefore meet 95% of all specifications and projects by over designing the product. Coil manufacturers currently and in the past typically could not ship a portable piping assembly attached to the coil with all the ancillary components attached without damaging the ancillary components. Or if tried, it was cost prohibitive and they still had damage of the product and no standardization of ancillary components. Thus, manufacturing coils with ancillary components attached was is cost prohibitive. Many people in the industry do not understand how all the various components work together. There are typically experts for each HVAC segment but seldom does anyone understand how all the various segments work together, including the Wet side, Air side, Controls, Mechanical & Electrical Engineering and Installation of final product by various Contractors, such as wet side, air side, controls, and the like. Mechanical Engineers attend college for 5 years to learn how to design a project. Union tradesmen attend a 5 year apprentice program to learn how to install the various components required in completing a building project in a timely manner. Manufacturers focus on product design and manufacturing for their particular product/niche. There are multiple industrial applications such as biotech, hospital, commercial, hi rise, campus, hotel, and the like, requiring various designs and installation techniques. Heretofore, advances in technology have not been integrated into product designs as disclosed herein for example due to the segmented market segments. In commonly known approaches, coils can be made then installed on a final product such as an air handling unit, fan coil unit, VAV terminal unit, or a fan powered terminal unit. These units are then shipped to the field by the manufacturer. The ancillary piping components to control flow to the coil and temperature output of the coil are installed by the Contractor in the field due to the above referenced factors, such as unions, shipping problems, shipping damage, segmented market, products in the decline/mature stage of the product life cycle, various performance specifications and job requirements for each construction project. Currently, balancing valves are field installed and are used as a way to fix the flow. Manual balancing valves are field adjusted by water balancing technicians. Automatic/pressure independent balancing valves maintain the specified GPM regardless of the pressure drop across the coil.

Embodiments of the present invention provide for the embedding of ancillary components directly onto the coil or heat exchanger itself. Ancillary components include components that control performance, inputs and outputs, instrumentation, and components that filter the water and keep it free from sediments such as strainers, control valves, pressure temperature ports, sensors, balancing valves, isolation valves, and the like. Ancillary components can be embedded onto a heat exchanger, and shipped to the jobsite, or placed into another piece of equipment such as an air handler, a fan coil unit, a VAV box, and the like.

Embodiments of the present invention provide for the over design of a base product offering so that it can meet the majority of all project specifications. This allows for the mass production of a product in a very cost efficient way. The standardization of components allows for the purchase of components at a substantially lower price than a Contractor on an OEM basis. The standardization allows for cataloging and validation of the product. Embodiments encompass set operational and maintenance manuals for the product, and the like. Bracket and supports, in house testing/calibration, QC and shipping procedures allow the product to be shipped 100% defect free every time at a very cost efficient manner.

In some embodiments, direct digital microprocessor controllers can be directly installed on or coupled with a coil. For example, embodiments encompass making a slight modification to a coil casing and installing a direct digital microprocessor controller with multiple input and outputs with their own Internet addressable points directly on the coil. The DDC microprocessor and its components can be hard wired or wireless. It can be programmed with multiple programming languages allowing it to communicate with various BAS systems manufactured by different vendors.

Embodiments of the present invention also encompass coil performance control without a balancing valve. For example, it is possible to eliminate the need for a balancing valve which is currently used to control the performance of a coil. In an exemplary embodiment, a leaving air temperature sensor can be installed downstream of the coil and wired back to DDC controller. A room sensor/thermostat can be wired to the DDC microprocessor and resides in the actual room. A manual air vent can be installed at the highest point of the coil. A strainer is installed, a drain is installed, and isolation valves are installed. No balancing valves are now needed. A flow limiter is installed on the automatic temperature control valve to limit the maximum flow allowable to the ATC valve. The actuator which is part of the ATC valve receives a signal from the DDC microprocessor which tells it how much to open and close. The actuator controls the valve that opens and closes and controls the amount of flow into the coil and thus controls the MBH output of the coil. A temperature differential between the room sensor and the leaving air temperature can determine how much water is allowed into the coil via the ATC valve and the MBH output of the coil. The DDC microprocessor can control the ATC valve with data it is receiving from the leaving air temperature sensor and the room sensor. An algorithm can be written, pre-programmed to determine the range or tolerances or other operating parameters of the components. Optionally, input and output for such algorithms may be based on psychometric principles. A variable frequency drive/inverter (VFD) can be added to the pumps to control the overall flow of the system based on various performance parameters. The VFD can tie into the BAS system as does the DDC microprocessor and its inputs and outputs can be embedded on the coils. Water balancing can be eliminated or substantially minimized as the BAS system is now the balancer. Manual balancing valves and pressure independent balancing valves can be excluded. An advantage of the pressure independent balancing valves is that no matter what the pressure drop is at the coil, the pressure independent balancing valve can maintain the same gallons per minute through the coil as is required or desired. This is accomplished by various ways depending on the manufacturer of the pressure independent balancing valve.

In some embodiments, the pressure drop through the coil/system may be irrelevant or of minimal impact because the flow can be controlled based off of set point. In some cases, if the coil mbh is currently at set point and the pressure increases the gpm decreases, thus the mbh decreases below the required set point. A signal is sent to the ATC valve and the valve opens until the flow going through the coil reaches the leaving air temperature set point. This can happen on one or more zones instantaneously. By eliminating the balancing valves from the coils the pressure drop is reduced and less pump energy is needed to pump the water through out the system. In some cases, the initial water balancing set up is eliminated or substantially reduced at a savings of an average of about $100,000.00.

Superior Indoor Air quality can be achieved as everyone with a thermostat can now have the desired comfort they require. In addition, the set point required by the room occupant can be maintained to the desired set point to very tight tolerances with little to no fluctuations in the room temperature set point. In some cases, LEED points are awarded. More zones can be added into a building as the embodiments disclosed herein are extremely cost effective. By adding more zones into a building, more people get their own thermostats and control of their individual environment. Currently, 1 thermostat/zone can control 10 offices, for example.

In some embodiments, a server may accumulate data received from wireless transmitters and sensors placed at various locations on an HVAC system. Variables such as gpm, btu, output, pressure drop, and the like can be monitored, along with data from the coil or heat exchanger. A processor or controller can adjust system operating parameters based on such data.

In some embodiments, the system is depreciable to the building owner. In comparison, many known approaches that involve field labor to assemble the various components are not depreciable.

In some embodiments, coils can be constructed with press fittings. Often, known coils are brazed at the joints. Press fittings can use an o ring or some sort of seal. The press fitting can slip over the copper tube and a tool can be used which is set at the specified psi required to press the fitting and the seal around the copper pipe forming a bond and a waterproof seal. A coil can thus be made with these press fittings and eliminate the need for brazing of the copper. The coil can be lead free.

In some embodiments, a coil with one or more of the above referenced components, such as a DDC microprocessor, can ship with a damper. AV AV box can have a damper, pressure probe, and a heating coil. The damper and the probe can be encased in galvanized metal. The coil can be attached to the VAV box by a flanged connection and screws or slip and drive connections. This complete assembly can then be installed at the jobsite. It can be hung and connected to the ductwork. By shipping the coil direct to the project with one or more of the referenced innovations and the damper attached/wired to the DDC microprocessor, the Contractor can slip the coil assembly into the galvanized duct, cut a small straight hole in the duct upstream of the coil, inserts the damper assembly with a sensor into the duct, and screw in the base of the damper to the duct and seal the small duct opening.

Embodiments of the present invention can provide simple and cost effective solution to some currently used VAV boxes. Embodiments can also provide an effective application for retrofit of existing systems. HVAC piping assemblies and other manufactures can be factory calibrated and tested at the factory. A DDC microprocessor can be addressed and pre-programmed further reducing field labor time. With mass production of products, they can ship to the job site exceeding construction schedule. Contractors can use a fixed labor pool to install units versus assembling them. This can make the Contractor more efficient and profitable. Thus, a lower overall cost savings is provided to the building owner.

In some embodiments, one or more brackets can function as a piping support for a portable piping structure. It meets or exceeds all building codes and therefore no additional "support" of the piping structure is required in the field/project by stationary type brackets, Unistrut®, and the like, once the heat exchanger is installed. In contrast, in many current approaches all the piping and accessories that hook up to the heat exchanger/coil must be field supported at the job site by various fasteners attached to the building structure.

Figure 25:
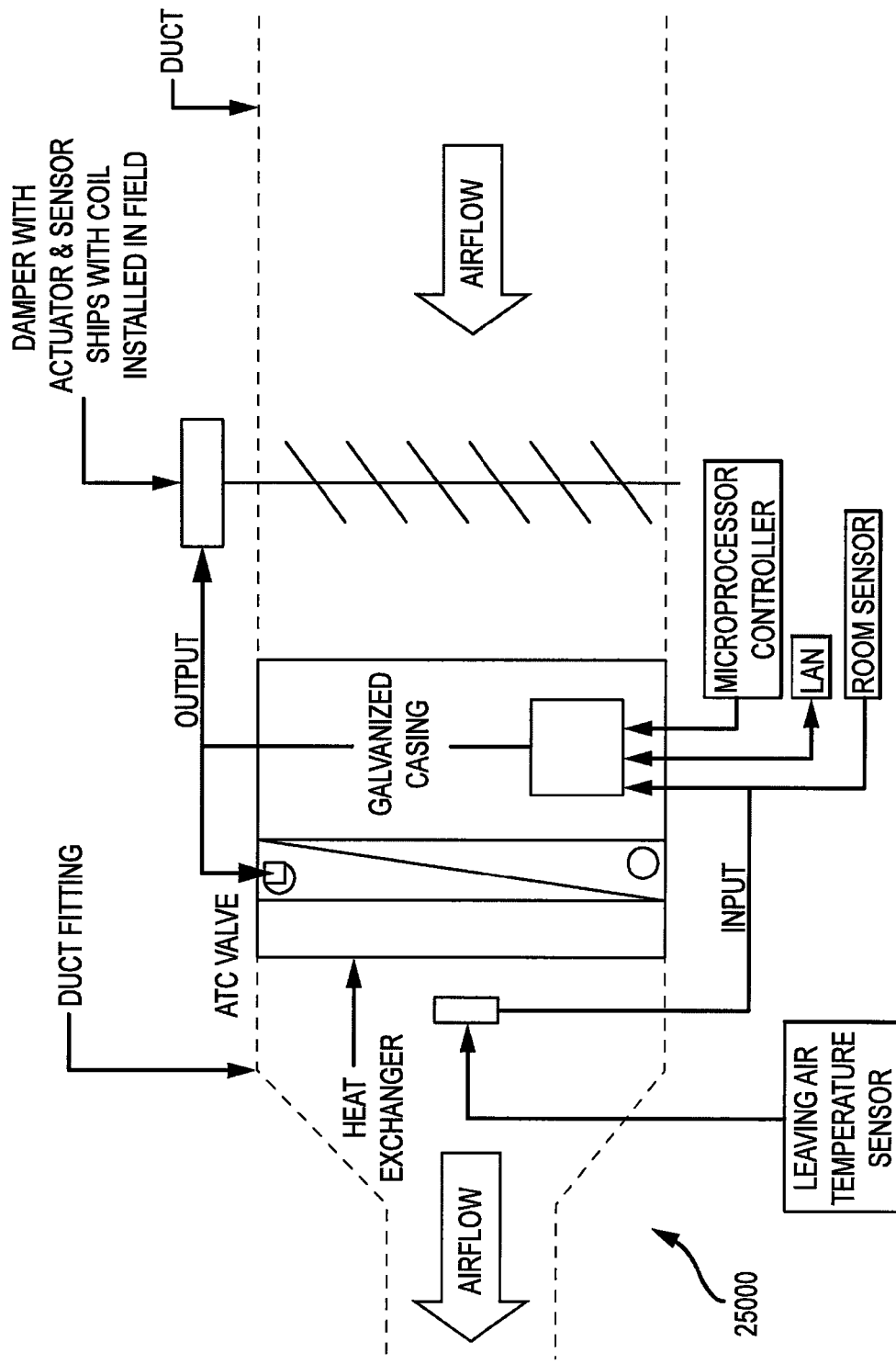
FIG. 25 depicts an HVAC component assembly according to embodiments of the present invention.

FIG. 25 depicts an HVAC component assembly 25000 according to embodiments of the present invention. Assembly 25000 can include a duct that provides an airflow passage. The assembly may also include a heat exchanger having or coupled with an ATC valve, a galvanized casing, and a microprocessor. The microprocessor can have connectivity with a leaving air temperature sensor, a room sensor, and a LAN. The microprocessor can also have connectivity with the ATC valve and a damper. A damper can include an actuator and a sensor. The damper can be shipped with the heat exchanger or coil and installed in the field. The heat exchanger can be pre-piped, pre-wired, pre-programmed, pre-calibrated, and the like. The heat exchanger can ship with minimal or no defects. The heat exchanger can provide "plug and play" connectivity with an HVAC system.

Figure 26:
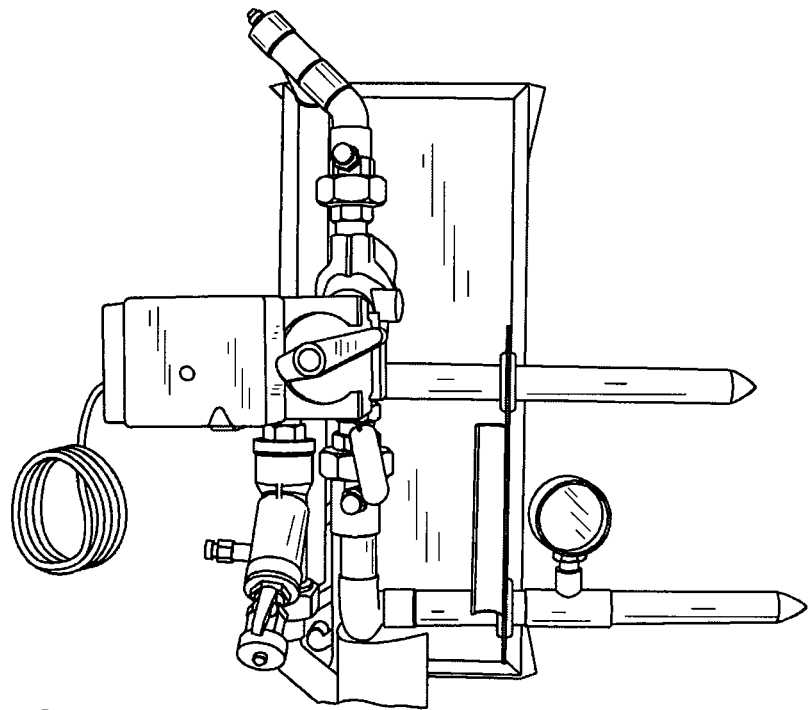
FIG. 26 shows an HVAC component assembly according to embodiments of the present invention.
Figure 27:
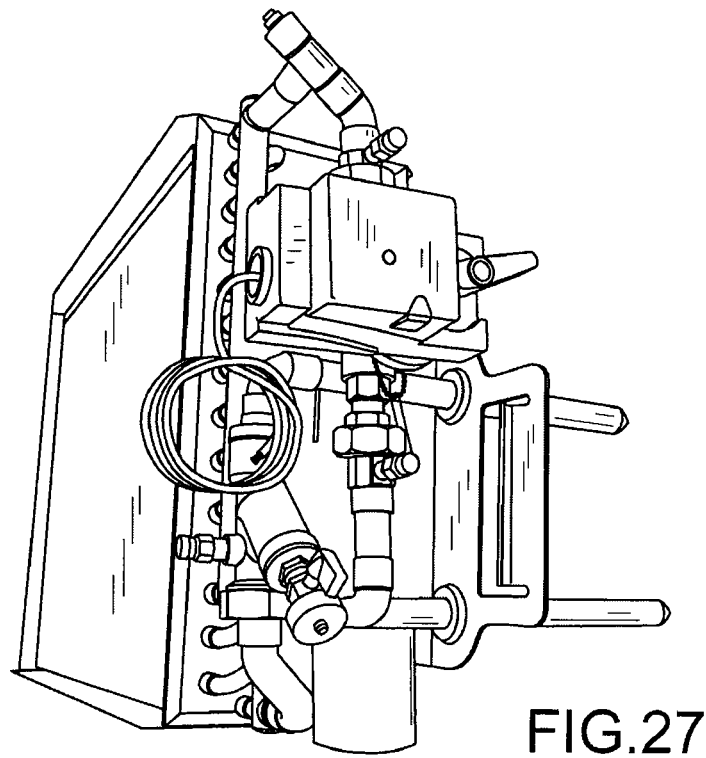
FIG. 27 shows an HVAC component assembly according to embodiments of the present invention.
Figure 29:
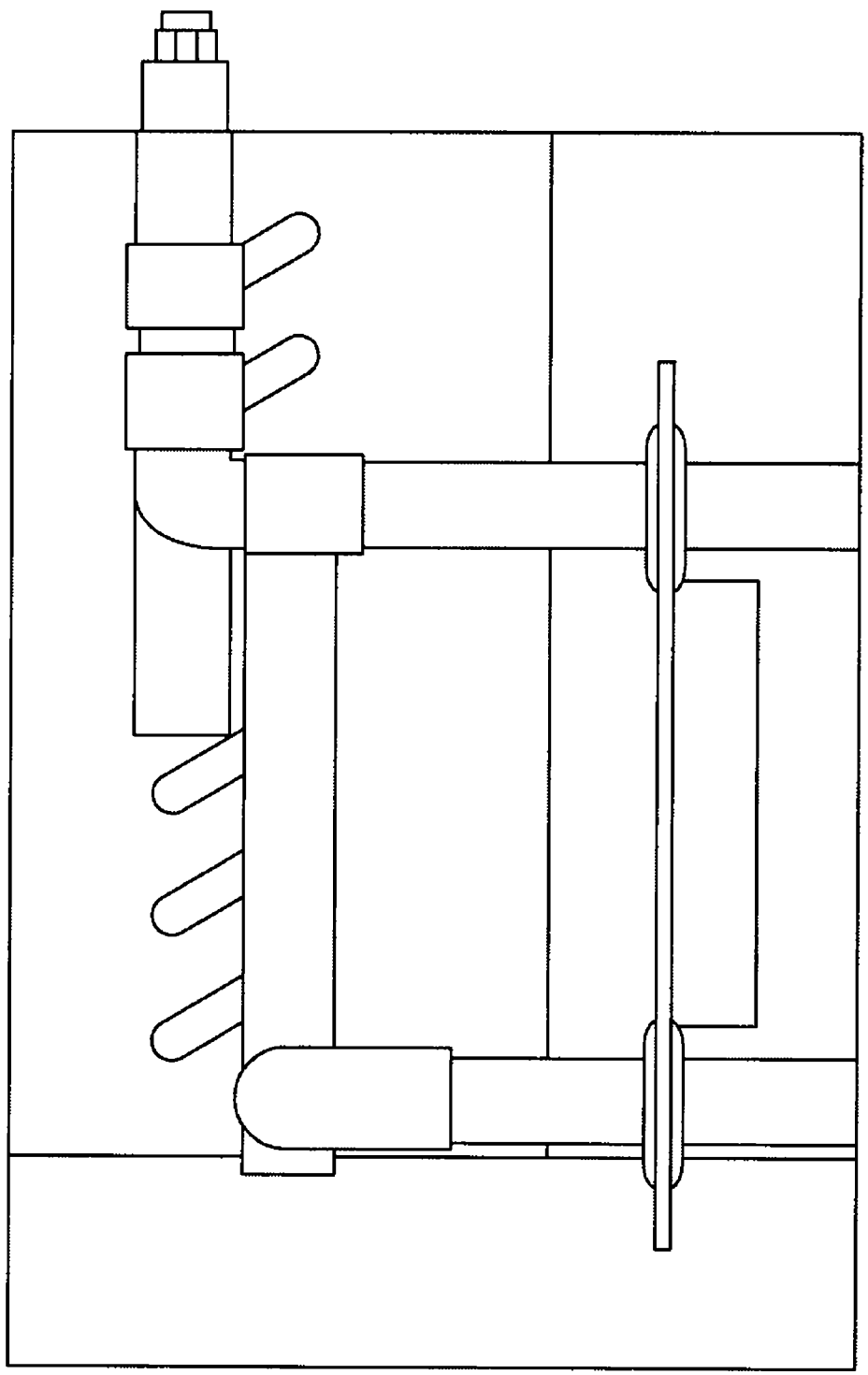
FIG. 29 shows an HVAC component assembly according to embodiments of the present invention.

FIGS. 26 and 27 show HVAC component assemblies according to embodiments of the present invention. FIGS. 28A-28C illustrate various views of an HVAC unit assembly according to embodiments of the present invention. Such manufactures can include a portable piping shipping bracket with piping grommets and a handle. In some embodiments, a casing or duct can partially or completely enclose a portable piping structure. In some embodiments, the manufacture does not include a handle. Optionally, a manufacture may include handles at various locations. Manufactures may include one or more grommets, which may be spaced in an ordered or random fashion. In some embodiments, a portable piping shipping bracket can be a single sided bracket, a two sided bracket, a three sided bracket, a four sided bracket, a five sided bracket, a six sided bracket, a seven sided bracket, an eight sided bracket, or the like. A bracket may provide up to 100 percent enclosure of a piping structure. In some cases, a shipping bracket can have cutouts or apertures that allow for access to certain components or accessories associated with a portable piping structure. In some embodiments, a bracket may include a single flat piece of aluminum with grommets, and may be secured to a coil casing, heat exchanger duct, or other enclosure. In some cases, a coil casing may be extended to allow for improved support and protection of portable piping structure components. Embodiments also encompass insulation features coupled with the manufacture, and any desired aspect ratio option or component option. Advantageously, bracket embodiments can eliminate the need for individual support of piping components or portable piping structure features at or during transport to the jobsite. Enclosures, casings, or ducts may include handles, or may be devoid of handles. Enclosures may include grommets, or may be devoid of grommets. In some embodiments, an enclosure may include a full complement of sides. For example, a rectangular box enclosure may include 6 sides. In some embodiments, an enclosure may include less than a full complement of sides. For example a cube shaped enclosure may include only five sides, or in some embodiments it may include only four sides. Optionally, an enclosure may include a partial side. FIG. 29 shows a portable piping structure supported and protected by a single sided bracket.

Figure 30A:
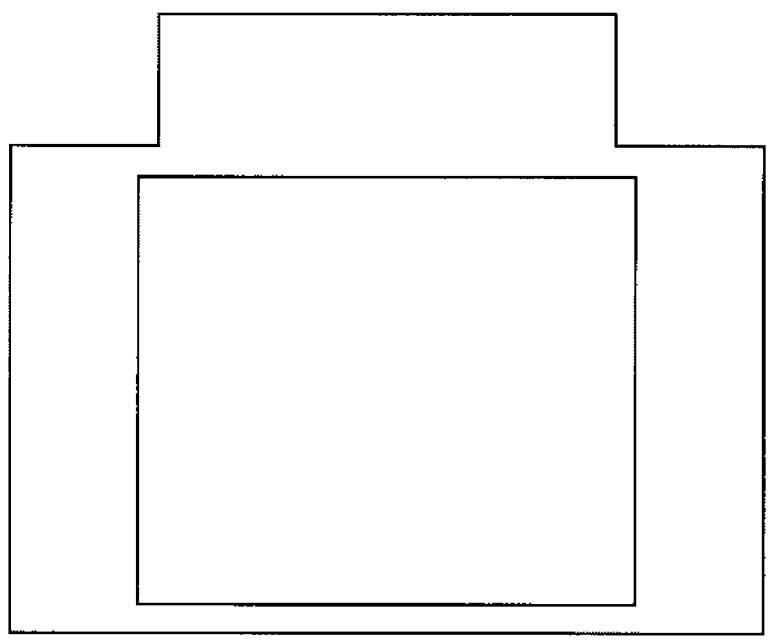
FIGS. 30A-30C illustrate various views of an HVAC unit assembly bracket according to embodiments of the present invention.
Figure 30B:
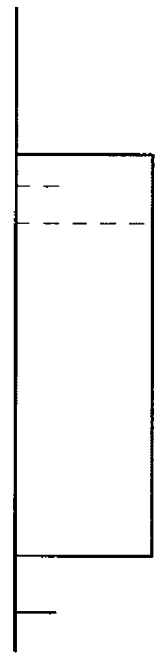
Figure 30C:
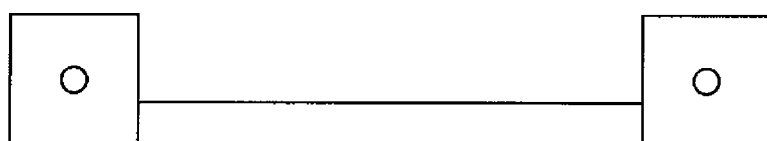

FIGS. 30A-30C illustrate various views of an HVAC unit assembly bracket according to embodiments of the present invention. In some cases, such brackets can provide a universal hanging bracket. Bracket embodiments can be adjustable on a piping structure or duct or other HVAC unit component by sliding the bracket back and forth. In some cases, the bracket can be built with hinges at one or more corners for shipping the bracket loose. Optionally, seismic aircraft cables with I bolts can ship on the bracket. Brackets can be standardized to balance loads, such as horizontal loads. A bracket may be coupled with a handle. In some embodiments, a handle may be provided on a separate piece. Handles can be mounted to the frame or any other feature by a fastening system such as bolts or screws. In some embodiments, bracket frames such as these provide an adjustable aspect ratio for the handle and system.

Currently, heating and cooling coils manufactured for use in VAV boxes, fan coils, air handling units (AHU's), or for stand alone applications often have the inlet and outlet of the supply and return fluid lines at the very top and bottom of the coil piping assembly. That is, the inlets and the outlet of the coils are located at the top and bottom of the coils. In this way, as the size of the coil increases, so does the distance between the coil inlet and outlet openings. Embodiments of the present invention provide a coil or thermal transfer unit having an inlet and outlet which are spaced apart from each other at a standard or known distance. Hence, a large coil can have a configuration where the inlet and outlet are separated by a standard distance, and a small coil can have a configuration where the inlet and outlet are separated by the same standard distance. In one exemplary embodiment, the standard distance between a coil inlet and outlet is six inches on center. In other embodiments, the standard distance between a coil inlet and outlet can be four inches on center, eight inches on center, twelve inches on center, and the like. Embodiments of the present invention also provide handles, brackets, and the like having apertures separated by a standard distance. For example, a standard distance between a first aperture and a second aperture can be six inches on center. In other embodiments, the standard distance between a first aperture and a second aperture can be four inches on center, eight inches on center, twelve inches on center, and the like. These distances may refer to the distance between the actual components (e.g. pipe or aperture) or the distance between central longitudinal axes defined by such components, for example.

Figure 31A:
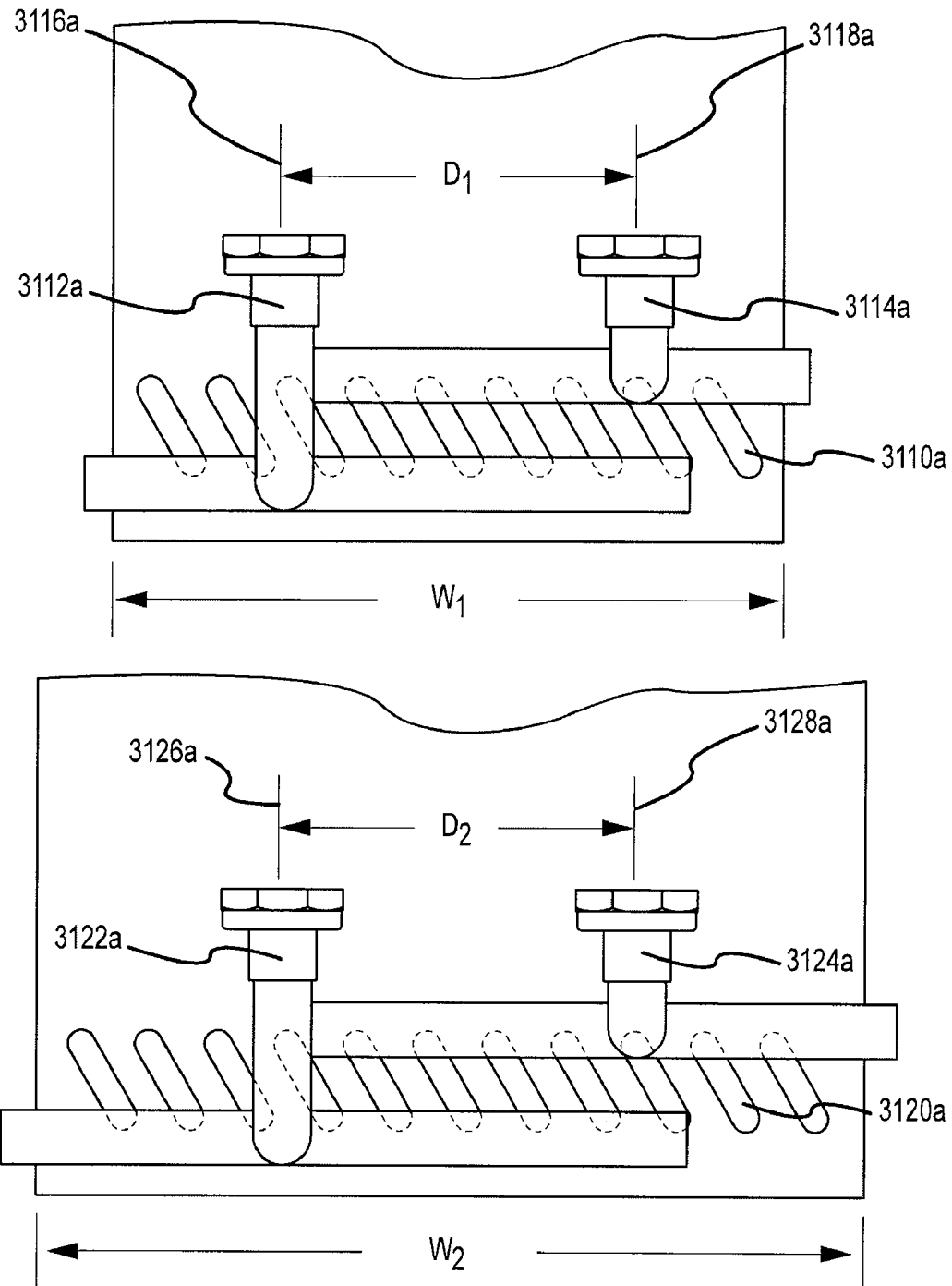

Embodiments of the present invention encompass methods of manufacturing one or a plurality of portable piping structures. As depicted in FIG. 31A, exemplary embodiments may include providing a first heat exchange coil 3110a having a first dimension such as a width $W_1$, and a second heat exchange coil 3120a having a second dimension such as a width $W_2$. The first heat exchange coil may have an inlet pipe 3112a defining a central longitudinal axis 3116a and an outlet pipe 3114a defining a central longitudinal axis 3118a. Central longitudinal axis 3116a and central longitudinal axis 3118a are separated by a distance of $D_1$. The second heat exchange coil may have an inlet pipe 3122a defining a central longitudinal axis 3126a and an outlet pipe 3124a defining a central longitudinal axis 3128a. Central longitudinal axis 3126a and central longitudinal axis 3128a are separated by a distance of D2. In some embodiments, distance $D_1$ is equal to distance $D_2$.

As depicted in FIG. 31B, exemplary embodiments may include coupling a first inlet piping assembly 3132b with inlet pipe 3112b and coupling a first outlet piping assembly 3142b with outlet pipe 3114b to provide a first portable piping structure 3152b of a plurality of portable piping structures 3160b. First inlet piping assembly 3132b can define a central longitudinal axis 3133b, and first outlet piping assembly 3142b can define a central longitudinal axis 3143b. Central longitudinal axis 3133b and central longitudinal axis 3143b are separated by a distance of D1. Similarly, embodiments may include coupling a second inlet piping assembly 3172b with inlet pipe 3122b and coupling a first outlet piping assembly 3182b with outlet pipe 3124b to provide a second portable piping structure 3154b of the plurality of portable piping structures 3160b. Second inlet piping assembly 3172b can define a central longitudinal axis 3173b, and second outlet piping assembly 3182b can define a central longitudinal axis 3183b. Central longitudinal axis 3173b and central longitudinal axis 3183b are separated by a distance of $D_2$. In some embodiments, distance $D_1$ is equal to distance $D_2$. It is appreciated that first portable piping structure 3152b and second portable piping structure 3154b can each include a coil or heat exchanger, such that the respective coils or heat exchangers are of different sizes or dimensions. Hence, embodiments of the present invention encompass a plurality of portable piping structures, where coil or heat exchanger dimensions may vary among the portable piping structures, while the distance between inlet and outlet pipes, between inlet and outlet piping assemblies, or between central longitudinal axes defined by the pipes or piping assemblies are equal or otherwise standardized for mass production.

Figure 31C:
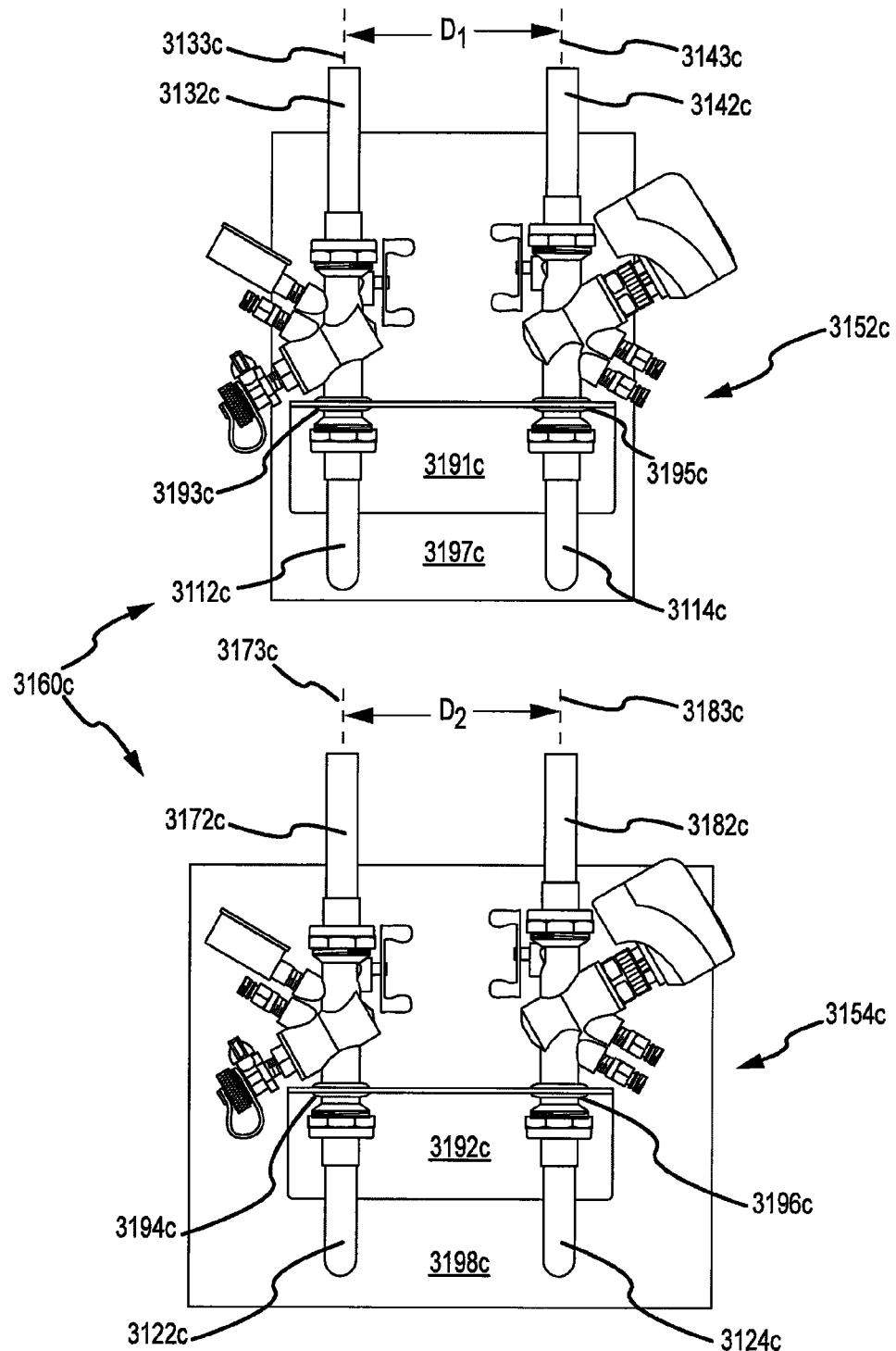

FIG. 31C shows a plurality of portable piping structures according to embodiments of the present invention. Methods for making piping structures may include coupling a first inlet piping assembly 3132c with inlet pipe 3112c and coupling a first outlet piping assembly 3142c with outlet pipe 3114c to provide a first portable piping structure 3152c of a plurality of portable piping structures 3160c. First inlet piping assembly 3132c can define a central longitudinal axis 3133c, and first outlet piping assembly 3142c can define a central longitudinal axis 3143c. Central longitudinal axis 3133c and central longitudinal axis 3143c are separated by a distance of $D_1$. Similarly, embodiments may include coupling a second inlet piping assembly 3172c with inlet pipe 3122c and coupling a first outlet piping assembly 3182c with outlet pipe 3124c to provide a second portable piping structure 3154c of the plurality of portable piping structures 3160c. Second inlet piping assembly 3172c can define a central longitudinal axis 3173c, and second outlet piping assembly 3182c can define a central longitudinal axis 3183c. Central longitudinal axis 3173c and central longitudinal axis 3183c are separated by a distance of $D_2$. In some embodiments, distance $D_1$ is equal to distance $D_2$. As shown here, first portable piping structure 3152c may be coupled with or include a first bracket 3191c having a first support 3193c and a second support 3195c. First bracket 3191c can be coupled with a duct or casing 3197c. First support 3193c can be coupled with first inlet piping assembly 3132c, and second support 3195c can be coupled with first outlet piping assembly 3142c. Similarly, second portable piping structure 3154c may be coupled with or include a second bracket 3192c having a first support 3194c and a second support 3196c. Second bracket 3192c can be coupled with a duct or casing 3198c. First support 3194c can be coupled with second inlet piping assembly 3172c, and second support 3196c can be coupled with second outlet piping assembly 3182c.

Figure 31D:
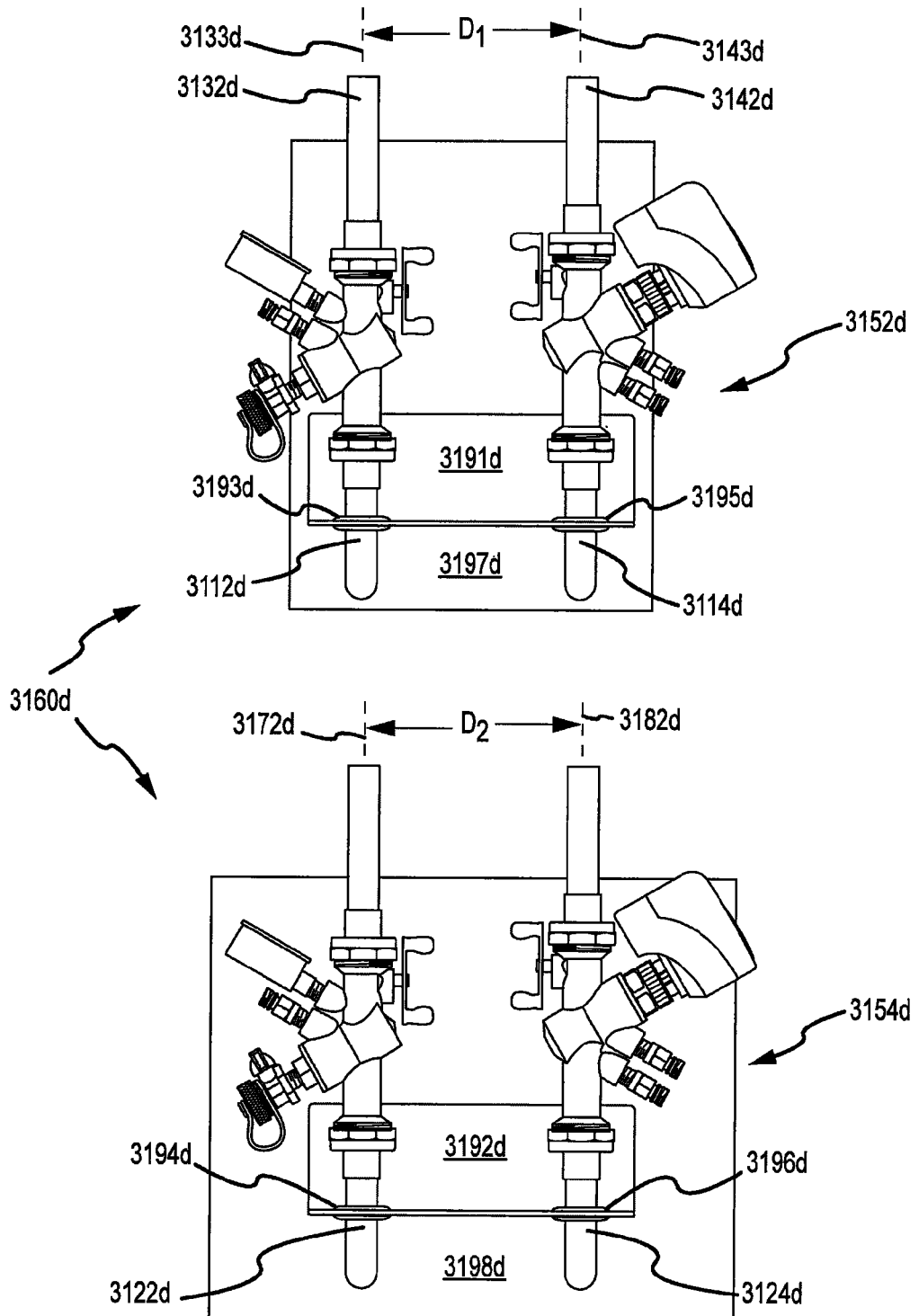

FIG. 31D shows a plurality of portable piping structures according to embodiments of the present invention. Methods for making piping structures may include coupling a first inlet piping assembly 3132d with inlet pipe 3112d and coupling a first outlet piping assembly 3142d with outlet pipe 3114d to provide a first portable piping structure 3152d of a plurality of portable piping structures 3160d. First inlet piping assembly 3132d can define a central longitudinal axis 3133d, and first outlet piping assembly 3142d can define a central longitudinal axis 3143d. Central longitudinal axis 3133d and central longitudinal axis 3143d are separated by a distance of D1. Similarly, embodiments may include coupling a second inlet piping assembly 3172d with inlet pipe 3122d and coupling a first outlet piping assembly 3182d with outlet pipe 3124d to provide a second portable piping structure 3154d of the plurality of portable piping structures 3160d. Second inlet piping assembly 3172d can define a central longitudinal axis 3173d, and second outlet piping assembly 3182d can define a central longitudinal axis 3183d. Central longitudinal axis 3173d and central longitudinal axis 3183d are separated by a distance of $D_2$. In some embodiments, distance $D_1$ is equal to distance $D_2$. As shown here, first portable piping structure 3152d may be coupled with or include a first bracket 3191d having a first support 3193d and a second support 3195d. First bracket 3191d can be coupled with a duct or casing 3197d. First support 3193d can be coupled with inlet pipe 3112d, and second support 3195d can be coupled with outlet pipe 3114d. Similarly, second portable piping structure 3154d may be coupled with or include a second bracket 3192d having a first support 3194d and a second support 3196d. Second bracket 3192d can be coupled with a duct or casing 3198d. First support 3194d can be coupled with second inlet pipe 3122d, and second support 3196d can be coupled with second outlet pipe 3124d.

Figure 31E:
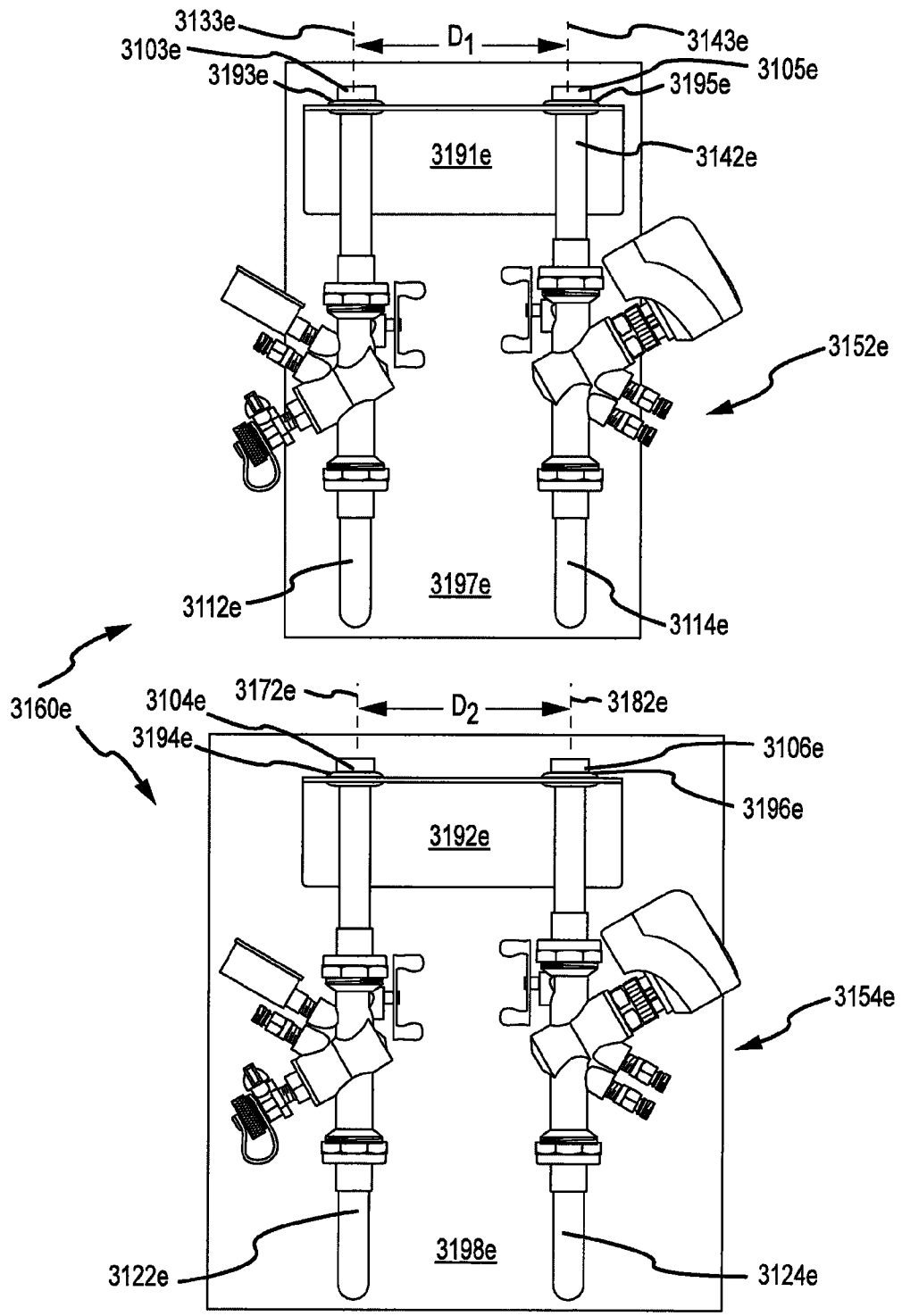

FIG. 31E shows a plurality of portable piping structures according to embodiments of the present invention. Methods for making piping structures may include coupling a first inlet piping assembly 3132e with inlet pipe 3112e and coupling a first outlet piping assembly 3142e with outlet pipe 3114e to provide a first portable piping structure 3152e of a plurality of portable piping structures 3160e. First inlet piping assembly 3132e can define a central longitudinal axis 3133e, and first outlet piping assembly 3142e can define a central longitudinal axis 3143e. Central longitudinal axis 3133e and central longitudinal axis 3143e are separated by a distance of $D_1$. Similarly, embodiments may include coupling a second inlet piping assembly 3172e with inlet pipe 3122e and coupling a first outlet piping assembly 3182e with outlet pipe 3124e to provide a second portable piping structure 3154e of the plurality of portable piping structures 3160e. Second inlet piping assembly 3172e can define a central longitudinal axis 3173e, and second outlet piping assembly 3182e can define a central longitudinal axis 3183e. Central longitudinal axis 3173e and central longitudinal axis 3183e are separated by a distance of $D_2$. In some embodiments, distance $D_1$ is equal to distance $D_2$. As shown here, first portable piping structure 3152e may be coupled with or include a first bracket 3191e having a first support 3193e and a second support 3195e. First bracket 3191e can be coupled with a duct or casing 3197e. First support 3193e can be coupled with first inlet cap, fitting, or piping 3103e, and second support 31 95e can be coupled with first outlet cap, fitting, or piping 3105e. Similarly, second portable piping structure 3154e may be coupled with or include a second bracket 3192e having a first support 3194e and a second support 3196e. Second bracket 3192e can be coupled with a duct or casing 3198e. First support 3194e can be coupled with second inlet cap, fitting, or piping 3104e, and second support 3196e can be coupled with second outlet cap, fitting, or piping 3106e.

Advantageously, the brackets illustrated in FIGS. 31C-E are well suited for providing any desired spacing between components to which they are attached or coupled, according to the principles shown in FIGS. 31A-B. Furthermore, any of a variety of ancillary components or subassemblies thereof can be mounted on or coupled with a bracket, a casing or duct, or a coil or heat exchanger. By utilizing such efficient manufacturing methods, it is possible for one union pipe fitter manufacture 30 to 60 portable piping structure units per hour. In contrast, many commonly used manufacturing methods require two union pipe fitters a total of eight hours to pipe up a small stand alone heat exchanger/fluid coil and/or VAV box with hot water re-heat. By prefabricating the units with manufacturing procedure embodiments of the present invention, it is possible to realize real economic efficiencies. Often, such portable piping assemblies or structures are sealed and pressurized prior to shipping to a job site, where they can be installed as part of a larger HVAC system of a building. Moreover, it is possible to install valves and electronic components for BTUH monitoring. This can provide a building owner or operator with any of a variety of programming options to monitor and optimize the total system for energy usage, LEED points, utility rebates, indoor air quality (IAQ), comfort, and the like. Also, the entire unit, or any desired portion or component thereof, can be insulated prior to shipping to a construction site, a customer, or a secondary manufacturing facility. According to some methods, it is possible to transport a stand alone coil, without a full or partial complement of zone control unit components, to a job site, an air handler manufacturer, an original equipment manufacturer (OEM), or any manufacturer or vendor of HVAC or heating, ventilation, air conditioning and refrigeration (HVACR) systems, components, or controls. For example, embodiments may include shipping a coil and ancillary components to a variable air volume (VAV) box manufacturer. By providing a plurality of coils or heat exchangers having various sizes, which are configured with inlet and outlet pipes separated by a standard distance or fixed aspect ratio, the manufacturing process can be facilitated quickly, and installation is efficient. A zone control unit or coil can be pre-programmed, pre-tested, insulated, validated, and certified at a manufacturing facility or factory. The product can be LEED certified, for example as part of a GREEN program.

Hence, embodiments of the present invention encompass portable piping structure designs having fixed or standardized dimensions or spacing configurations for the inlet and outlet portions, or for assemblies coupled therewith, of the coil or heat exchanger. The dimension or spacing configuration may be fixed or standardized regardless of the size of the coil or heat exchanger. In some cases, on an end portion of a copper tube of the coil it is possible to sweat in or include a fitting. It is also possible to thread in a valve body to the fitting on the coil. On another side of the valve body it is possible to thread in a sealed copper air chamber. From a manufacturing process, in some embodiments it may only be necessary to add one fitting to a scaled copper air chamber, and then assemble the valve body to the air chamber piece and the coil. In some cases, piping on a zone control unit may be condensed to a coil body only. According to some of these embodiments, but not exclusively, it is possible to ship such coil configurations to a manufacturer for use in their product.

Figure 31F:
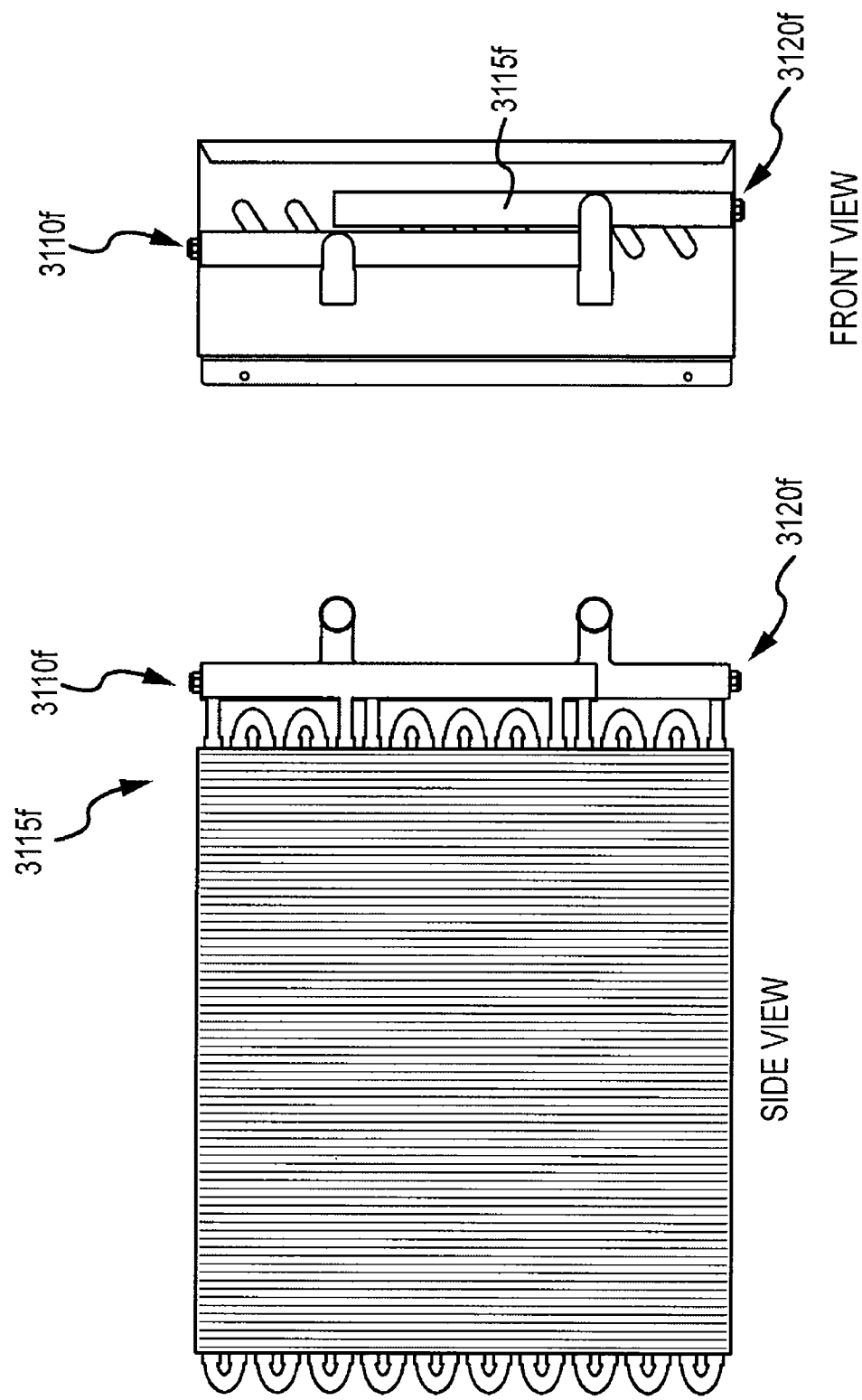

Embodiments of the present invention also provide universal coils that can be used as a right hand or left hand connection, thus eliminating the need for stocking multiple coil configurations. For example, a coil or heat exchanger may include a ¼ inch tap or thread on both sides of the top and bottom header to make a universal coil. By using a screw in type device the coil can have a universal air vent for a top position or a universal drain plug for a bottom or down position. As shown in FIG. 31F, regardless of which side is facing upward, it is possible to screw in or otherwise couple an air vent 3110*f* on a higher side of the coil 3115*f* at the tap or thread, and screw in or otherwise couple a drain cock 3120*f* on a lower side of the coil 3115*f* at the tap or thread. This configuration may require only one elbow and fitting on each supply and return line, and can be mounted directly on a coil. The coil casing can be increased to an optimum size to allow piping components, controls hardware, and the like to be installed directly on the coil casing. Thus the coil and the piping components become universal and capable of being installed on or in any product or duct work.

Figure 32:
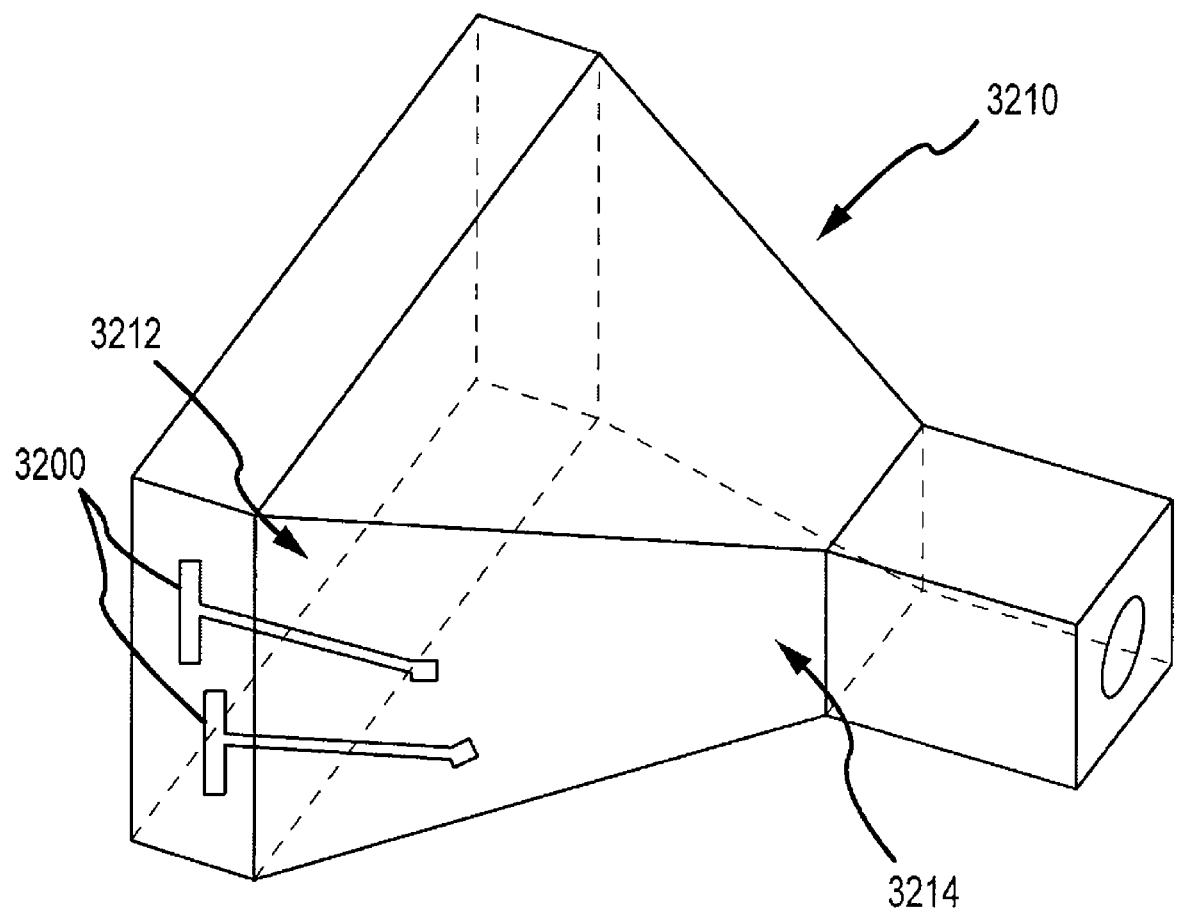
FIG. 32 illustrates aspects of an HVAC casing according to embodiments of the present invention.

According to some embodiments of the present invention, a coil casing can be made with various universal transitions out of various types of materials, thus providing a universal installation kit of the coils. As depicted in FIG. 32, a coil or heat exchanger 3200 can be coupled with a transition casing 3210 where a first portion 3212 of the transition casing provides a larger surface area than a second portion 3214 of the transition casing. Such tapered casing configurations can provide sound attenuation to an HVAC system, and can provide a more uniform air movement over the coil with less turbulence when compared to some configurations that do not have a tapered transition casing or duct. The incorporation of a transition casing allows a VAV box or duct to accommodate larger coils having more face or surface area. Consequently, the number of rows in a coil can be reduced. For example, by incorporating a transition casing it may be possible to replace a two row coil with a one row coil. Moreover, larger coils having more face or surface area can confer a lower water pressure drop or a lower air pressure drop. Such systems typically use less energy and provide better performance due to reduced fluid resistance, for example. Hence, lower power air fans and water pumps can be used. A transition casing can make a portable piping structure quieter and can provide improved heat transfer as air flows over the entire coil and eliminates or reduces spotting of the coil where uneven thermal transfer occurs. Such configurations can qualify for LEED points. In one exemplary embodiment, it is possible to use a universal transition for a 20 inch duct or for a 6 inch duct. Because a tapered transition casing may utilize more material, such as sheet metal, discharge noise can be reduced.

A stand alone coil can be used as an economical and energy efficient retrofit coil application, that is pre-piped, pre-wired, and ready to plug and play. A low profile unit (for example a smaller pre-piped coil with smaller dimensions) can be created by the stand alone heat exchanger/coil and allows an engineer, architect, or contractor more room to design and work on the construction site. The product can ship pre-balanced and pre-programmed, thus eliminating or reducing costly union field labor. The product can be a pre-scaled, zero leakage box thus saving more energy. A leaving air discharge sensor can be installed on the heat exchanger, wired into the controls hardware, and pre-calibrated at the factory. A green/LEED box can be produced with these enhancements, at an economical cost. A coil casing can be made as a flanged connection, as compared to a slip and drive connection, which can help eliminate or reduce leaks. The product can be overengineered in order to meet 95% or more of all building specifications, and then mass produced. For example, a plurality of portable piping structures can be manufactured which can be incorporated into HVAC systems of a vast majority of residential, commercial, or industrial applications. All or many of the piping coil components can be interchangeable on a building, regardless of the coil size, due to the universality provided by embodiments of the present invention. In contrast, in many current methods a contractor will not overengineer a piping assembly at the construction job site, but rather will cobble together the cheapest collection of components.

Typically, thermal transfer units and/or coils are manufactured for either heating or cooling applications. That is, one coil is used for heating, and another coil is used for cooling. According to embodiments of the present invention, one coil is manufactured to do both the heating and cooling. For example, a four way mixing valve can be used on a coil to mix the fluid medium from 42 degrees F. up to 200 degrees F. to optimize the leaving air temperature and ancillary parameters off the coil. The valve may include an input for receiving cold fluid from a chiller and an input for receiving warm fluid from a boiler. Cold and warm fluid may be mixed and then transferred into a coil. The various electronic devices embedded on the coil can maintain and monitor the performance parameters off the coil commensurate to what is needed or desired in the occupied space or zone. Such configurations may include one hot inlet into the valve, and one cold inlet into the valve. Mixing is accomplished at the valve, and the mixed fluid then travels to the coil, and then to a single outlet, for example. Another configuration include two inlets and two outlets on a coil. A first inlet and outlet can be used for cooling and a second inlet and outlet can be used for heating.

Often, as the size of the coil increases, so does the size of the piping. As the face or surface area of the coil increases, more piping may be needed or desired for manufacturing the piping and valve components. A duct, casing, or support structure can have a fixed dimension (e.g. width, length, or height) which is about 3 to 5 times larger than the pipe diameter. The coils can be assembled, attached to, located in or on another assembly, such as a VAV box, AHU, duct work, fan, and the like. Hence, a portable piping structure may include a duct or casing having a standard or pre-selected length, width, and/or height. According to some embodiments, it is possible to manufacture a plurality of such portable piping structures, where a first portable piping structure includes a coil having a first size or dimension, and a second portable piping structure includes a coil having a different second size or dimension, and the first and second portable piping structures are each coupled with respective ducts or casings having similar or standardized configurations.

Various bracketing systems can be used to connect a portable piping structure or coil with a casing or ancillary components, so as to ensure little or no damage to the components during shipment. A duct, casing, square box, or can, optionally including rubber grommets, can be used as a fastening device, handle, or bracket. According to some embodiments, a duct, casing, or other container may include supports for coupling with coils, heat exchangers, pipes, piping assemblies, caps or fittings, and the like. For example, a portable piping unit may include a coil attached with a duct, such that one or more apertures or supports defined by the duct are coupled with one or more portions of the coil. Ducts or brackets according to similar embodiments may include handles as depicted in FIGS. 28A-28C.

Psychrometry is a field of engineering concerned with the determination of physical and thermodynamic properties of gas-vapor mixtures. Advantageously, embodiments of the present invention can incorporate psychrometric principles to provide ambient comfort to one or more building occupants. For example, a psychrometric ratio can relate the absolute humidity and saturation humidity to the difference between the dry bulb temperature and the adiabatic saturation temperature. A psychrometric chart can be a graph of the physical properties of moist air at a constant pressure. Psychrometric variables or thermophysical properties such as dry-bulb temperature (DBT), wet-bulb temperature (WBT), dew point temperature (DPT), relative Humidity (RH), humidity ratio (e.g moisture content, mixing ratio, or specific humidity), specific enthalpy, specific volume, and the like can be programmed into a processor or controller of a zone control unit, heat exchanger, coil, or other HVAC component. Algorithms can be based on psychrometric variables to obtain a comfortable ambient room environment for a building occupant. Coil or heat exchanger properties can be selected based on psychrometric data.

Embodiments of the present invention provide temperature reset valve for use with portable piping structures. By using a temperature reset, a leaving air sensor and entering air sensor along with a BTUH monitoring and/or inlet and outlet water temperature sensor disposed at or near the coil, it is possible to control the performance of the coil by adjusting the cfm over the coil, and the entering/leaving heat transfer medium through the coil and the building. Further, it is possible to incorporate data or information from a psychrometric chart into the microprocessor controller located on the coil or ZCU, optionally by way of written or encoded software. For example, a controller or processor may include a tangible medium embodying machine-readable code that is configured to process information based on a psychrometric chart, and data such as thermal transfer characteristics/properties of a thermal transfer device/coil, airflow across the coil, the heat transfer medium (water, for example) in and out of the coil, and the leaving air parameters off the coil such as temperature, cfm, humidity, and the like. Software or other programming can be configured to control the temperature of the fluid or water entering and leaving the coil, and the cfm across the coil to meet or optimize psychometric chart parameters relative to the current conditions. The end result can be real time 100% indoor air quality, a real time totally self balancing system, and a real time energy efficient system qualifying for GREEN/LEED points. Also, by monitoring these parameters it is possible to do real time BTUH monitoring and optimize the HVAC system accordingly and let the building owner or any other interested party know exactly where they need to optimize their equipment for the biggest energy savings/IAQ benefit. Advantageously, by using a temperature reset along with psychrometric chart data, it is possible to pre-fabricate a portable piping structure with ancillary components such as sensors and the like, and also eliminate the need for a balancing valve at the coil. Hence, such configurations can be manufactured using less raw materials and installation labor, which provides improved economic efficiencies. Moreover, the overall pressure drop in the piping system can go down resulting in the use of smaller pipe and valves and/or reduced energy consumption by the HVAC equipment, including pumps, boilers, fans, chillers, and the like. Accordingly, there are significant benefits which can be realized by pre-piping or pre-fabricating such configurations, and testing such configurations on a coil or zone control unit.

By incorporating a temperature reset, it is possible to eliminate a balancing valve at the device. The gpm to a coil can be controlled through a temperature reset. No balancing valves may be required at the device, and thus energy savings are possible. The performance of the system can be controlled by the building automation system (BAS). The system can be self balancing. Such configurations are very conducive to providing and stocking a standardized product such as a zone control unit.

Embodiments of the present invention may incorporate components from FlowCon International which involve total authority technology, or similar components such as DeltaPValves from Flow Control Industries. Such components may combine a control valve and a flow limiting valve with a pressure equalizer. The combination valves can neutralize the effect of variable pressure in the system and return the authority to the control valve, thermostat, and coil. Some initial models such as SH (manual) and SM (actuated) have been supplemented by the SME model. When the valve stem closes or opens it can allow the valve to adjust flow. The pressure regulator can instantaneously equalize the pressure and afford the control valve to precisely modulate as dictated by the thermostat and BMS system. The outcome can be a highly accurate flow control. Set points can be attained precisely and quickly as the control valve is not "hunting" which is caused by fluctuating pressure. The pressure regulator reacts to the slightest change in flow. The flow limiter insures the coil does not receive more than the design flow. A Total Authority Valve can be ideally suited for a variable flow system used in a current system. Variable flow systems are often constantly changing flow rates resulting in demands on the pressure regulator to equalize pressure across the valve and coil. A Total Authority Valve used in an On/Off application can equalize flow from initial opening of the control valve portion through the total open position. Then once again, from open to totally closed. The SME model can be specifically targeted to provide a high level of efficiency to variable flows found in VAV, modulating or variable flow rates, for example in fan coils, water source heat pumps, zone control units, and any small coil applications. A "pop-top" type Flow Con actuator for an SME may allow affordability whereas the SH and SM may cost more. According to embodiments of the present invention, configurations may exceed many or all balancing valve specifications and be conducive to stocking zone control units for fast track business. In some cases, there may be retrofit/ESCO opportunities for Total Authority approaches. Total Authority Valves can have precise control to allow systems to be designed with less equipment, or in retrofit situations, cutting back on how much capacity is required to heat and cool. Such accuracy can allow for an accurate Delta-T system design. More capacity in the same system can be achieved with a higher Delta-T, and less capacity and lower flow rates can equate to fewer GPM to cool and heat.

Embodiments of the present invention may incorporate dynamic balancing components from Griswold with Flow-Con's adjustable P.I. cartridge in the PIC valve. This type of valve may not have the combination all in one SME type valve. Relatedly, Belimo is of similar design and both are pressure independent. Embodiments may also incorporate components from Delta Control Products, now Bray, which may use the FlowCon E-just cartridge to package a combination control, flow limiter, and pressure regulator. Embodiments may also incorporate static balancing devices, which may have no pressure regulation capability. These components typically limit flow only and do so when a minimum DeltaP has been reached up to a maximum DeltaP. Manufacturers of this type of flow limiting device include FDI, Nexus, Hays, and Griswold stainless steel cartridges with pressure regulation. Embodiments of the present invention may also incorporate manual valves available from companies such as Nibco, B & G, T & A, Griswold, HCI and others. These companies provide manual balancing valves often referred to as "circuit setters" which are a type of balancing valve that involves manual balancing. When balancing a system, once a valve is set and the next set, the preceding valve(s) are revisited to adjust the settings again. This is due to the fact that a manual valve involves an adjustable orifice, not a flow controller. Once pressure changes in the system after initial setting, the flow rate changes also. Such devices typically limit flow when the system is operating at the exact same level as when it was originally set up. In most systems that typically does not happen because of variable speed pumps and drives. Static, dynamic, and automatic balancing (e.g. Total Authority) valves often require at least 50% less cost in balancing/commissioning as the manual valve. Once set, they may be set forever if no changes have to be made to the flow and system. These types of valves allow for 20 to 30% fewer balancing valves on a project thus reducing static pressure in the system as a whole. Energy consumption over the manual system may be considerable and a consideration in applying these valves. Generally speaking, a 20% savings can be claimed with static and dynamic and potentially larger savings with Total Authority Valves.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A pre-piped HVAC apparatus, comprising:
   a duct interface configured to interface to ductwork at an installation site;
   a thermal transfer unit, comprising a coil;
   a group of pipes that are coupled to the thermal transfer unit, wherein the group of pipes comprises an inlet pipe and an outlet pipe;
   a valve coupled to at least one of the inlet pipe or the outlet pipe; and
   a support structure that is configured to mitigate damage to the pre-piped HVAC apparatus during transportation, wherein the support structure is coupled to and in contact with at least one of the group of pipes prior to the transportation.

2. The pre-piped HVAC apparatus of claim 1, wherein the thermal transfer unit is situated in the duct interface.

3. The pre-piped HVAC apparatus of claim 1, wherein the pre-piped HVAC apparatus is configured according to one of: a single duct design, a fan-powered design, a double duct design, or a low-profile design.

4. The pre-piped HVAC apparatus of claim 1, wherein the valve is at least one of: a control valve, a y-strainer valve, an isolation valve, a pressure temperature port valve, or a balancing valve.

5. The pre-piped HVAC apparatus of claim 1, wherein the group of pipes is configured to support at least one of a two-way configuration, a three-way configuration, or a six-way configuration.

6. The pre-piped HVAC apparatus of claim 1, wherein the pre-piped HVAC apparatus further comprises a sensor device or a thermometer device.

7. The pre-piped HVAC apparatus of claim 1, wherein the support structure is configured to maintain a relative position between at least two members of the group of pipes during the transportation.

8. The pre-piped HVAC apparatus of claim 1, wherein the support structure is configured as at least one of a bracket, a brace, a clamp, a fastener, a grommet, or an enclosure.

9. The pre-piped HVAC apparatus of claim 1, wherein the support structure is further coupled to a structure configured to provide support for the support structure, wherein the structure is at least one of: a plenum, an air terminal, a coil casing, a sheet metal structure, a duct, or a workpiece configured to provide support.

10. The pre-piped HVAC apparatus of claim 1, wherein the group of pipes are sealed prior to the transportation.

11. The pre-piped HVAC apparatus of claim 10, wherein a first material of the structure differs from a second material of the at least one pipe, and wherein the support structure is specifically configured to mitigate galvanic corrosion between the first material and the second material.

12. The pre-piped HVAC apparatus of claim 1, wherein the valve is integrated into headers of the thermal transfer unit.

13. A thermal transfer unit, comprising:
    a duct interface configured to interface to ductwork at an installation site;
    a group of pipes comprising at least an inlet pipe and an outlet pipe;
    a valve coupled to at least one of the group of pipes, and
    a support mechanism that is configured to mitigate damage to the thermal transfer unit during transportation of the thermal transfer unit, wherein the support mechanism is coupled to the at least one of the group of pipes prior to the transportation.

14. The thermal transfer unit of claim 13, further comprising a housing for the thermal transfer unit.

15. The thermal transfer unit of claim 14, wherein the housing is configured as the duct interface.

16. The thermal transfer unit of claim 13, wherein the thermal transfer unit is configured according to one of: a single duct design, a fan-powered design, a double duct design, or a low-profile design.

17. The thermal transfer unit of claim 13, wherein the valve is at least one of: a control valve, a y-strainer valve, an isolation valve, a pressure temperature port valve, or a balancing valve.

18. The thermal transfer unit of claim 13, wherein the valve further comprises a flexible hose, or a hose kit.

19. The thermal transfer unit of claim 13, wherein the thermal transfer unit further comprises a sensor device or a thermometer device.

20. The thermal transfer unit of claim 13, wherein the support mechanism is configured to maintain a relative position between at least two members of the group of pipes during the transportation.

21. The thermal transfer of claim 13, wherein the support mechanism is configured as at least one of a bracket, a brace, a clamp, a fastener, a grommet, or an enclosure.

22. The thermal transfer of claim 13, wherein the valve is integrated into headers of the thermal transfer unit.

\* \* \* \* \*